United States Patent
Yamada et al.

(10) Patent No.: US 8,193,743 B2
(45) Date of Patent: Jun. 5, 2012

(54) CONTROL DEVICE FOR ELECTRIC ROTATING MACHINE AND METHOD OF CONTROLLING THE MACHINE

(75) Inventors: Takahiro Yamada, Nagoya (JP); Tatsuru Morioka, Okazaki (JP); Junji Miyachi, Anjo (JP)

(73) Assignee: Denso Corporation, Kariya (JP)

( * ) Notice: Subject to any disclaimer, the term of this patent is extended or adjusted under 35 U.S.C. 154(b) by 397 days.

(21) Appl. No.: 12/627,494

(22) Filed: Nov. 30, 2009

(65) Prior Publication Data

US 2010/0134053 A1 Jun. 3, 2010

(30) Foreign Application Priority Data

Nov. 28, 2008 (JP) .................................. 2008-303626
Oct. 30, 2009 (JP) .................................. 2009-251333

(51) Int. Cl.
*B23Q 35/00* (2006.01)
*H02P 6/00* (2006.01)

(52) U.S. Cl. ................... 318/162; 318/400.33; 318/721; 363/41; 363/98; 323/282

(58) Field of Classification Search ............. 318/400.24, 318/400.25, 400.33, 254, 434, 721, 162, 318/727, 811; 363/41, 98; 323/282
See application file for complete search history.

(56) References Cited

U.S. PATENT DOCUMENTS

| 4,860,186 A | 8/1989 | Maekawa et al. |
| 5,680,299 A | 10/1997 | Yasuda et al. |
| 5,798,628 A * | 8/1998 | Fujita et al. .................... 318/805 |
| 6,700,343 B2 * | 3/2004 | Masaki et al. ................. 318/434 |

(Continued)

FOREIGN PATENT DOCUMENTS

JP 62-058880 3/1987

(Continued)

OTHER PUBLICATIONS

Japanese Office Action dated Dec. 21, 2010, issued in corresponding Japanese Application No. 2009-251333 with English Translation.

(Continued)

*Primary Examiner* — Paul Ip
(74) *Attorney, Agent, or Firm* — Nixon & Vanderhye PC

(57) ABSTRACT

A control device has a unit for preparing a pattern having first and second periods by comparing a triangular wave and a sine wave having an amplitude ratio set at each value of a modulation factor, and selecting one pattern corresponding to an instructed modulation factor, and a unit for applying a controlled voltage, set at low and high levels in response to first and second periods of the selected pattern, to a generator. The triangular wave has a cycle duration obtained by dividing the cycle duration of the generator by product of 3 and odd number, a crest having a level higher than the sine wave at a timing of each first period, and a trough having a level lower than the sine wave at a timing of each second period.

24 Claims, 30 Drawing Sheets

U.S. PATENT DOCUMENTS

| | | | |
|---|---|---|---|
| 6,844,697 B2* | 1/2005 | Masaki et al. | 318/721 |
| 7,071,639 B2* | 7/2006 | Ochiai et al. | 318/139 |
| 7,317,292 B2* | 1/2008 | Iura et al. | 318/434 |
| 7,567,048 B2* | 7/2009 | Shin et al. | 318/400.24 |
| 2003/0020428 A1* | 1/2003 | Masaki et al. | 318/727 |
| 2003/0020429 A1* | 1/2003 | Masaki et al. | 318/727 |
| 2006/0091835 A1* | 5/2006 | Ochiai et al. | 318/139 |
| 2007/0029963 A1* | 2/2007 | Iura et al. | 318/811 |
| 2008/0089444 A1* | 4/2008 | Shin et al. | 375/326 |
| 2010/0141192 A1* | 6/2010 | Paintz et al. | 318/400.33 |
| 2010/0277149 A1* | 11/2010 | Furutani et al. | 323/282 |

FOREIGN PATENT DOCUMENTS

| | | |
|---|---|---|
| JP | 01-129774 | 5/1989 |
| JP | H07-227085 | 8/1995 |
| JP | 09-047100 | 2/1997 |
| JP | 10-337036 | 12/1998 |

OTHER PUBLICATIONS

Japanese Office Action dated May 24, 2011, issued in corresponding Japanese Application No. 2009-251333 with English Translation.

* cited by examiner

FIG. 3

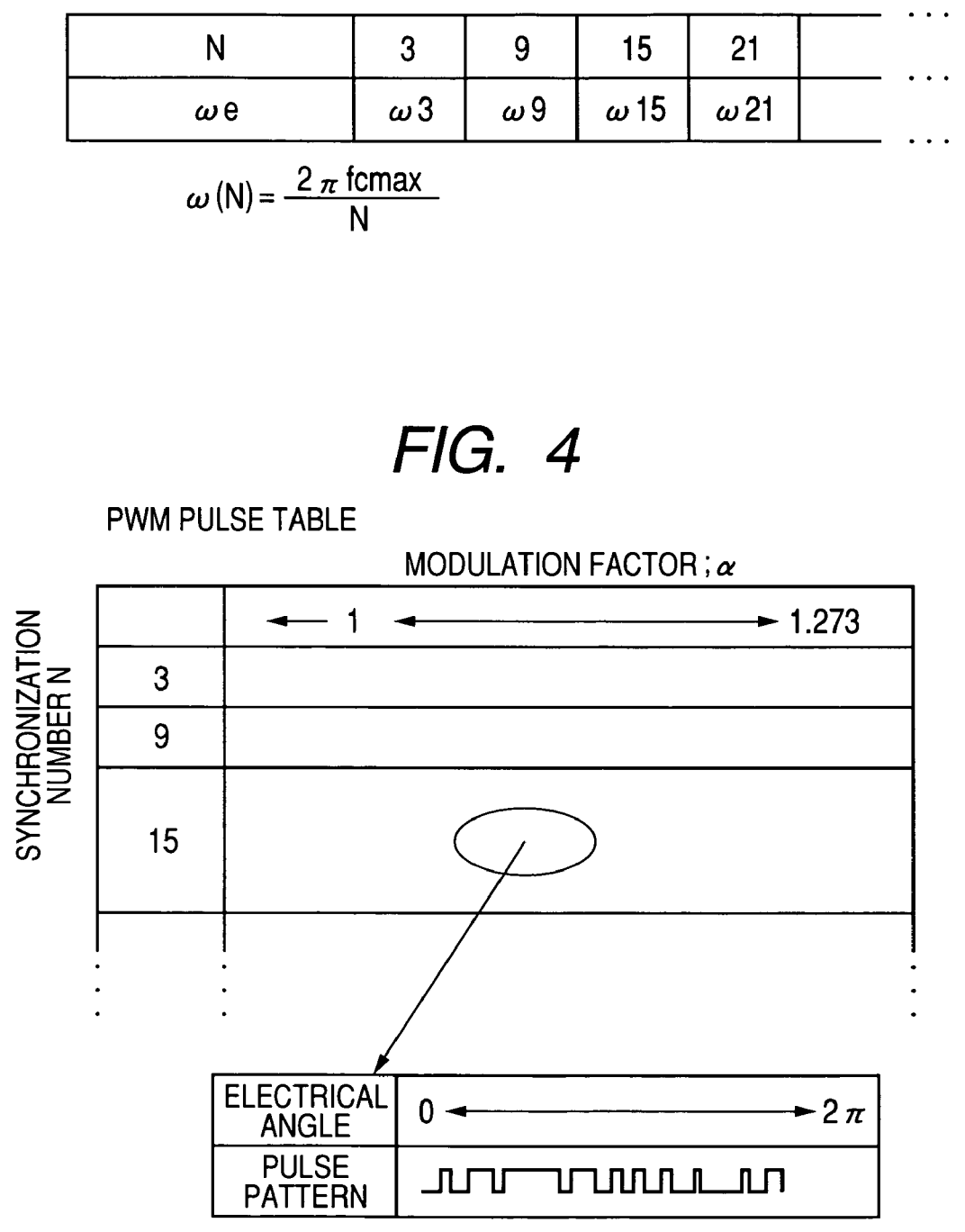

| N | 3 | 9 | 15 | 21 | ... |
|---|---|---|----|----|-----|
| ωe | ω3 | ω9 | ω15 | ω21 | ... |

$$\omega(N) = \frac{2\pi f_{cmax}}{N}$$

FIG. 4

PWM PULSE TABLE

MODULATION FACTOR ; $\alpha$

| SYNCHRONIZATION NUMBER N | ← 1 ←————→ 1.273 |
|---|---|
| 3 | |
| 9 | |
| 15 | |
| ⋮ | |

| ELECTRICAL ANGLE | 0 ←————→ 2π |
|---|---|
| PULSE PATTERN | ⎍⎍⎍⎍⎍⎍⎍⎍⎍ |

FIG. 8

| N | MAXIMUM NUMBER OF PULSES | $\delta$ | $\theta$ | $\beta$ |
|---|---|---|---|---|
| 3 | 3 | 0 | 1 | 6 |
| 9 | 5 | 1 | 2 | 14 |
| 15 | 9 | 3 | 4 | 30 |
| 21 | 11 | 4 | 5 | 38 |
| 27 | 15 | 6 | 7 | 54 |
| 33 | 17 | 7 | 8 | 62 |
| 39 | 21 | 9 | 10 | 78 |
| 45 | 23 | 10 | 11 | 86 |
| 51 | 27 | 12 | 13 | 102 |

FIG. 9A

| ANGLE (PHASE) OF SINE WAVE | $\beta_1$ | $\beta_2$ | $\beta_3$ | ... | $\beta_{2m}$ | $\beta_{2m+1}$ | $\beta_{2m+2}$ | $\beta_{2m+3}$ | ... | $\beta_{2(2m+1)-1}$ | $\beta_{2(2m+1)}$ | $\beta_{2(2m+1)+1}$ |
|---|---|---|---|---|---|---|---|---|---|---|---|---|
| PULSE EDGE | $\theta_1$ | $\delta_1-\theta_1$ | $\delta_1+\theta_1$ | ... | $\delta_m-\theta_{m+1}$ | $\delta_m+\theta_{m+1}$ | $\pi-\beta_{2m+1}$ | $\pi-\beta_{2m}$ | ... | $\pi-\beta_2$ | $\pi-\beta_1$ | $\pi$ |
| | ← | → | ← | | ← | → | ← | → | | ← | → | ← |
| ANGLE (PHASE) OF SINE WAVE | $\beta_{2(2m+1)+2}$ | $\beta_{2(2m+1)+3}$ | $\beta_{3(2m+1)+1}$ | ... | $\beta_{3(2m+1)}$ | $\beta_{3(2m+1)+1}$ | $\beta_{3(2m+1)+2}$ | $\beta_{3(2m+1)+3}$ | ... | $\beta_{4(2m+1)-1}$ | $\beta_{4(2m+1)}$ | $\beta_{4(2m+1)+1}$ | $\beta_{4(2m+1)+2}$ |
| PULSE EDGE | $\pi+\beta_1$ | $\pi+\beta_2$ | $\pi+\beta_3$ | ... | $\pi+\beta_{2m}$ | $\pi+\beta_{2m+1}$ | $2\pi-\beta_{2m+1}$ | $2\pi-\beta_{2m}$ | ... | $2\pi-\beta_2$ | $2\pi-\beta_1$ | $2\pi$ |
| | → | ← | → | | → | ← | → | ← | | → | ← | → |

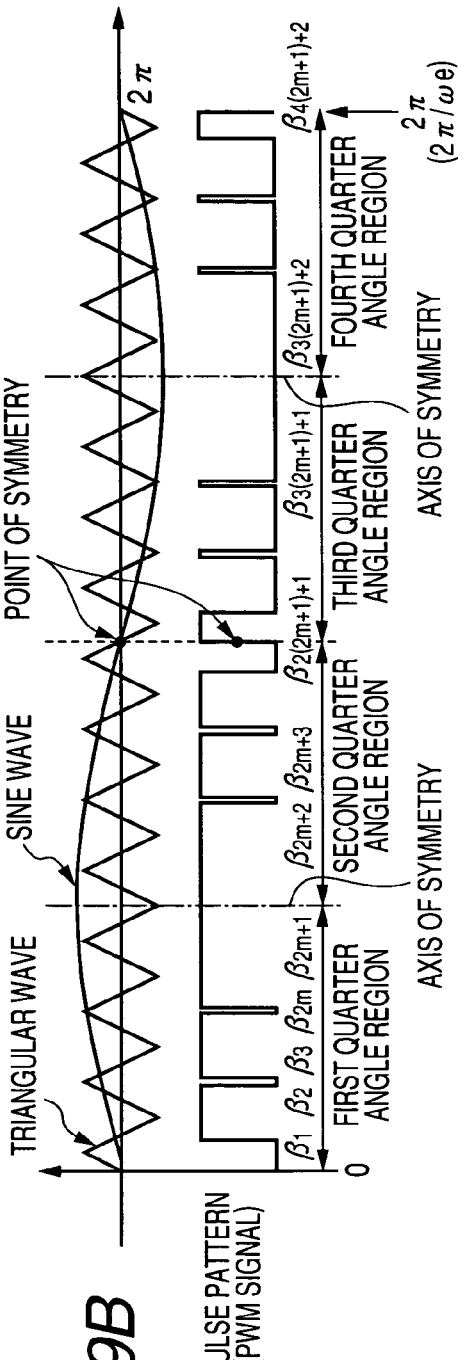

FIG. 9B

CONTROL DEVICE FOR ELECTRIC ROTATING MACHINE AND METHOD OF CONTROLLING THE MACHINE

CROSS-REFERENCE TO RELATED APPLICATION

This application is based, upon and claims the benefit of priority of the prior Japanese Patent Application 2008-303626 filed on Nov. 28, 2008 and the prior Japanese Patent Application 2009-251333 filed on Oct. 30, 2009, so that the contents of which are incorporated herein by reference.

BACKGROUND OF THE INVENTION

1. Field of the Invention

The present invention relates to a control device which controls a controlled variable of a multiphase electric rotating machine by controlling switching elements of a power inverter circuit through which terminals of the electric rotating machine are electrically connected with positive and negative electrodes of a direct current power source, and also relates to a method of controlling the electric rotating machine by using the control device.

2. Description of Related Art

A control device for a three-phase motor has been used. For example, to control three phase currents, actually flowing through respective phase windings of the motor, to instructed values under the feed-back control, this device performs a pulse width modulation (PWM) control, based on triangular-pulse wave comparison, for the motor. In this PWM control, instructed values of voltages to be applied from an inverter to the respective phase windings of the motor are calculated, and switching elements of the inverter are controlled based on differences between the level of a carrier signal shaped in a triangular wave and the instructed voltage values. Therefore, the phase voltages applied to the phase windings can be controlled to the instructed values, so that phase currents flowing through the phase windings can be controlled to desired values.

However, when the motor is set in a high rotation speed region so as to generate a high torque at a high rotation speed, the amplitude of the instructed phase voltage is increased so as to be equal to or higher than a half of an input voltage of the inverter. Therefore, in the high rotation speed region of the motor, it is difficult to control the voltage, actually outputted from the inverter, to the instructed value under the PWM control.

To perform the control for the motor in the high rotation speed region, the rectangular wave control has been used in place of the PWM control. In this rectangular wave control, the on-off period of each switching element of the inverter is set to be substantially the same as the rotational cycle duration of the motor denoting the period of time required for the rotation of $2\pi$ expressed by electrical angle. The on-off period is defined as the reciprocal number of the on-off repetition frequency. However, the ratio (hereinafter, called voltage utilization ratio) of a controlled voltage outputted from the inverter to a voltage inputted to the inverter becomes large in the rectangular wave control, as compared with the maximum voltage utilization ratio of 1/2 in the PWM control. The voltage utilization ratio in the PWM control is maximized when the amplitude of the controlled voltage becomes 1/2 of the voltage inputted to the inverter.

Therefore, when one of the PWM control and the rectangular wave control is switched to the other one in response to a change of the torque required of the motor, the voltage utilization ratio is discontinuously changed. In this case, the torque generated in the motor becomes unstable due to this discontinuous change.

To continuously change the voltage utilization ratio even when the operation of the motor is shifted to the high rotation speed region, Published Japanese Patent First Publication No. H09-047100 discloses a control device for a motor. In this device, d- and q-axis components of an instructed voltage defined on the dq rotational coordinates system are calculated from an instructed current, determined based on a target torque, for the current feed-back control. When the amplitude of the controlled voltage outputted from an inverter to a three-phase motor is equal to or higher than a half of the voltage inputted to the inverter, the inverter is operated according to either a phase of the controlled voltage, calculated from the instructed voltage, or one of pulse patterns of a voltage signal stored in a read only memory (ROM). Each pulse pattern is formed to be appropriate to one value of the voltage utilization ratio. Therefore, the voltage utilization ratio in the control based on the pulse patterns of the ROM can be increased so as to approach the value obtained in the rectangular wave control.

This Publication also discloses that each of the pulse patterns, used until the rectangular wave control is performed, is designed so as to minimize higher harmonic waves of the controlled voltage applied to the motor.

However, the pulse pattern disclosed in the Publication considerably differs from the pulse pattern in the PWM control based on triangular-pulse wave comparison. In this case, when one of the pulse pattern control based on pulse patterns and the PWM control is switched to the other one to turn on and off the switching elements of the inverter under the selected control, controllability of the control device for the output voltage of the inverter is sometimes lowered. Therefore, it is required to heighten this controllability.

Further, the inverter generally has switching elements of an upper arm connected with the positive electrode of a power source and switching elements of a lower arm connected with the negative electrode of the source, and two switching elements of the arms are serially connected with each other for each phase. The two switching elements of the arms are alternately turned on and off according to a pulse pattern. In this case, the inverter easily causes a short circuit between two switching elements of the arms. To prevent this short circuit, the timing of instructing the turn-on operation to each switching element of one arm is generally delayed by a dead time from the timing of instructing the turn-off operation to the corresponding switching element of the other arm. Therefore, it is required to set the pulse width in the pulse pattern such that two switching elements serially connected with each other are simultaneously set in the off state at least during the dead time. However, when the rotational speed in the motor is increased, the off period corresponding to the distance between adjacent pulses in the pulse pattern sometimes becomes lower than a limit value required to set the two switching elements in the off state together during the dead time. In this case, the switching elements cannot be turned on and off according to the pulse pattern, and the three-phase voltage actually applied to the motor is not controlled to an instructed value. As a result, controllability of the control device for the three-phase motor is undesirably lowered.

Therefore, it is preferable to heighten this controllability while the switching elements are set in the off state together by the dead time or more before one of the switching elements is turned on.

SUMMARY OF THE INVENTION

A main object of the present invention is to provide, with due consideration to the drawbacks of the conventional control device, a control device which controls a controlled variable of an electric rotating machine so as to maintain a high controllability for the machine, even when the machine is operated in an operating state corresponding to a high modulation factor, by controlling a power inverter circuit applying a controlled voltage to the machine.

A subordinate object of the present invention is to provide a method of controlling the machine.

According to the first aspect of this invention, the object is achieved by the provision of a control device which controls a controlled variable of an electric rotating machine by controlling a power inverter circuit applying a controlled voltage to the electric rotating machine, comprising a pattern preparing unit preparing a pattern having a level changed with time for each of values of a modulation factor, a determining unit determining phase information of the controlled voltage and an instructed value of the modulation factor, a selecting unit selecting the pattern, corresponding to the instructed value of the modulation factor, from the patterns of the pattern preparing unit, and a control unit controlling the controlled variable of the electric rotating machine by controlling the power inverter circuit such that the controlled voltage of the power inverter circuit is changed with time according to the selected pattern while adjusting a phase of the controlled voltage according to the phase information. The pattern preparing unit prepares a triangular wave having a cycle duration, which is equal to a value obtained by dividing an electrical angle cycle duration of the electric rotating machine by an integral number, and prepares each pattern as a triangular wave quasi-comparison pattern so as to have both a first period of a first level, depending on the corresponding value of the modulation factor and including a timing synchronized with a crest point or a trough point of the triangular wave, and a second period of a second level, depending on the corresponding value of the modulation factor and including a timing synchronized with the other point of the triangular wave. The control unit controls the power inverter circuit to apply a low level of the controlled voltage to the electric rotating machine in response to the first period of the selected triangular wave quasi-comparison pattern and to apply a high level of the controlled voltage to the electric rotating machine in response to the second period of the selected triangular wave quasi-comparison pattern.

In the triangular wave comparison pattern control performed without using any pattern, one electrical angle cycle duration of the generator is set at the product of the cycle duration of the triangular wave and the integral number. Therefore, each low level of the controlled voltage is set in synchronization with one crest or trough point of the triangular wave, and each high level of the controlled voltage is set in synchronization with another point of the triangular wave. Further, the fundamental wave of the controlled voltage can be preferably controlled. However, when the operation of the machine is transferred to the operating state corresponding to a high modulation factor, the controlled voltage is discontinuously changed. Therefore, it is difficult to maintain a high controllability for the machine.

In this invention, the first period of each triangular wave quasi-comparison pattern includes a timing synchronized with one crest or trough point of the triangular wave, and the second period of each triangular wave quasi-comparison pattern includes a timing synchronized with the other point of the triangular wave. The low level of the controlled voltage is applied to the machine in response to the first period of the pattern, while the high level of the controlled voltage is applied to the machine in response to the second period of the pattern. Therefore, the pulse pattern control based on the selected triangular wave quasi-comparison pattern is performed so as to imitate the triangular wave comparison pattern control.

Because of this imitation, the switching between the pulse pattern control and the triangular wave comparison pattern control can be smoothly performed. Further, the fundamental wave of the controlled voltage can be preferably controlled in the pulse pattern control. Moreover, in the pulse pattern control, even when the operation of the machine is transferred to the operating state corresponding to a high modulation factor, the control device can control the machine while maintaining a high controllability for the machine.

According to the second aspect of this invention, the object is achieved by the provision of a method of controlling a controlled variable of an electric rotating machine by controlling a power inverter circuit applying a controlled voltage to the electric rotating machine, comprising the steps of preparing a pattern having a level changed with time for each of values of a modulation factor, determining phase information of the controlled voltage and an instructed value of the modulation factor, selecting the pattern, corresponding to the instructed value of the modulation factor, from the prepared patterns, and controlling the controlled variable of the electric rotating machine by controlling the power inverter circuit such that the controlled voltage of the power inverter circuit is changed with time according to the selected pattern while adjusting a phase of the controlled voltage according to the phase information. The preparing step includes preparing a triangular wave having a cycle duration, which is equal to a value obtained by dividing an electrical angle cycle duration of the electric rotating machine by an integral number, and preparing each pattern as a triangular wave quasi-comparison pattern so as to have both a first period of a first level, depending on the corresponding value of the modulation factor and including a timing synchronized with a crest point or a trough point of the triangular wave, and a second period of a second level, depending on the corresponding value of the modulation factor and including a timing synchronized with the other point of the triangular wave. The controlling step includes controlling the power inverter circuit to apply a low level of the controlled voltage to the electric rotating machine in response to the first period of the selected triangular wave quasi-comparison pattern and to apply a high level of the controlled voltage to the electric rotating machine in response to the second period of the selected triangular wave quasi-comparison pattern.

With these steps, even when the machine is operated in an operating state corresponding to a high modulation factor, the controlled variable of the machine can be controlled by controlling a power inverter circuit applying a controlled voltage to the machine, and a high controllability for the machine can be maintained.

BRIEF DESCRIPTION OF THE DRAWINGS

FIG. 3 shows a table indicating the relation between a synchronization number and an electrical angular speed of the generator in a synchronization number determining unit shown in FIG. 2;

FIG. 4 is a view showing regions of a PWM pulse table in a PWM signal producing unit shown in FIG. 2;

FIG. 8 is a view showing the maximum number of pulses and the maximum number of parameters in one pulse pattern in relation to the synchronization number;

FIG. 9A shows a table indicating the conversion of a quarter portion of pulse pattern to one pulse pattern;

FIG. 9B shows one pulse pattern formed by referring to the conversion table;

DETAILED DESCRIPTION OF THE PREFERRED EMBODIMENTS

Figure 1:
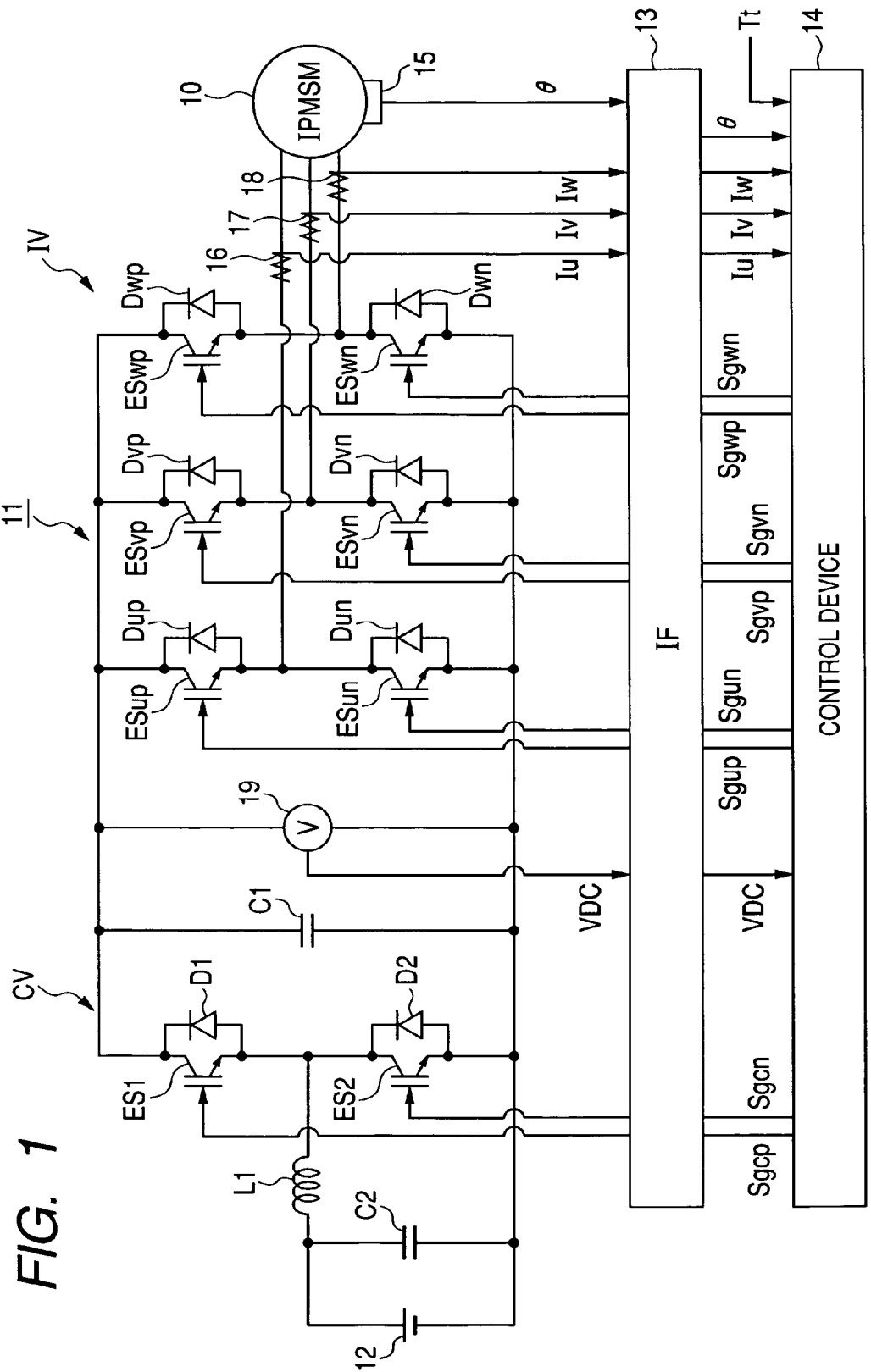
FIG. 1 is a view showing the structure of a control system for a motor generator according to the first embodiment of the present invention.

Embodiments of the present invention will now be described with reference to the accompanying drawings, in which like reference numerals indicate like parts, members or elements throughout the specification unless otherwise indicated.

First Embodiment

FIG. 1 is a view showing the structure of a control system for a motor generator according to the first embodiment.

As shown in FIG. 1, electric power of a high-voltage battery 12 is adjusted in a control system 11 and is supplied to a motor generator 10. This power generating system including the generator 10, the system 11 and the battery 12 is, for example, mounted on a hybrid vehicle. The generator 10 represents an electric rotating machine whose feature is the presence of magnetic saliency. More specifically, the generator 10 is a three-phase interior permanent magnet synchronous motor (IPMSM). This motor has a rotor, permanent magnets having salient poles and being disposed around a shaft of the rotor so as to be protruded from the shaft, a stator surrounding the rotor, and three windings (i.e., a u-phase winding, a v-phase winding and a w-phase winding) wound on the stator.

The control system 11 has a boost converter CV for boosting the voltage (e.g., 288V) of the battery 12 to a supply voltage VDC of a direct current, an inverter IV, representing a power inverter circuit, for producing a controlled voltage Vc from the supply voltage VDC and supplying a three-phase electric current (a u-phase current Iu, a v-phase current Iv and a w-phase current Iw defined in the uvw coordinates system) set at the controlled voltage Vc to the generator 10 as controlled values, a voltage sensor 19 for detecting the supply voltage VDC, a capacitor C1 for smoothing fluctuations of the supply voltage VDC, current sensors 16, 17 and 18 for detecting the phase currents Iu, Iv and Iq set at the controlled voltage Vc and supplied to the generator 10, a rotational angle sensor 15 for detecting a rotational angle θ of the rotor of the generator 10 rotated in response to the supplied phase currents as a controlled variable of the generator 10, an interface 13, and a control device 14.

The control device 14 is a low voltage system to be operated by a low voltage. The device 14 receives information of the supply voltage VDC, information of the phase currents Iu, Iv and Iw and information of the rotational angle θ from the sensors 15 to 19 through the interface 13. The device 14 produces control signals (or actuating signals) Scp, Scn, Sgcp, Sgcn, Sgup, Sgun, Sgvp, Sgvn, Sgwp and Sgwn from the received information and information of a target torque Tt. The device 14 controls the converter CV to output the supply voltage VDC according to the control signals Scp and Scn. The device 14 controls the inverter IV to convert the supply voltage VDC into the controlled voltage Vc, having a target amplitude and a controlled phase, according to the control signals Sgcp, Sgcn, Sgup, Sgun, Sgvp, Sgvn, Sgwp and Sgwn. Therefore, the device 14 controls the torque (i.e., controlled variable), actually generated in the generator 10 from the controlled voltage Vc, to the target torque Tt.

The supply voltage VDC is set at 666V or less under control of the device 14. The rotational angle θ is expressed by mechanical angle. The target torque Tt is determined according to operating conditions of the vehicle.

The inverter IV has u-phase switching elements ESup and ESun serially connected with each other, v-phase switching elements ESvp and ESvn serially connected with each other, w-phase switching elements ESwp and Swn serially connected with each other, and diodes Dup, Dun, Dvp, Dvn, Dwp and Dwn connected with the respective switching elements in parallel. Each switching element is made of an n-p-n insulated-gate bipolar transistor (IGBT). The emitters of the switching elements ESup, ESvp and ESwp are connected with the collectors of the respective switching elements ESun, ESvn and ESwn. The collectors of the switching elements ESup, ESvp and ESwp are connected with the higher voltage terminal of the converter CV, while the emitters of the switching elements ESun, ESvn and ESwn are connected with the lower voltage terminal of the converter CV. The anode of each diode is connected with the emitter of the corresponding switching element. The connecting point of the elements ESup and ESun is connected with the u-phase stator winding of the generator 10, and the sensor 16 detects the u-phase current Iu of the winding and outputs information of the u-phase current Iu. The connecting point of the elements ESvp and ESvn is connected with the v-phase stator winding of the generator 10, and the sensor 17 detects the v-phase current Iv of the winding and outputs information of the v-phase current Iv. The connecting point of the elements ESwp and ESwn is connected with the w-phase stator winding of the generator 10, and the sensor 18 detects the w-phase current Iw of the winding and outputs information of the w-phase current Iw. The u-phase current Iu flows along a u-phase axis, the v-phase current Iv flows along a v-phase axis, and the w-phase current Iw flows along a w-phase axis.

As is well known, the converter CV has two switching elements ES1 and ES2 serially connected with each other, two diodes D1 and D2 connected with the respective switching elements, a capacitor C2 and an inductor L1.

The control device 14 sends the control signals Sgcp and Sgcn to bases of the switching elements of the converter CV, sends the control signals Sgup and Sgun to bases of the respective switching elements ESup and Esun, sends the control signals Sgvp and Sgvn to bases of the respective switching elements ESvp and Esvn, and sends the control signals Sgwp and Sgwn to bases of the respective switching elements ESwp and Eswn.

Figure 2:
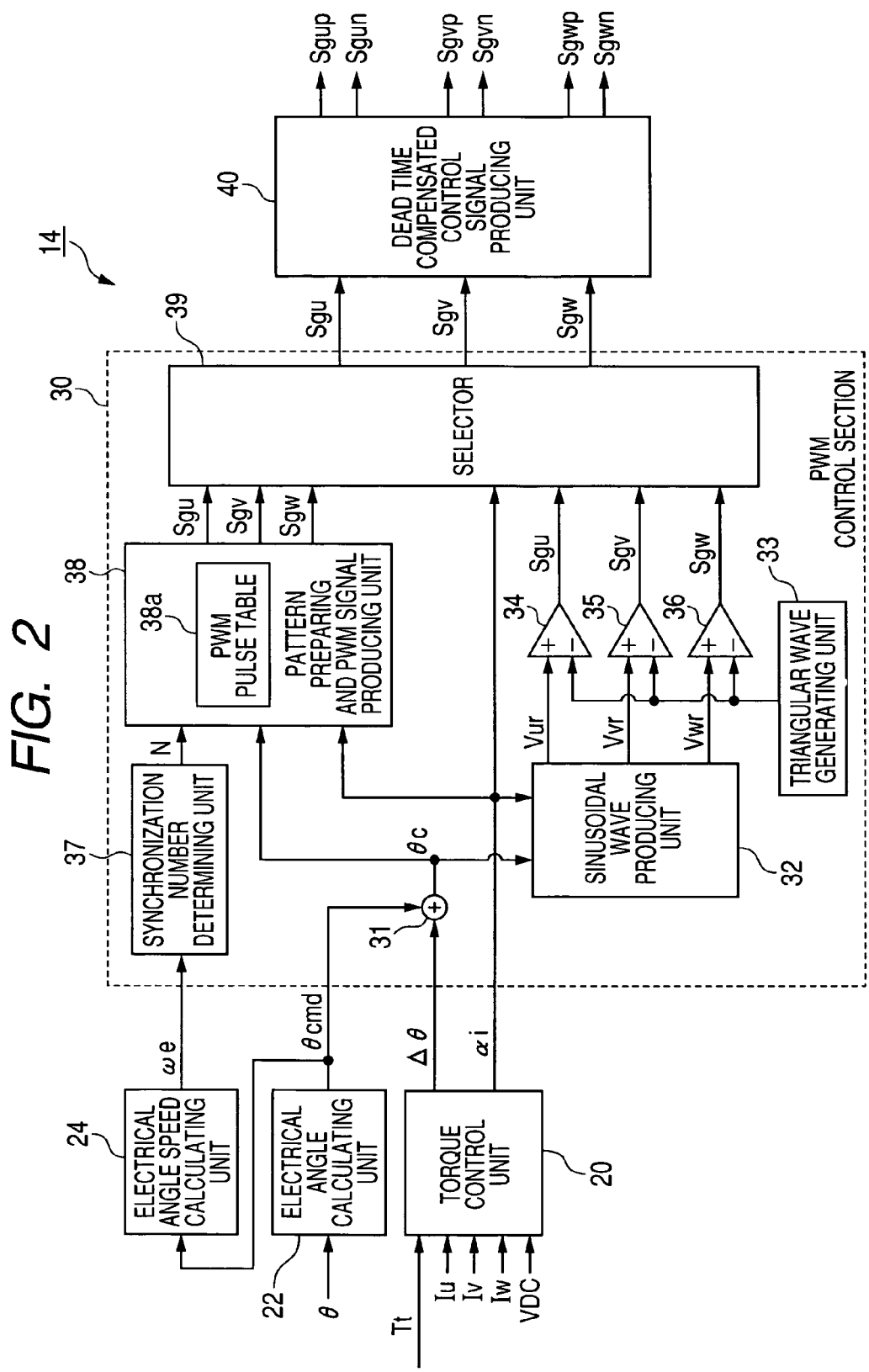
FIG. 2 is a block diagram of a control device arranged in the control system shown in FIG. 1.

FIG. 2 is a block diagram of a portion of the control device 14 producing control signals sent to the inverter IV. As shown in FIG. 2, the device 14 has a torque control unit 20 for calculating an instructed value θcmd of the phase of the controlled voltage Vc and an instructed value of a modulation factor (hereinafter, called an instructed modulation factor) αi as controlled values from a target torque Tt determined in an engine control section (not shown), the phase currents Iu, Iv and Iq detected by the sensors 16 to 18 and the supply voltage VDC detected by the sensor 19, an electrical angle calculating unit 22 for calculating an electrical angle θe of the rotor of the generator 10 from the rotational angle θ detected by the sensor 15, an electrical angular speed calculating unit 24 for calculating an electrical angular speed ωe of the rotor of the generator 10 from the electrical angle θe, a pulse wave modulation (PWM) control section 30 for producing PWM signals Sgu, Sgv and Sgw, of which phases are shifted from one another by 2π/3 radians in electrical angle, from the instructed phase value θcmd of the controlled voltage Vc, the instructed modulation factor αi, the electrical angle θe and the electrical angular speed ωe, and a dead time compensated control signal producing unit 40 for producing a delayed signal from each PWM signal by delaying the PWM signal by a dead time Td, producing the pair of control signals Sgup and Sgun, the pair of control signals Sgvp and Sgvn and the pair of control signals Sgwp and Sgwn from the pair of PWM signal Sgu and its delayed signal, the pair of PWM signal Sgv and its delayed signal and the pair of PWM signal Sgw and its delayed signal, respectively, such that each pulse (i.e., logic H) of one control signal is spaced from adjacent pulses (i.e., logic H) of the other control signal in each pair at least by the dead time Td.

As described later in detail, the PWM signals Sgu, Sgv and Sgw are produced according to either a triangular wave comparison PWM control, in which a sine wave defined in an angular range from 0 to 2π radians is compared with a triangular-pulse wave (hereinafter, called a triangular wave), or a pulse pattern control imitating the PWM control. The modulation factor denotes a ratio of the amplitude of the sine wave and the amplitude of the triangular wave.

In the unit 20, to control a d-axis component and a q-axis component of a current actually flowing through the generator 10 to d- and q-axis components of an instructed current determined by the target torque Tt under feed-back control, d- and q-axis components of an instructed voltage are calculated as directly-controlled values from the difference between the actual current and the instructed current. Then, the instructed phase value θcmd of the controlled voltage Vc is determined from the instructed voltage, and the instructed modulation factor αi is determined from the instructed voltage and the supply voltage VDC.

The d-axis and q-axis are defined on the dq rotational coordinates system rotated with the rotor of the generator 10. The d-axis is set so as to be directed from one S magnetic pole to the corresponding N magnetic pole in the rotor. The q-axis is set to be orthogonal to the d-axis on a plane perpendicular to the rotation axis of the rotor.

The section 30 selects a PWM control based on triangular wave comparison (hereinafter, called a triangular wave comparison PWM control) or a pulse pattern control based on a triangular wave quasi-comparison pattern (hereinafter, called a pulse pattern) according to the instructed modulation factor αi and produces the PWM signals under the selected control.

More specifically, to perform the triangular wave comparison PWM control for the inverter IV and the generator 10, the section 30 has an adder 31, a sinusoidal wave producing unit 32, a triangular wave generating unit 33, a v-phase comparator 34, a u-phase comparator 35 and a w-phase comparator 35. The adder 31 adds the electrical angle θe and the instructed phase value θcmd together to obtain a controlled phase θc of the controlled voltage Vc as phase information (or angle information). Therefore, the controlled voltage Vc outputted from the inverter IV has the controlled phase θc in the PWM control.

The unit 33 generates a triangular wave having a series of pulses at a predetermined amplitude. Each pulse of the triangular wave is formed in an isosceles triangle so as to have the level increasing speed and the level decreasing speed equal to each other. This speed is defined as a change of the level with respect to electrical angle. In other words, each of the increasing and decreasing speeds denotes a ratio of the level change to the change of electrical angle.

The unit 32 produces a u-phase component Vur, a v-phase component Vvr and a w-phase component Vwr of a voltage, instructed to the generator 10, from the controlled phase θc of the controlled voltage Vc and the instructed modulation factor αi. The level of each phase component is changed with time in the sinusoidal shape. The ratio of the amplitude of each phase component to the amplitude of the triangular wave generated in the unit 33 is set at the instructed modulation factor αi. The phase components Vur, Vvr and Vwr of the instructed voltage are defined in the uvw coordinates system of u-, v- and w-phase axes, and phases of the phase components are shifted by $2\pi/3$ radians from one another. The original point of this system is placed on the rotation axis of the rotor of the generator 10.

The comparator 34 compares the level of the u-phase instructed voltage Vur with the level of the triangular wave and produces a PWM signal Sgu according to this comparison. The comparator 35 compares the level of the v-phase instructed voltage Vvr with the level of the triangular wave and produces a PWM signal Sgv according to this comparison. The comparator 36 compares the level of the w-phase instructed voltage Vwr with the level of the triangular wave and produces a PWM signal Sgw according to this comparison. More specifically, in each of the comparators 34 to 36, when the level of the phase component is higher than the level of the triangular wave, the level of the produced PWM signal is set at the high level. In contrast, when the level of the phase component is lower than the level of the triangular wave, the level of the PWM signal is set at the low level. Each of the PWM signals has a pulse string, and the pulse width in this pulse string is changed with the level of the instructed voltage formed in the sinusoidal shape. Therefore, the control based on these PWM signals is called the triangular wave comparison PWM control.

In contrast, to perform the pulse pattern control for the inverter IV and the generator 10, the section 30 has a synchronization number determining unit 37 and a pattern preparing and PWM signal producing unit 38 having a PWM pulse table 38a. The unit 37 determines a synchronization number N from the electrical angular speed ωe of the rotor. The setting of the synchronization number N will be described with reference to FIG. 3.

FIG. 3 shows a table of the synchronization number N prepared in the unit 37. As shown in FIG. 3, the unit 37 presets the synchronization number N for each of upper limits (i.e., thresholds) ω(N) (e.g., ω3, ω9, ω15, . . . of the electrical angular speed ωe. Each time the electrical angular speed ωe of the generator 10 exceeds one upper limit ω(N), the synchronization number N determined in the unit 37 is decreased. The synchronization number N is set at the product of an odd number and 3. For example, when the speed we is higher than the upper limit ω21 and is equal to or lower than ω15, the synchronization number N is set at the value of 15. When the speed we is higher than ω15 and is equal to or lower than ω9, the synchronization number N is set at the value of 9.

The reason that the synchronization number N is set at the product of 3 and an odd number will be described. In the synchronized triangular wave comparison PWM control, the cycle duration (i.e., the reciprocal number of rotational frequency) of the generator 10 expressed by electrical angle is equal to the product of the cycle duration (i.e., the reciprocal number of frequency) of a triangular wave and an integral number. When this integral number is set at the product of 3 and an odd number, the positive and negative portions of the alternating current voltage outputted from the inverter IV can be symmetric to each other. Therefore, it is well known that the fundamental wave of the controlled voltage Vc formed by this PWM control can become similar to the sine-wave shape with high precision. In this embodiment, as described later in detail, a pulse pattern imitating the waveforms of the PWM signals produced in the comparators 34 to 36 is prepared to perform the pulse pattern control. Therefore, the synchronization number N is set at the product of 3 and an odd number.

The upper limits ω(N) of the electrical angular speed ωe are preset based on the maximum value fcmax of the frequency fc of the triangular wave. Each upper limit ω(N) is expressed by $2\pi$fcmax/N. The maximum value fcmax is determined due to the following reason. In this embodiment, as described later in detail, each pulse of the pulse pattern is set in synchronization with a crest or trough point of a triangular wave. Each switching element of the inverter IV is turned on and off substantially in response to each pulse of the pulse pattern. Therefore, the inventors of this application acknowledge that the average switching period (i.e., the reciprocal number of the average switching frequency) in each switching element is almost equal to the cycle duration of the triangular wave. Further, when the switching frequency of the switching elements in the inverter IV is increased, the power loss in the inverter IV is also increased. To set the power loss in the inverter IV within an allowable range, the maximum frequency fcmax of the triangular wave corresponding to the allowable limit of the switching frequency is determined.

The unit 38 prepares a pulse pattern (i.e., a triangular wave quasi-comparison pattern) corresponding to each value of the modulation factor and each value of the synchronization number N in advance and stores the pulse patterns in the table 38a. Each pulse pattern is defined in an angle region ranging from 0 to $2\pi$. The unit 38 selects one pulse pattern, corresponding to the synchronization number N determined in the unit 37 and the instructed modulation factor αi of the unit 20, from the stored pulse patterns and produces PWM signals Sgu, Sgv and Sgw used for the pulse pattern control from the selected pulse pattern while adjusting the relation between the rotational angle of the rotor of the generator 10 and the phase of the PWM signals by using the phase information about the controlled phase θc of the controlled voltage Vc. The PWM signals are defined in the uvw coordinates system and have phases shifted from one another by $2\pi/3$ radians. Each PWM signal has a waveform shaped in a repeated pattern which is obtained by repeating the selected pulse pattern.

Because of the phase information, the phase of the controlled voltage Vc is adjusted such that the rotational angle (i.e., phase) of the generator 10 driven in response to the controlled voltage Vc is set at the controlled phase θc. That is, the angle region ranging from 0 to $2\pi$ in the selected pulse pattern corresponds to the rotational angle (i.e., phase) of the generator 10. In other words, the angle region of the pulse pattern corresponds to the electrical angle cycle duration of the generator 10.

FIG. 4 is a view showing regions of the PWM pulse table 38a corresponding to values of the synchronization number N and values of the modulation factor αi. As shown in FIG. 4, the table 38a of the unit 38 has regions corresponding to values of the synchronization number N and values of the modulation factor αi. The pulse pattern corresponding to each value of the synchronization number N and each value of the modulation factor αi is stored in the corresponding region of the table 38a. Each pulse pattern is formed in the angular range from 0 to $2\pi$ radians corresponding to one cycle duration of the rotor of the generator 10 expressed by electrical angle. The angle in each pulse pattern expressed by electrical angle corresponds to the phase θ of the generator 10.

The upper limit of the modulation factor αi is set at the value of 1.273 which is equal to the value of the modulation factor in the rectangular wave control. Because the upper limit of the modulation factor in the triangular wave comparison PWM control is equal to the value of 1, the lower limit of the modulation factor αi is set at a value slightly smaller than 1.

Figure 5:
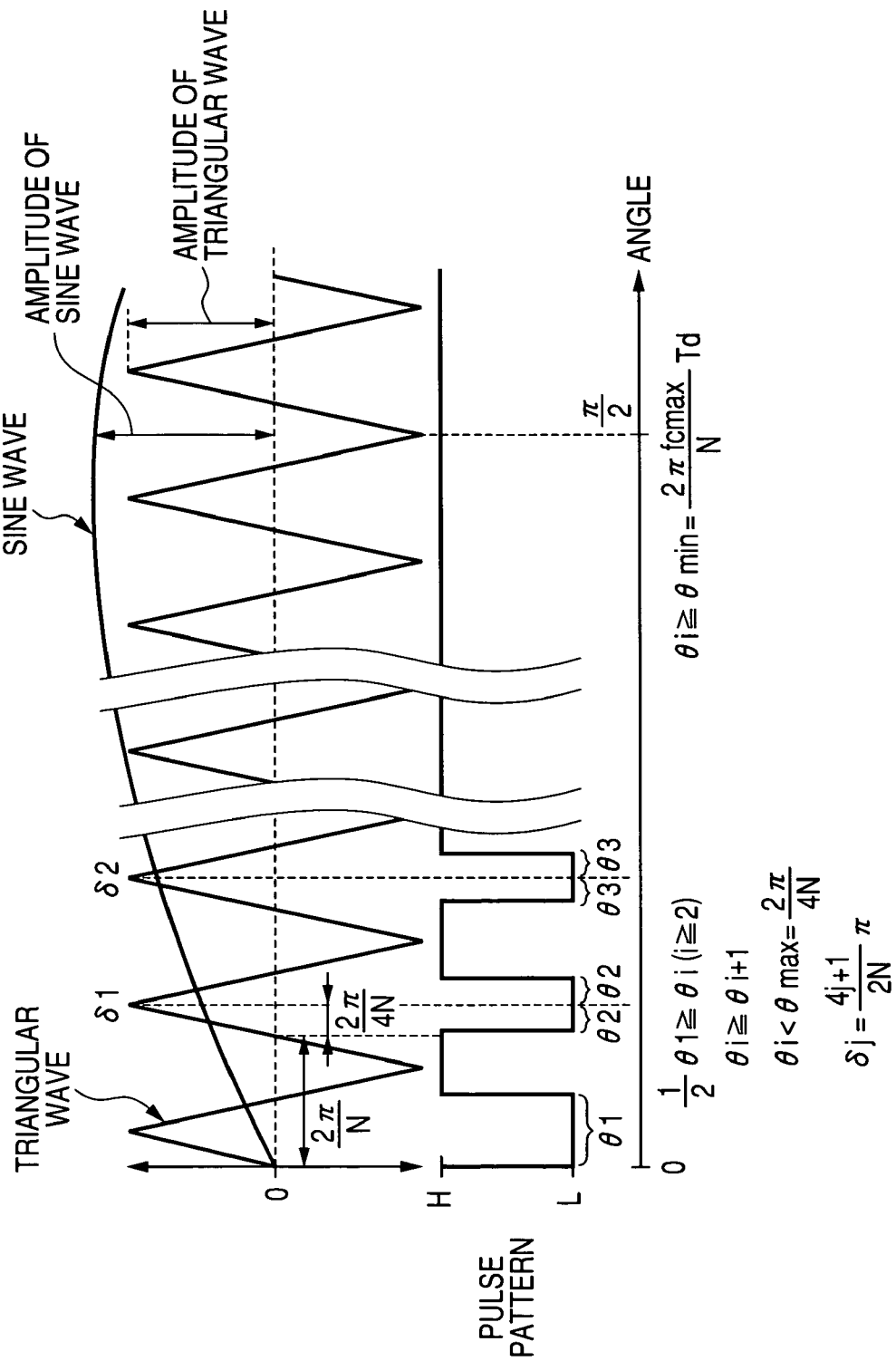
FIG. 5 is a view explanatorily showing a quarter of pulse pattern prepared in the PWM signal producing unit shown in FIG. 2.
Figure 6:
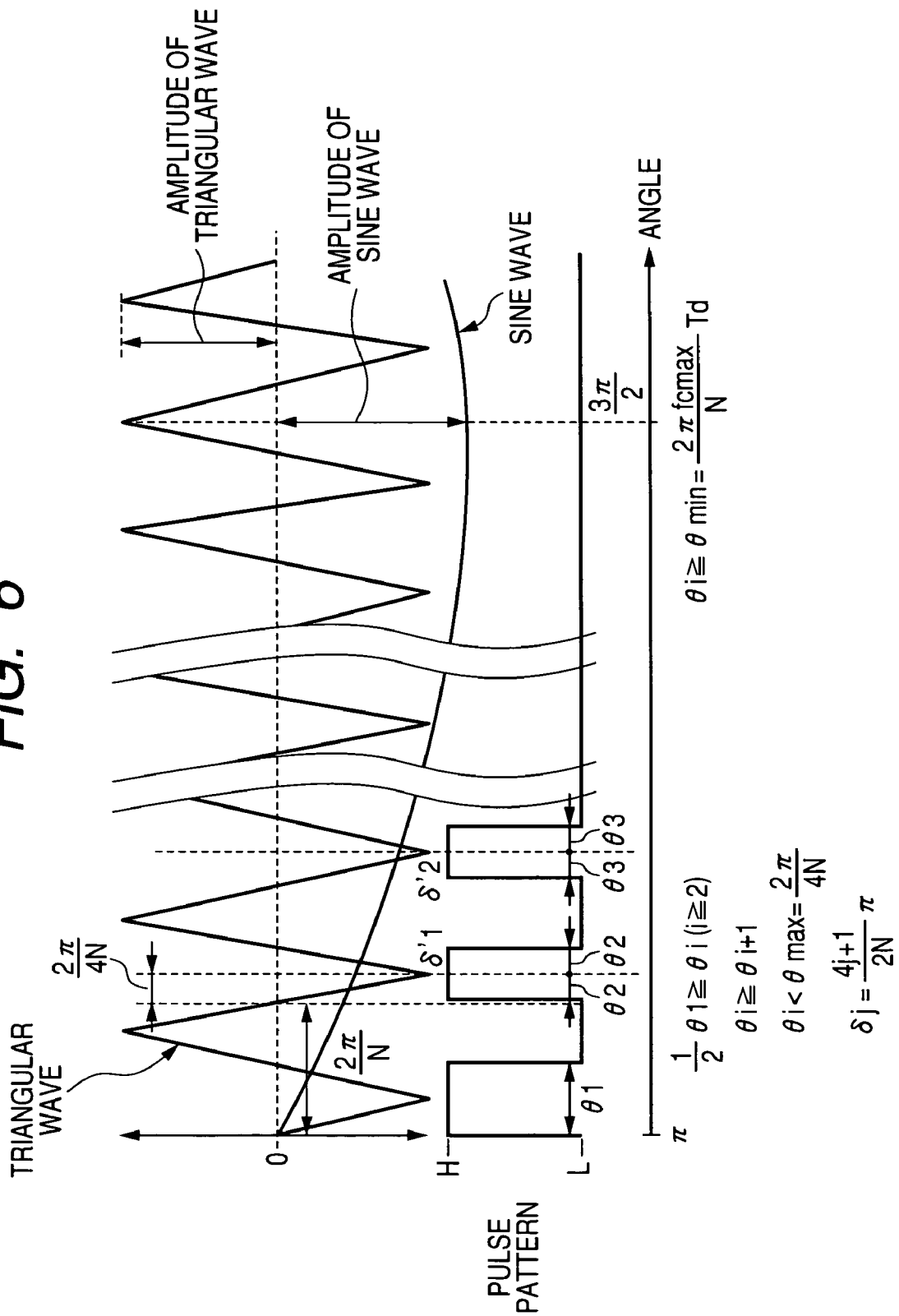
FIG. 6 is a view explanatorily showing another quarter of pulse pattern prepared in the PWM signal producing unit shown in FIG. 2.

The preparation of the pulse pattern for the pulse pattern control will be described in detail with reference to FIG. 5 and FIG. 6. FIG. 5 is a view explanatorily showing a quarter of one pulse pattern prepared in the unit 38 by comparing a triangular wave with a sine wave, while FIG. 6 is a view explanatorily showing another quarter of one pulse pattern prepared in the unit 38. Because of the symmetry of the sine wave with respect to angle, a quarter of pulse pattern is shown in FIG. 5 with the triangular wave and the sine wave in the angle region of the sine wave from 0 to π/2 radians, and another quarter of pulse pattern is shown in FIG. 6 with the triangular wave and the sine wave in the angle region of the sine wave from π to 3π/2 radians.

As shown in FIG. 5, the pulse pattern prepared for each value of the modulation factor is formed by comparing the level of a sine wave with the level of a triangular wave denoting a carrier signal in the angle range of the sine wave from 0 to 2π radians. The ratio of the amplitude of the sine wave to the amplitude of the triangular wave is set at the value of the modulation factor. The triangular wave has a string of triangular pulses. Each pulse of the triangular wave is shaped in an isosceles triangle so as to have a level increasing rate and a level decreasing rate per a unit electrical angle, and these rates are equal to each other. The cycle duration of the triangular wave is obtained by dividing the cycle duration (Ts=2π/ωe) of the sine wave (i.e., the electrical angle cycle duration of the generator 10) by the synchronization number N. The triangular wave is placed in the angle range of the sine wave so as to place the center of the amplitude of the sine wave at the center of the amplitude of the triangular wave. For example, at the angle of 0 radian in the sine wave, the level of the triangular wave is set at 0.

The angle range of the sine wave corresponds to the cycle duration 2π/ωe of the generator 10 expressed by electrical angle, so that each of the sine wave and the triangular wave can be thought of as a wave of which the level is changed with time. Further, the pulse pattern formed in the angle range from 0 to 2π radians by comparing the sine wave with the triangular wave corresponds to the electrical angle cycle duration 2π/ωe of the generator 10, so that the pulse pattern can be thought of as a pattern of which the level is changed with time.

The level of the sine wave corresponds to the level of each phase component of the instructed voltage produced in the unit 32. Therefore, the pulse pattern is formed so as to imitate the waveforms of the PWM signals produced in the units 34 to 36 for the triangular wave comparison PWM control, and the pulse pattern is used to produce PWM signals Sgu, Sgv and Sgw for the quasi-triangular wave comparison PWM control (i.e., pulse pattern control).

More specifically, a plurality of pulse width determining parameters θ1 and θi (i≧2) expressed by angle are determined so as to depend on the modulation factor. The determination of the parameters θ1 and θi will be described later in detail. The triangular wave has crest points corresponding to the highest level and trough points corresponding to the lowest level. In the first quarter angle region from 0 to π/2 radians, the phase δj of the (j+1)-th crest point is expressed fey δj= (4j+1)π/2N: j=1, 2, 3, . . . . When the level of the sine wave at the timing of each (j+1)-th crest point is lower than the level of the (j+1)-th crest point, a first period of the low level is set in the pulse pattern such that the first period includes a timing synchronized with the (j+1)-th crest point, Each first period is set such that the corresponding phase δj is placed at the center of the first period. The width of the first period corresponding to each i-th crest point is set at 2θi equal to twice the parameter θi. Further, another first period (i.e., specific first period) of the low level is set in the pulse pattern in the angle region from 0 to θ1, regardless of the first crest point of the triangular wave. That is, the first periods in the first quarter angle region are expressed by θ1 and 2θi. Moreover, each of other periods in the first quarter angle region is set as a second period of the high level. Therefore, the first periods and the second periods are alternately set in the first quarter angle region of the pulse pattern.

The pulse pattern in the second quarter angle region from π/2 to π radians is formed to be symmetric with the pulse pattern in the first quarter angle region with respect to the angle π/2.

The pulse pattern in the third quarter angle region from π to 3π/4 radians is shown in FIG. 6. In FIG. 6, the phase δ'j of the (j+1)-th trough point of the sine wave is expressed by δ'j=π+(4j+1)π/2N. When the level of the sine wave at the timing of each (j+1)-th trough point is higher than the level of the (j+1)-th trough point, a second period of the high level is set in the pulse pattern such that the second period includes at timing synchronized with the (j+1)th trough point. Each second period is set such that the phase δ'j is placed at the center of the second period. The width (i.e., pulse width) of the second period corresponding to each i-th trough point is set at 2θi equal to twice the parameter θi. Further, another second period (i.e., specific second period) of the high level is set in the pulse pattern in the angle region from π to π+θ1, regardless of the first trough point of the triangular wave. That is, the second periods in the third quarter angle region are expressed by θ1/ωe and 2θi/ωe. Each of other periods in the third quarter angle region is set as a first period of the low level. Therefore, the first periods and the second periods are alternately set in the third quarter angle region of the pulse pattern.

The pulse pattern in the forth quarter angle region from 3π/4 to 2π radians is formed to be symmetric with the pulse pattern in the third quarter angle region with respect to the angle 3π/4.

Therefore, the pulse pattern has the first periods and the second periods alternately placed, and one pulse is formed between adjacent first periods in each pair.

Because the first periods 2θi in the first and second quarter angle regions and the second periods 2θi in the third and fourth quarter angle regions are set in the pulse pattern so as to be symmetric with respect to the respective crest and trough points of the triangular wave, the number of parameters θ1 and θi required in the formation of the pulse pattern can be reduced.

Each of the PWM signals Sgu, Sgv and Sgw has a waveform which is set in a repeated pattern obtained by repeating the selected pulse pattern in the time direction of the cycle duration of the generator 10. Each PWM signal is set at the low level (logic L) during a period of time corresponding to each first period of the pulse pattern and is set at the high level (logic H) during a period corresponding to each second period. Each of control signals Sgup, Sgvp and Sgwp produced from the PWM signals in the unit 40 is set at the high level (logic H) in response to each second period of the pulse pattern to set the corresponding switching element ESup, ESvp or Eswp in the on period and to apply the controlled voltage Vc set at the high level to the generator 10. Each of control signals Sgun, Sgvn and Sgwn produced from the PWM signals in the unit 40 is set at the high level (logic H) in response to each first period of the pulse pattern to set the corresponding switching element ESun, ESvn or Eswn in the on period and to apply the controlled voltage vc set at the low level to the generator 10.

Each PWM signal is set at the low or high level during a period of time $\theta 1/\omega e$ or $2\theta i/\omega e$ corresponding to each period $\theta 1$ or $2\theta i$ of the pulse pattern. Therefore, the periods of the pulse pattern expressed by $\theta 1$ and $2\theta i$ in angle expression can be also expressed by $\theta 1/\omega e$ and $2\theta i/\omega e$ in time expression.

The waveform of each PWM signal for the triangular wave comparison PWM control matches or coincides with the shape of a sine wave. To produce the PWM signals, imitating the PWM signals for the triangular wave comparison PWM control, from the pulse pattern, the parameters $\theta 1$ and $\theta i$ ($i=2, 3, \ldots$) of the pulse pattern are determined so as to satisfy the following conditions.

The first imitating condition is the relation $\theta 1 \geq 2\theta i$ ($i \geq 2$). In each PWM signal for the triangular wave comparison PWM control, the period of the logic L is gradually shortened in the first quarter angle region ranging from 0 to $\pi/2$ radians. Therefore, the first periods $2\theta i$ subsequent to the first period $\theta 1$ in the first quarter angle region should be shorter than the first period $\theta 1$.

The second imitating condition is the relation $\theta i \geq \theta i_{-1}$. In each PWM signal for the triangular wave comparison PWM control, the period of the logic L is gradually shortened in the first quarter angle region ranging from 0 to $\pi/2$ radians. Therefore, the first period $2\theta i_{+1}$ should be shorter than the first period $2\theta i$ in the first quarter angle region.

Under these conditions, in the first quarter angle region, the first period in the pulse pattern is gradually shortened with the level of the sine wave so as to gradually lengthen the second period with the level of the sine wave. Therefore, the pulse pattern for the pulse pattern control can imitate the pulse strings of the PWM signals produced for the triangular wave comparison PWM control.

The third imitating condition is the relation $\theta i < \theta \max$ ($\theta \max = 2\pi/4N$). In each PWM signal for the triangular wave comparison PWM control, the period of the logic L in the first quarter angle region ranging from 0 to $\pi/2$ radians is shorter than one half of the cycle duration $2\pi/(N\omega e)$ of the triangular wave. Therefore, the first period $2\theta i$ should be shorter than the period $\pi/N$ in the first quarter angle region.

As described in "Description of Related Art", for example, the timing of the turn-on of the switching element ESup should be delayed by a dead time Td from the timing of the turn-off of the switching element ESun. Therefore, one half of the angle length $2\theta i$ should be longer than the electrical angle length corresponding to the dead time Td. More specifically, the parameters should satisfy the dead time condition expressed by the relation $\theta i \geq \theta \min$ and $\theta 1 \geq 2\theta \min$ ($\theta \min = 2\pi f c \max Td/N$). The value $2\pi f c \max/N$ denotes the maximum angular speed of the triangular wave. Therefore, the value $\theta \min$ denotes the change of electrical angle in the dead time Td.

When the parameters $\theta 1$ and $\theta i$ satisfy the first to third imitating conditions, the pulse pattern produced for the pulse pattern control can be similar to the pulse strings of the PWM signals produced for the triangular wave comparison PWM control. Further, when the parameters $\theta 1$ and $\theta i$ additionally satisfy the dead time condition, the switching operations of the switching elements can be performed according to the PWM signals with high precision regardless of the rotational speed of the generator 10. That is, the actual operation of the inverter IV can coincide with the operation instructed to the inverter IV by the PWM signals. As a result, the control device 14 can control the controlled voltage Vc of the inverter IV at a high controllability.

Further, as shown in FIG. 4, the pulse pattern determined by the parameters $\theta 1$ and $\theta i$ is prepared for each value of the modulation factor ranging from the value lower than 1 to 1.273. In this case, each of the parameters $\theta 1$ and $\theta i$ satisfying the imitating conditions and the dead time condition at the modulation factor can be changeable in a certain range, and higher harmonic waves contained in the controlled voltage Vc are changed with the pulse pattern determined by the parameters $\theta 1$ and $\theta i$. Therefore, it is required to form the pulse pattern suitable to the minimization of the higher harmonic waves for each value of the modulation factor.

In this embodiment, to determine the parameters $\theta 1$ and $\theta i$ satisfying this minimizing condition, the parameter $\theta 1$ is expressed by the parameters $\theta i$ and the modulation factor $\alpha$ on condition that the parameters $\theta 1$ and $\theta i$ satisfy the imitating conditions, and the harmonic distortion ratio in the controlled voltage Vc is expressed by the parameters $\theta 1$ and $\theta i$. The harmonic distortion ratio is defined as the ratio of higher harmonic waves to the sum of the fundamental and higher harmonic wave waves. The parameters $\theta 1$ and $\theta i$ corresponding to the minimum value of the harmonic distortion ratio are determined while each of the parameters $\theta i$ is changed from the minimum value $\theta \min$ to a value near to the maximum valued $\theta \max$. Therefore, the parameters $\theta 1$ and $\theta i$ satisfying the minimizing condition can be obtained. The pulse pattern suitable to the minimization of the harmonic distortion ratio is determined by these parameters $\theta 1$ and $\theta i$ for each value of the modulation factor.

Figure 7:
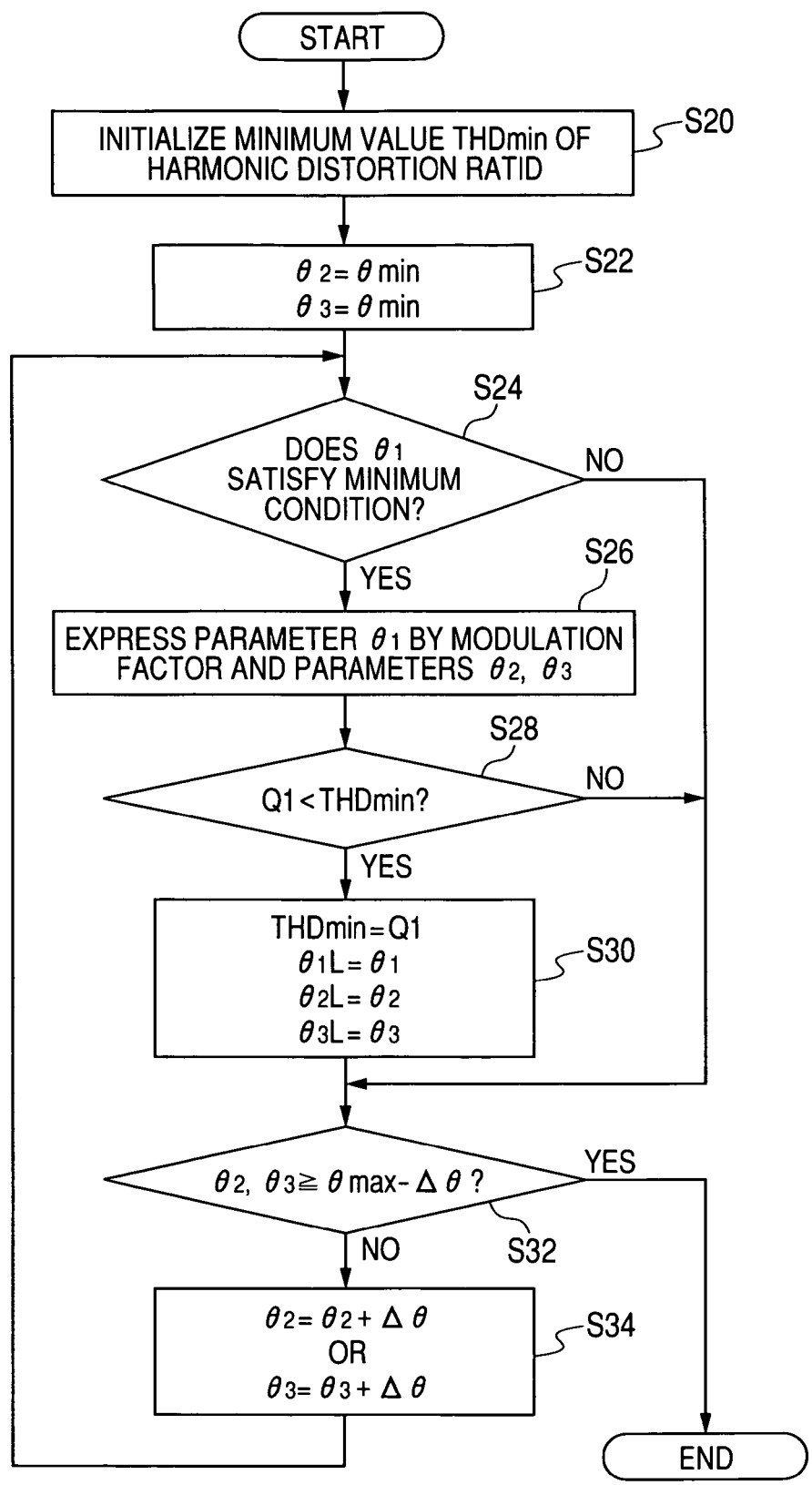
FIG. 7 is a flow chart showing the procedure of determining parameters of one pulse pattern suitable to the minimization of higher harmonic waves.

The determination of the parameters $\theta 1$ and $\theta i$ satisfying the minimizing condition will be described in detail with reference to FIG. 7. FIG. 7 is a flow chart showing the procedure of determining the parameters $\theta 1$, $\theta 2$ and $\theta 3$ satisfying the minimizing condition. The pulse pattern determined by the parameters $\theta 1$, $\theta 2$ and $\theta 3$ has eleven pulses in the angular range from 0 to $2\pi$ radians.

As shown in FIG. 7, at step S20, the minimum value THDmin of the harmonic distortion ratio is initialized to a sufficiently high value. In this embodiment, the harmonic distortion ratio is obtained by quantifying the magnitude of the higher-order harmonic waves (i.e., higher harmonic waves) existing in the controlled voltage Vc. At step S22, each of the parameters $\theta 2$ and $\theta 3$ is initialized to the minimum value $\theta \min$.

At step S24, it is judged whether or not the parameter $\theta 1$ exists in the range satisfying the minimizing condition. This judgment can be replaced with the judgment whether or not the relation (c1) expressed by the parameters $\theta 2$ and $\theta 3$, the modulation factor $\alpha$ and the synchronization number N is satisfied.

$$\cos\left(\frac{5\pi}{2N} - \theta 2 - \theta\min\right) < \qquad (c1)$$

$$\frac{1}{2}\left\{\frac{\pi\alpha}{4} + 1 + 4\sum_{i=1}^{2}\sin\delta i \times \sin\theta(i+1)\right\} < \cos 2\theta 2$$

The modulation factor $\alpha$ is calculated according to the equation (c2).

$$\alpha = \frac{4}{\pi}\left(\int_0^{\theta_1} -\sin x\, dx + \int_{\theta_1}^{\delta_1-\theta_2} \sin x\, dx + \int_{\delta_1-\theta_2}^{\delta_1+\theta_2} -\sin x\, dx + \int_{\delta_1+\theta_2}^{\delta_2-\theta_3} \sin x\, dx + \ldots\right) \quad (c2)$$

$$= \frac{4}{\pi}\left\{\cos\theta_1 - 4\sum_{i=1}^m (\sin\delta_i \cdot \sin\theta(i+1)) - 1\right\}$$

The center side of the relation (c1) is derived from the equation (c2) and is expressed by $\frac{1}{2} \times \cos\theta_1$. The left side of the relation (c1) indicates the dead time condition expressed by the relation $\theta_i \geq \theta_{min}$ and $\theta_1 \geq 2\theta_{min}$. The right side of the relation (c1) indicates the first imitating condition. The left side of the relation (c1) includes the value $\theta_{min}$ because the distance between adjacent pulses in the PWM signals should be equal to or higher than the minimum angle length $\theta_{min}$.

In case of the affirmative judgment at step S24, at step S26, the parameter $\theta_1$ is expressed by the modulation factor $\alpha$ and the parameters $\theta_2$ and $\theta_3$ according to the equation (c2). That is, when the equation (c2) is rewritten so as to solve the value $\cos\theta_1$, the parameter $\theta_1$ is expressed as follows by using arccosine.

$$\theta_1 = \arccos\left[\frac{1}{2}\left\{\frac{\pi\alpha}{4} + 1 + 4\sum_{i=1}^2 \sin\delta_i \times \sin\theta(i+1)\right\}\right]$$

Then, at step S28, a quantitative value Q1 of the higher harmonic waves existing in the controlled voltage Vc is estimated. The controlled voltage Vc depends on the pulse pattern determined by the parameters $\theta_1$ to $\theta_3$. Then, it is judged whether or not the quantitative value Q1 of the higher harmonic waves is lower than the minimum value THDmin of the harmonic distortion ratio. The quantitative value Q1 is expressed by the right side of the relation (c3).

$$THD\text{min} > \sum_n \left[\frac{4}{n\pi}\left\{2\cos n\theta_1 - 4\sum_{i=1}^2 (\sin n\delta_i \cdot \sin n\theta(i+1)) - 1\right\}\right]^2 \quad (c3)$$

In the relation (3), the symbol n denotes the order of each higher harmonic wave, and the order n is ranged from 2 to a predetermined number. The magnitude of the higher harmonic waves is quantified by squaring the amplitude of the higher harmonic wave of each higher order and calculating the sum of the squared amplitudes. The amplitude An of the n-th higher-order harmonic wave can be expressed by the equation (c4).

$$An = \frac{4}{\pi}\left(\int_0^{\theta_1} -\sin nx\, dx + \int_{\theta_1}^{\delta_1-\theta_2} \sin nx\, dx + \int_{\delta_1-\theta_2}^{\delta_1+\theta_2} -\sin nx\, dx + \int_{\delta_1+\theta_2}^{\delta_2-\theta_3} \sin nx\, dx + \ldots\right) \quad (c4)$$

$$= \frac{4}{n\pi}\left\{\cos n\theta_1 - \sum_{i=1}^m (\sin n\delta_i \times \sin n\theta(i+1)) - 1\right\}$$

This amplitude An is normalized by one half of the supply voltage VDC. In case of the affirmative judgment at step S28, at step S30, the minimum value THDmin is replaced with the estimated quantitative value Q1 of the higher harmonic waves as follows.

$$THD\text{min} = \sum_n \left[\frac{4}{n\pi}\left\{2\cos n\theta_1 - 4\sum_{i=1}^2 \sin n\delta_i \times \sin n\theta(i+1) - 1\right\}\right]^2$$

Further, temporary parameters $\theta_{1L}$, $\theta_{2L}$ and $\theta_{3L}$ are, respectively, set at values of the parameters $\theta_1$, $\theta_2$ and $\theta_3$. Then, the procedure proceeds to step S32.

Further, in the case of a negative judgment at step S24 or S28, the procedure proceeds to step S32.

At step S32, it is judged whether or not each of the parameters $\theta_2$ and $\theta_3$ is equal to or higher than an allowable maximum value $\theta_{max} - \Delta\theta$ which is determined by subtracting a detectable minimum value $\Delta\theta (=2\pi P/C)$ of the sensor 15 from the maximum angle $\theta_{max}$. The value $\Delta\theta$ is determined from the resolution C of the sensor 15 and the number P of pole pairs in the generator 10. The reason that the value $\Delta\theta$ depends on the resolution C is that the precision in the operation of the inverter IV performed according to the pulse pattern depends on the resolution C of the sensor 15.

In case of the negative judgment at step S32, the parameter $\theta_2$ or $\theta_3$ is increased by the detectable minimum value $\Delta\theta$. When one of the parameters $\theta_2$ and $\theta_3$ is equal to or higher than the value $\theta_{max} - \Delta\theta$, the parameter is not increased, but the other parameter is increased. Then, the procedure is returned to step S24. When the new value of the parameter $\theta_1$ is calculated at step S26, the parameter $\theta_1$ previously determined is changed to the new value.

Therefore, the quantitative value Q1 of the higher harmonic waves is estimated for each of the pulse patterns which are estimated by changing each of the parameters $\theta_2$ and $\theta_3$ by the value $\Delta\theta$ in the angular range from the minimum value $\theta_{min}$ to the allowable maximum value $\theta_{max} - \Delta\theta$. When each of the parameters $\theta_2$ and $\theta_3$ finally becomes equal to or higher than the value $\theta_{max} - \Delta\theta$ it will be realized that the pulse pattern formed from the parameters $\theta_1$ to $\theta_3$ having the same values as those of the temporary parameters $\theta_{1L}$, $\theta_{2L}$ and $\theta_{3L}$ minimizes the quantitative value Q1 of the higher harmonic waves is minimized.

In the case of an affirmative judgment at step S32, at step S36, the values of the temporary parameters $\theta_{1L}$, $\theta_{2L}$ and $\theta_{3L}$ are, respectively, set at the values of the width determining parameters $\theta_1$, $\theta_2$ and $\theta_3$. Therefore, the parameters $\theta_1$ and $\theta_i$ satisfying the minimizing condition are determined at the modulation factor $\alpha$ so as to determine the pulse pattern suitable to the minimization of the harmonic distortion ratio.

Other sets of parameters $\theta_1$ and $\theta_i$ suitable to all values of the modulation factor in its changing range are determined for each of values of the synchronization number N.

When the modulation factor is maximized to the value of 1.273 which is equal to the value of the modulation factor in the rectangular wave control, the parameters satisfying the imitating conditions and the dead time condition are determined to respective value without any degree of freedom. Therefore, the same pulse pattern as that in the rectangular wave control is formed according to the modulation factor equal to 1.273 so as to have only one pulse in the angular range from 0 to $\pi$ radians.

Further, the maximum number of pulses in the pulse pattern formed in the angular range from 0 to $2\pi$ radians depends on the synchronization number N, and the maximum number θ of parameters θ1 and θi has relation to the number of pulses. FIG. 8 is a view showing the maximum number of pulses and the maximum number of parameters in relation to the synchronization number N.

As shown in FIG. 8, as an example, when the synchronization number N is equal to 3, the maximum number of pulses becomes 3, and only the parameter θ1 satisfying the minimizing condition is calculated to determine the pulse pattern. That is, no parameters θi (i≧2) are required to form the pulse pattern. This parameter θ1 is definitely determined from the modulation factor α according to the equation (c2). Further, when the synchronization number N is equal to or higher than 9 while the required number of pulses is equal to the maximum number, the modulation factor α cannot be sometimes set at the maximum value of 1.273 equal to the value of the modulation factor in the rectangular wave control. In this case, the parameters are adjusted such that the pulse pattern determined by the parameters has pulses of which the actual number is smaller than the maximum number.

When a quarter portion of pulse pattern ranging from 0 to π/2 radians is formed, the formed pulse pattern is converted into the pulse pattern ranging from 0 to 2π radians according to the symmetry in the sine wave. FIG. 9A shows a conversion table prepared according to the symmetry in the sine wave, and FIG. 9B shows one pulse pattern formed by referring to the conversion table.

As shown in FIG. 9A, the conversion table indicates the level changing phase and the type of pulse edge at the level changing phase in the angular range from 0 to 2π radians. The level of the pulse pattern is changed at each of the level changing phases $\beta_1$ to $\beta_{4(2m+2)+2}$. The level changing phases in the angular range from 0 to π/2 radians are expressed by using the parameters θ1 and θi and the phases $\delta_j$ at the crest points of the triangular wave. The level changing phases in the other angular range are expressed by simply-expressed phases to $\beta_1$ to $\beta_{2m+1}$ already defined. The type of pulse edge at each level changing phase indicates a leading edge "↑" or a trailing edge "↓" of the pulse.

As shown in FIG. 9B, the relation between the sine wave and the triangular wave is symmetric with respect to point at the angle π. Further, this relation has axial symmetry at the angle π/2 in the angular range from 0 to π radians and has axial symmetry at the angle 3π/2 in the angular range from π to 2π radians. According to this symmetry, one pulse pattern for the PWM signals is, for example, prepared by using three parameters θ1, θ2 and θ3 in case of the synchronization number N=15 and has eleven pulses.

Further, the first periods in each of the first and fourth quarter angle regions of the pulse pattern has a first period arrangement in which the first period is shortened with angle while the second period is lengthened angle. The first periods in each of the second and third quarter angle regions of the pulse pattern has a second period arrangement in which the first period is lengthened with angle while the second period is shortened with angle.

Further, the sum of the first periods and the sum of the second periods in each of the first and fourth quarter angle regions set in the first period arrangement are set such that the sum of the first periods is shorter than the sum of the second periods in the first quarter angle region and is longer than the sum of the second periods in the fourth quarter angle region. The sum of the first periods and the sum of the second periods in each of the second and third quarter angle regions set in the second period arrangement are set such that the sum of the first periods is shorter than the sum of the second periods in the second quarter angle region and is longer than the sum of the second periods in the third quarter angle region.

Further, the waveform of each PWM signal for the pulse pattern control has a repeated pattern in which the pulse pattern is repeated. The level of the PWM signal is changed with time in the repeated pattern. The repeated pattern has the first period arrangement in each first pair of the fourth and first quarter angle regions successively placed and the second period arrangement in each second pair of second and third quarter angle regions successively placed. The repeated pattern further has the specific first period θ1/ωe, regardless of any crest or trough point of the triangular wave, in the first quarter angle region succeeding the fourth quarter angle region in the first pair so as to place the first period θ1/ωe at a position adjacent to the boundary between the fourth and first quarter angle regions. The repeated pattern has the specific second period θ1/ωe, regardless of any crest or trough point of the triangular wave, in the fourth quarter angle region preceding the first quarter angle region in the first pair so as to place the second period θ1/ωe at a position adjacent to the boundary between the fourth and first quarter angle regions. The repeated pattern has the specific first period θ1/ωe, regardless of any crest or trough point of the triangular wave, in the second quarter angle region preceding the third quarter angle region in the second pair so as to place the first period θ1/ωe at a position adjacent to the boundary between the second and third quarter angle regions. The repeated pattern has the specific second period θ1/ωe, regardless of any crest or trough point of the triangular wave, in the third quarter angle region succeeding the second quarter angle region in the second pair so as to place the second period θ1/ωe at a position adjacent to the boundary between the second and third quarter angle regions.

That is, in the pulse pattern, each of the first periods except for the first period θ1/ωe in the first and second quarter angle regions includes the timing synchronized with one crest point of the triangular wave, and each of the second periods except for the second period θ1/ωe in the third and fourth quarter angle regions includes the timing synchronized with one trough point of the triangular wave.

Each pulse pattern in the unit 30 differs from the waveforms of the PWM signals produced in the comparators 34 to 36, but the pulse pattern is prepared by the comparison of the sine wave to the triangular wave. Therefore, the pulse pattern is also called a triangular wave quasi-comparison pattern.

The section 30 further has a selector 39 for selecting the PWM signals Sgu, Sgv and Sgw produced in the unit 3B for the pulse pattern control or the PWM signals Sgu, Sgv and Sgw produced in the comparators 34 to 36 for the triangular wave comparison PWM control according to the instructed modulation factor αi and outputting the selected PWM signals to the unit 40. For example, when the instructed modulation factor α i is equal to or lower than 1, the selector 39 selects the PWM signals for the triangular wave comparison PWM control. In contrast, when the instructed modulation factor αi is higher than 1, the selector 39 selects the PWM signals for the pulse pattern control.

Figure 10:
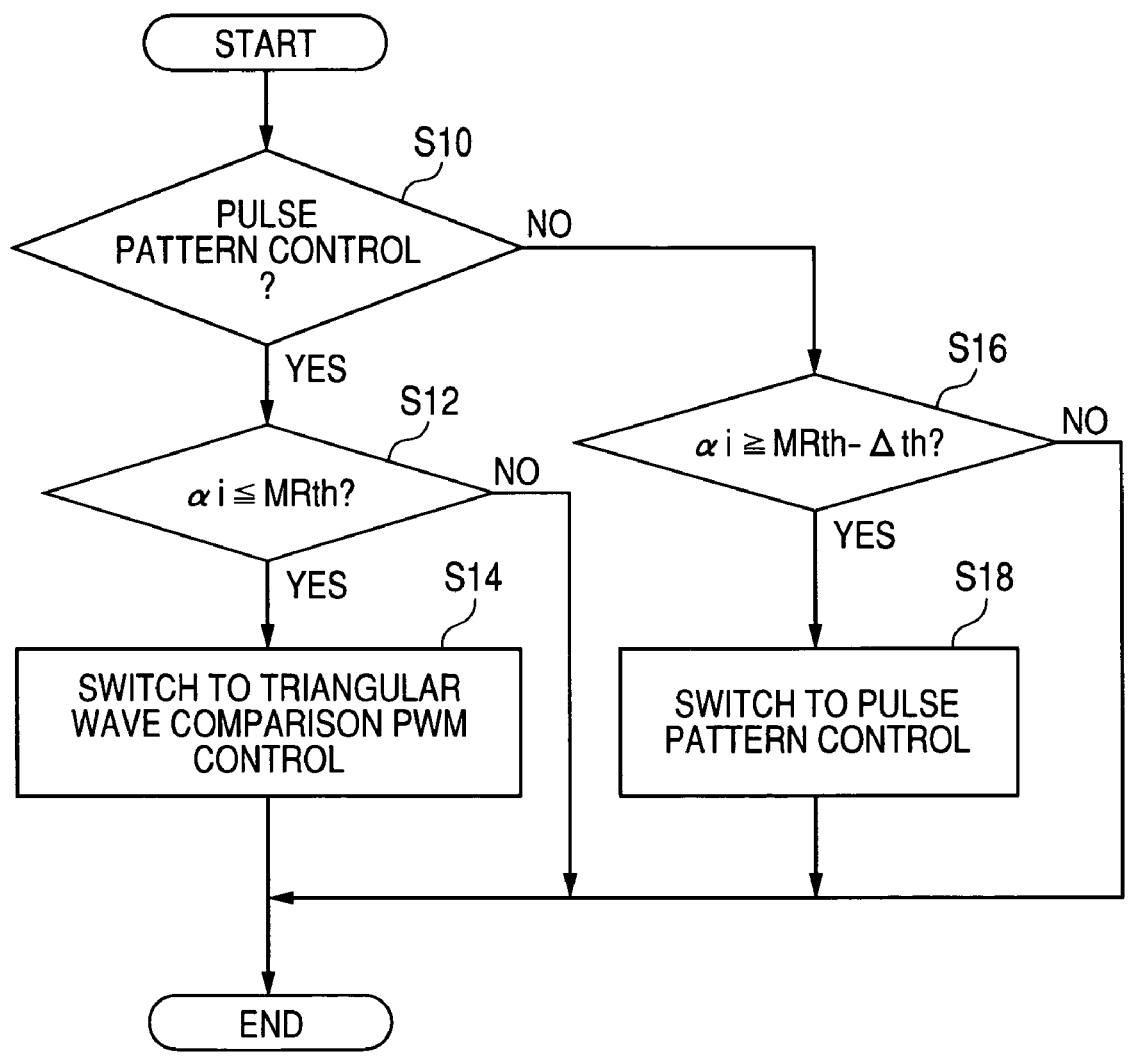
FIG. 10 is a flow chart showing the procedure in a selector shown in FIG. 2.

FIG. 10 is a flow chart showing the procedure of switching the selection between the triangular wave comparison PWM control and the pulse pattern control.

As shown in FIG. 10, at step S10, the unit 39 judges whether or not the device 14 performs the pulse pattern control, selected by the unit 39, for the generator 10. In case of the affirmative judgment, to judge whether or not the condition for switching the selection to the triangular wave comparison PWM control is satisfied, at step S12, the unit 39 judges whether or not the instructed modulation factor αi is equal to or lower than a modulation factor threshold MRth. This threshold MRth is preset at the value of 1. In case of the affirmative judgment at step S12, at step S14, the unit 39 switches the selection to the triangular wave comparison PWM control, and this procedure is ended. Therefore, the triangular wave comparison PWM control is performed when the amplitude of the instructed voltage produced in the unit 32 is equal to or smaller than the amplitude of the triangular wave generated in the unit 33. In case of the negative judgment at step S12, this procedure is ended. That is, the unit 14 continues the pulse pattern control for the generator 10.

In contrast, in the case of a negative judgment at step S10, to judge whether or not the condition for switching the selection to the pulse pattern control is satisfied, at step S16, the unit 39 judges whether or not the instructed modulation factor αi is equal to or higher than the value MRth-Δth obtained by subtracting a hysteresis width Δth from the threshold MRth. The hysteresis width Δth is preset to prevent the selector 39 from often switching the selection by hunting. In case of the affirmative judgment at step S16, the unit 39 switches the selection to the pulse pattern control, and this procedure is ended. Therefore, the unit 14 starts the pulse pattern control for the generator 10 when the amplitude of the instructed voltage produced in the unit 32 is larger than the amplitude of the triangular wave generated in the unit 33. In case of the negative judgment at step S16, this procedure is ended. That is, the unit 14 continues the triangular wave comparison PWM control for the generator 10.

Assuming that the control device 14 performs the triangular wave comparison PWM control for the generator 10 in the excessive modulation region in which the amplitude of the instructed voltage is larger than the amplitude of the triangular wave, the controllability of the device 14 for the generator 10 in the triangular wave comparison PWM control is undesirably lowered. However, in this embodiment, when the amplitude of the instructed voltage exceeds the amplitude of the triangular wave, the control device 14 performs the pulse pattern control for the generator 10. Accordingly, the generator 10 can be operated at a high controllability even when the generator 10 is controlled in the excessive modulation region.

Further, each pulse pattern for the pulse pattern control is formed so as to imitate the pulse strings of the PWM signals for the triangular wave comparison PWM control. Therefore, even when one of the pulse pattern control and the triangular wave comparison PWM control is switched to the other one, fluctuations caused in the controlled voltage Vc can be appropriately suppressed.

Figure 11:
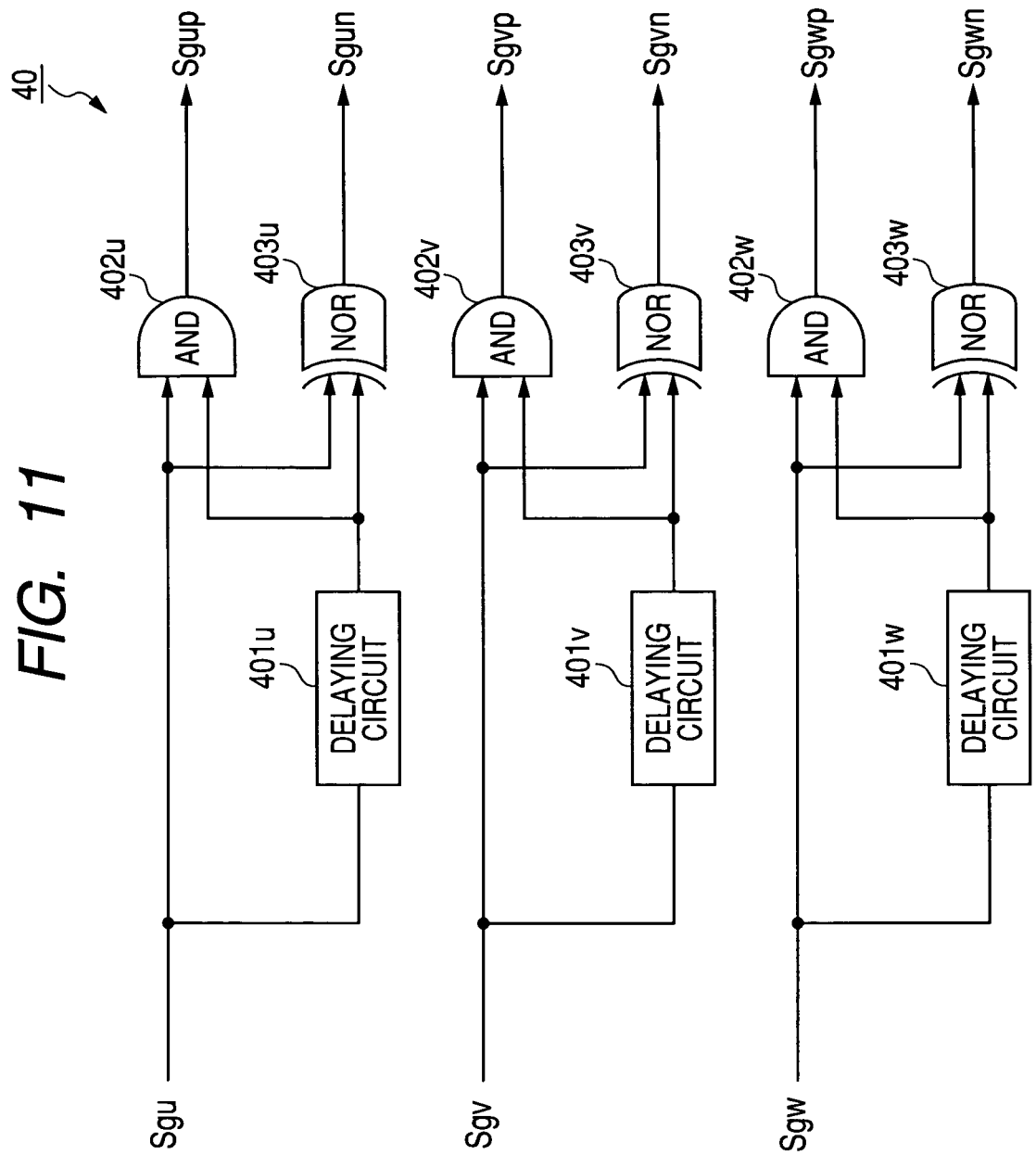
FIG. 11 is a block diagram of a control signal producing unit shown in FIG. 2.

The operation of the control signal producing unit 40 will be described with reference to FIG. 11 and FIG. 12. FIG. 11 is a block diagram of the unit 40.

As shown in FIG. 11, the unit 40 has a control signal producing block for each of the PWM signals Sgu, Sgv and Sgw selected in the selector 39. Each block has a delaying circuit 401 (representing 401$u$, 401$v$ and 401$w$) for delaying the PWM signal by the dead time Td to produce a delayed signal Sd, an AND circuit 402 (representing 402$u$, 402$v$ and 402$w$) and a NOR circuit 403 (representing 403$u$, 403$v$ and 403$w$). Because of the relation Td=θmin×N/2πfcmax=θmin/ω(N) (see FIG. 3 and FIG. 5) and the relation ωe<ω(N), the relation Td<θmin/ωe<θ3/ωe<θ2/ωe<θ½ωe can be satisfied.

For example, the AND circuit 402 for the PWM signal Sgu produces the control signal Sgup by setting the control signal at the high level when both the PWM signal Sgu and the delayed signal Sd are set in the high level together and setting the control signal at the low level in other cases, and the NOR circuit 403 produces the control signal Sgun by setting the control signal at the high level when both the PWM signal and the delayed signal Sd are set in the low level together and setting the control signal at the low level in other cases.

The production of the control signals from the PWM signals produced in the units 32 to 34 is well-known. Therefore, the control signals produced from the PWM signals of the unit 38 for the pulse pattern control will be described with reference to FIG. 12.

Figure 12:
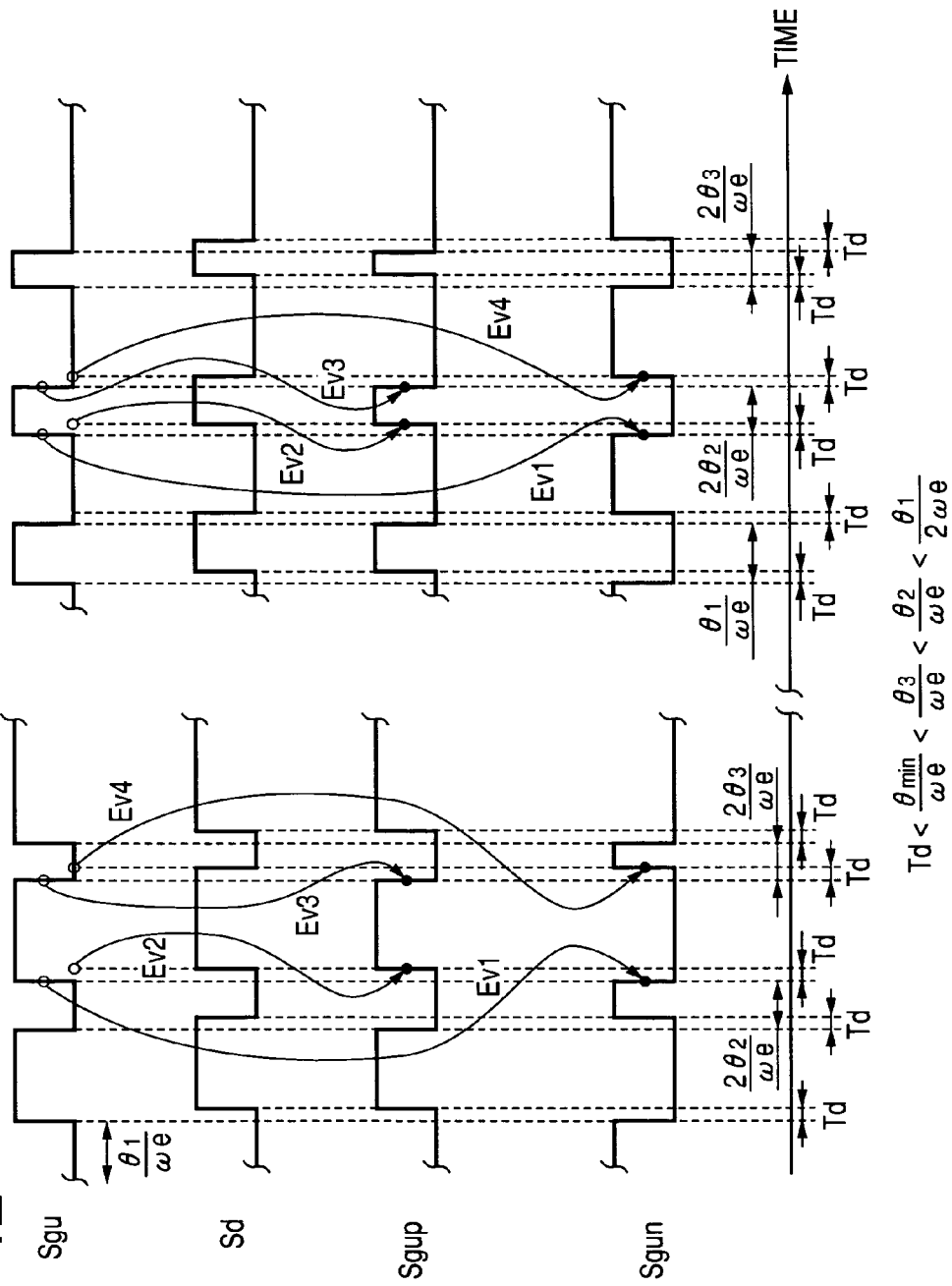
FIG. 12 is a timing chart of a PWM signal, a delayed signal and control signals produced in the unit shown in FIG. 11.

FIG. 12 is a timing chart of the signal Sgu, its delayed signal Sd, the control signal Sgup and the control signal Sgun. As shown in FIG. 12, the control signal Sgup is set at the high level in response to each high level of the PWM signal Sgu, and the control signal Sgun is set at the high level in response to each low level of the PWM signal Sgu to apply the low level of the controlled voltage Vc to the generator 10. The switching element ESup is set in the on state during each on period of the control signal Sgup and is set in the off state during each off period of the control signal Sgup. The switching element ESun is set in the on state during each on period of the control signal Sgun and is set in the off state during each off period of the control signal Sgun.

Therefore, the high level of the cent rolled voltage Vc is applied to the generator 10 in response to each second period of the pulse pattern, and the low level of the controlled voltage Vc is applied to the generator 10 in response to each first period of the pulse pattern.

Further, each pulse in each of the control signals Sgup, Sgvp and Sgwp is spaced from adjacent pulses of the control signal Sgun, Sgvn or Sgwn by the dead time Td or more. Further, in the first angular period from 0 to π radians of the sine wave, each on period is longer than the off period, and one half of the off period 2θi/ωe is equal to or longer than the dead time Td. Therefore, each on period of the control signal Sgup becomes longer than the dead time Td, and each on period of the control signal Sgun becomes equal to or longer than the dead time Td. Therefore, before each of the elements ESup and Esun is turned on, the other element ESup or Esun is set in the off state during the dead time Td or more.

Figure 13:
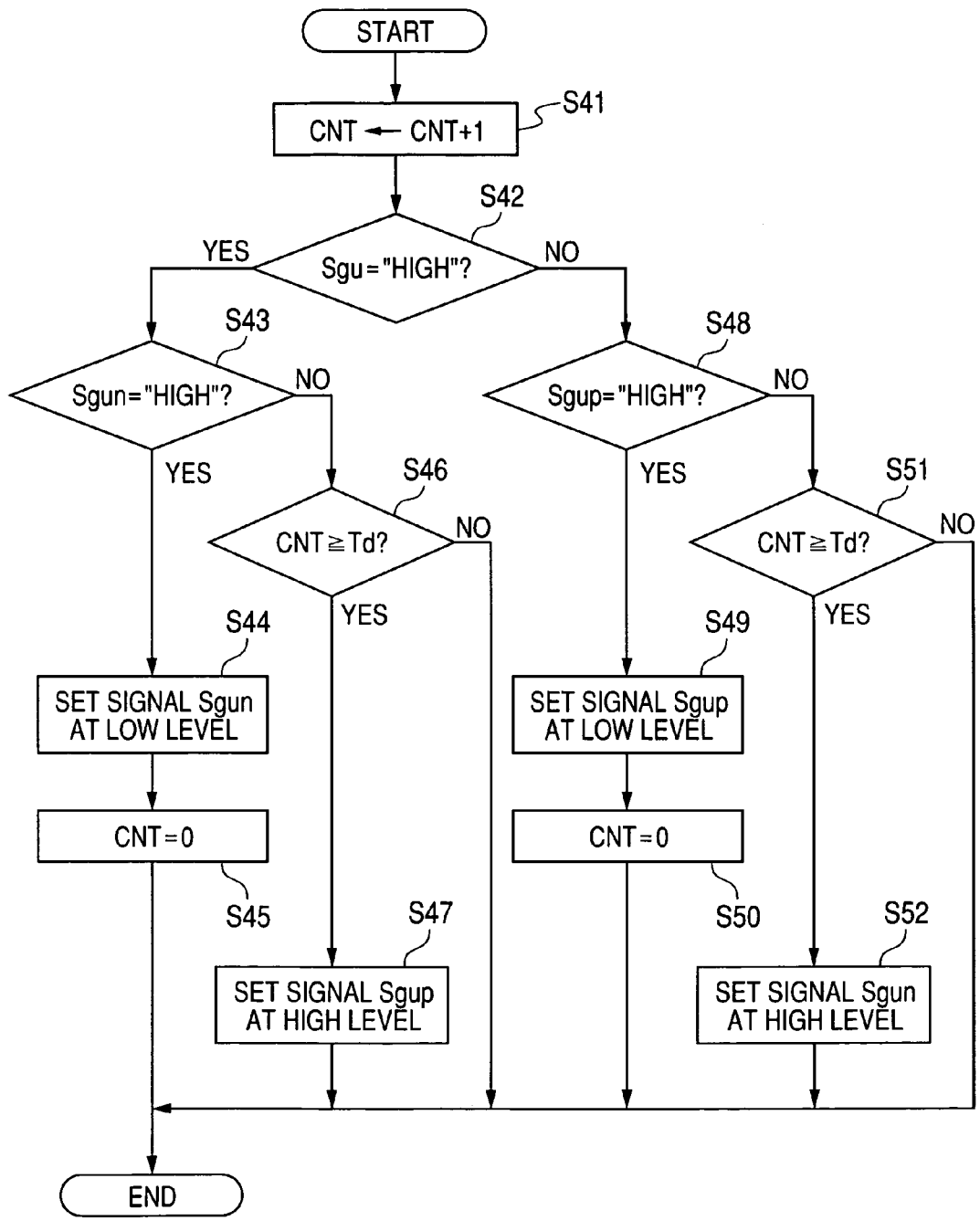
FIG. 13 is a flow chart showing the procedure for producing the control signals in a software control system of the control signal producing unit.

In the example of the unit 40 shown in FIG. 11, the control signals are produced in the hardware circuitry. However, the unit 40 may produce the control signals in a software control system. FIG. 13 is a flow chart showing the procedure for producing the control signals Sgup and Sgun from the PWM signal Sgu. The procedure shown in FIG. 13 is performed every signal level setting unit time by executing a software program installed in a computer system.

As shown in FIG. 13, at step S41, a counting value CNT set in the previous unit time is incremented by 1. The count value CNT indicates the continuation time from the star time at which the count value CNT is set at 0. At step S42, it is judged whether or not the PWM signal Sgu is set in the high level.

In case of the affirmative judgment, at step S43, it is judged whether or not the control signal Sgun is set in the high level. In case of the affirmative judgment at step S43, at step S44, the control signal Sgun is changed to the low level (first event Ev1 in FIG. 12). Then, at step S45, the count value CNT is set at 0. Therefore, when the PWM signal Sgu is high, the control signal Sgun is low. Further, in response to the leading edge of the signal Sgu, the signal Sgun is set at the low level, and the measurement of the continuation time is started.

In contrast, in case of the negative judgment at step S43, the low level of the control signal Sgun is continued, during the high level of the PWM signal Sgu. Then, at step S46, it is judged whether or not the counting value CNT reaches the delay time Td. In case of the negative judgment at step S46, the distance between the pulse of the signal Sgup and the pulse of the signal Sgun preceding the pulse of the signal Sgup is not enough. Therefore, this procedure is ended. In contrast, in case of the affirmative judgment at step S46, at step S47, the control signal Sgup is set at the high level (second event Ev2 in FIG. 12). Therefore, each pulse of the signal Sgup is spaced by the dead time Td from the pulse of the signal Sgun preceding the pulse of the signal Sgup, and each pulse of the signal Sgun is spaced by the dead time Td from the pulse of the signal Sgup succeeding the pulse of the signal Sgun. Further, the signal Sgup is set in the high level during the high level of the signal Sgu.

In contrast, in case of the negative judgment at step S42, at step S48, it is judged whether or not the control signal Sgup is set in the high level. In case of the affirmative judgment at step S48, at step S49, the control signal Sgup is changed to the low level (third event Ev3 in FIG. 12). Then, at step S50, the count value CNT is set at 0. Therefore, because of the events Ev2 and Ev3, the signal Sgup is set in the high level during the high level of the signal Sgu. Further, in response to the trailing edge of the signal Sgu, the signal Sgup is set at the low level, and the measurement of the continuation time is started.

In contrast, in case of the negative judgment at step S48, the low level of the control signal Sgup is continued during the low level of the PWM signal Sgu. Then, at step S51, it is judged whether or not the counting value CNT reaches the delay time Td. In case of the negative judgment at step S51, the distance between the pulse of the signal Sgup and the pulse of the signal Sgun succeeding the pulse of the signal Sgup is not enough. Therefore, this procedure is ended. In contrast, in case of the affirmative judgment at step S51, at step S52, the control signal Sgun is set at the high level (fourth event Ev4 in FIG. 12). Therefore, each pulse of the signal Sgup is spaced by the dead time Td from the pulse of the signal Sgun succeeding the pulse of the signal Sgup, and each pulse of the signal Sgun is spaced by the dead time Td from the pulse of the signal Sgup preceding the pulse of the signal Sgun. Further, because of the events EV1 and EV4, the signal Sgun is set in the high level during the low level of the signal Sgu.

Therefore, the control signals Sgup and Sgun shown in FIG. 12 are produced from the PWM signal Sgu. In the same manner, the control signals Sgvp, Sgvn, Sgwp and Sgwn are from the PWM signals Sgv and Sgw.

The timing of each pulse in each of the control signals Sgup, Sgvp and Sgwp is substantially the same as the timing of the corresponding pulse in the corresponding PWM signal, and the pulse width in the control signal is shorter than that of the PWM signal by θmin. Therefore, the waveform of each of the control signals Sgup, Sgvp and Sgwp is substantially the same as the waveform (i.e., the pulse pattern selected in the unit 38) of the corresponding PWM signal. Further, the timing of each pulse in each of the control signals Sgun, Sgvn and Sgwn is substantially the same as the timing of the corresponding off period in the corresponding PWM signal, and the pulse width in the control signal is shorter than the off period of the PWM signal by θmin. Therefore, the waveform of each of the control signals Sgun, Sgvn and Sgwn is substantially the same as the waveform (i.e., the inverted pattern of the pulse pattern selected in the unit 38) of the inverted signal of the corresponding PWM signal.

Figure 14:
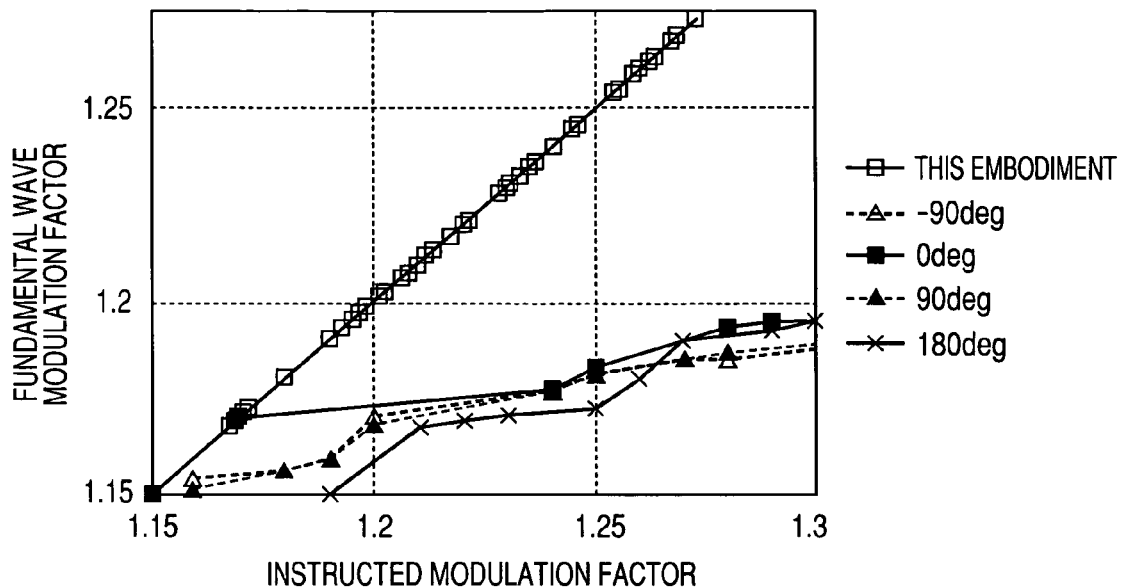
FIG. 14 shows experimental results of the relation between an instructed modulation factor and a value of a fundamental wave modulation factor.

FIG. 14 shows experimental results of the relation between the instructed modulation factor αi and a fundamental wave modulation factor in the excessive modulation region. The control voltage Vc based on a pulse pattern formed at the instructed modulation factor αi contains higher harmonic waves in addition to a fundamental wave. The generator 10 generates the torque only by the fundamental wave of the control voltage vc. In this embodiment, the modulation factor contributing only to the generation of the fundamental wave of the controlled voltage Vc is called a fundamental wave modulation factor.

In this embodiment, when the control device 14 intends to control the generator 10 in the excessive modulation region, one pulse pattern formed at the instructed modulation factor αi is selected, and the controlled voltage Vc is set according to the PWM signals having waveforms of the selected pulse pattern. Therefore, as shown by experimental results (indicated by symbol □) in FIG. 14, the value of the fundamental wave modulation factor accords with the instructed modulation factor αi with high precision in the excessive modulation region of the modulation factor ranging from 1.15 to 1.273.

In contrast, when the triangular wave comparison PWM control is performed for the generator 10 in the excessive modulation region according to the prior art, as shown by experimental results (indicated by symbols Δ, ■, ▲, X) in FIG. 14, the fundamental wave modulation factor is changed in dependence on the instructed phase value θcmd (for example, −90 degrees, 0 degree, 90 degrees or 180 degrees) at the timing of the electrical angle equal to zero. Therefore, the value of the fundamental wave modulation factor is considerably differentiated from the instructed modulation factor αi, and the controllability of the unit 14 for the generator 10 undesirably deteriorates in the excessive modulation region of the modulation factor.

Figure 15:
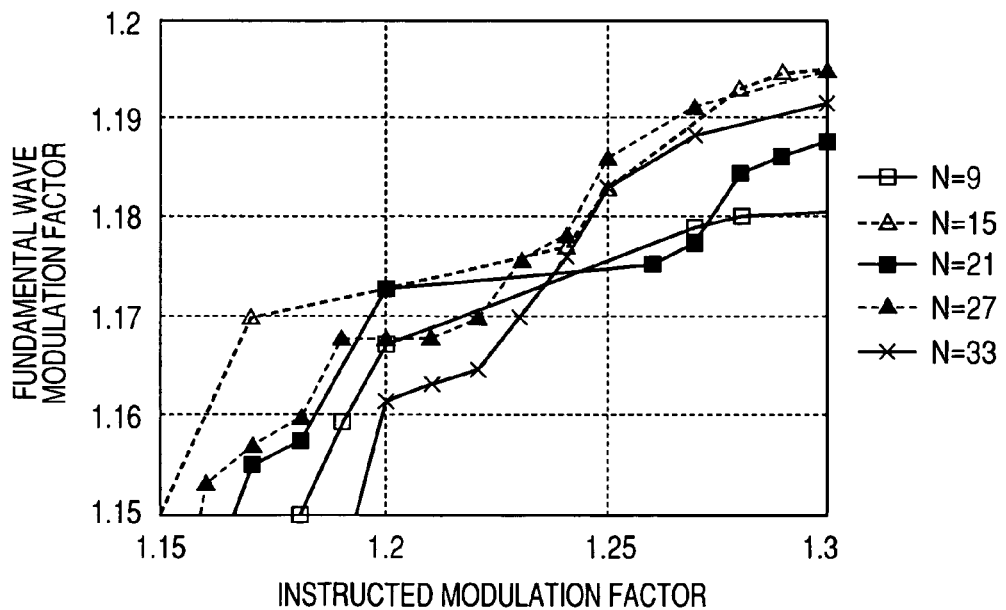
FIG. 15 shows experimental results of the relation between an instructed modulation factor and a fundamental wave modulation factor at which the triangular wave comparison PWM control is actually performed.

FIG. 15 shows experimental results of the relation between the instructed modulation factor αi and the fundamental wave modulation factor in case of the triangular wave comparison PWM control in the excessive modulation region.

As shown in FIG. 15, in case of the triangular wave comparison PWM control performed for the generator 10 in the excessive modulation region, not only the fundamental wave modulation factor becomes lower than the instructed modulation factor αi, but also the relation between the instructed modulation factor αi and the value of the fundamental wave modulation factor is changed with the synchronization number. Therefore, it is required to correct the instructed modulation factor αi while considering the dependency of the fundamental wave modulation factor on the synchronization number and to produce PWM signals from the corrected modulation factor. This correction is troublesome to control the generator 10.

Effects in this embodiment will be described.

In this embodiment, the control device 14 prepares a triangular wave having the cycle duration which is obtained by dividing the electrical angle cycle duration of the generator 10 by an integral number such as the product of an odd number and 3, and prepares a pulse pattern in a pattern angle range (i.e., from 0 to 2π radians) corresponding to the electrical angle cycle duration of the generator 10 for each value of the modulation factor. Each pulse pattern is set at the low level in the first period, in which one crest point of the triangular wave is placed, in the first and second quarter angle regions ranging from 0 to π radians. Each pulse pattern is set at the high level in the second period, in which one trough point of the triangular wave is placed, in the third and fourth quarter angle regions ranging from π to 2π radians.

Especially, the ratio of the amplitude of a sine wave to the amplitude of the triangular wave is set at the modulation factor. In the first and second quarter angle regions, the pulse pattern has the first period including a timing synchronized with each crest point of the triangular wave when the level of the sine wave at the timing is lower than the level of the crest point. In the third and fourth quarter angle regions, the pulse pattern has the second period including a timing synchronized with each trough point of the triangular wave when the level of the sine wave at the timing is higher than the level of the trough point. Therefore, each pulse pattern can be similar to the pulse strings of the PWM signals produced for the angular wave comparison PWM control.

The control device 14 produces control signals having pulse strings substantially the same as the pulse pattern corresponding to the instructed modulation factor αi, controls each of the switching elements ESup, ESvp and ESwp of the inverter IV to apply a high level of the controlled voltage Vc to the generator 10 during the high level of the corresponding control signal Sgup, Sgvp or Sgwp and controls each of the switching elements ESun, ESvn and ESwn of the inverter IV to apply a low level of the controlled voltage Vc to the generator 10 during the high level of the corresponding control signal Sgun, Sgvn or Sgwn (or the low level of the corresponding control signal Sgup, Sgvp or Sgwp).

Therefore, the selected pulse pattern of the PWM signals can become similar to the pulse strings of the PWM signals for the synchronized triangular wave comparison PWM control, and the switching elements of the inverter IV can be operated under the pulse pattern control similar to the synchronized triangular wave comparison PWM control.

Accordingly, the control device 14 can preferably control the controlled voltage Vc of the inverter IV under the pulse pattern control. Further, when the control for the generator 10 is switched between the pulse pattern control and the synchronized triangular wave comparison PWM control, fluctuations in the controlled voltage Vc can be appropriately suppressed.

Further, the angle range of each pulse pattern is partitioned into four quarter angle regions which each corresponds to a quarter of one electrical angle cycle duration of the generator 10, and the pulse pattern has a plurality of first periods of the low level and a plurality of second periods of the high level alternately placed in each quarter angle region. The pulse pattern in each quarter angle region has a first period arrangement that the first period is shortened with angle while the second period is lengthened with angle or a second period arrangement that the first period is lengthened with angle while the second period is shortened with pattern angle.

Because the pulse pattern having the first period arrangement or the second period arrangement in each quarter angle region is similar to the shape of the sine wave, the PWM signals having the pulse pattern for the pulse pattern control can be reliably similar to the PWM signals for the synchronized triangular wave comparison PWM control. Accordingly, when the control for the generator 10 is switched between the pulse pattern control and the synchronized triangular wave comparison PWM control, fluctuations in the controlled voltage Vc can be further appropriately suppressed.

Further, the control unit 14 successively controls the inverter IV according to each control signal of which the waveform is determined from the repetition of the selected pulse pattern. One crest or trough point of the triangular wave is placed in each of the first and second periods $2\theta i$ except for the second period $\theta 1$, placed at the angle region from $2\pi - \pi 1$ to $2\pi$ radians, and the first period $\theta 1$, placed at the angle region from 0 to $\theta 1$ radians, which is adjacent to the boundary between the fourth and first quarter angle regions successively set in the first period arrangement and except for the second period $\theta 1$, placed at the angle region from $\pi$ to $\pi + \theta 1$ radians and the first period $\theta 1$, placed at the angle region from $\pi - \theta 1$ to $\pi$ radians, adjacent to the boundary between the second and third quarter angle regions successively set in the second period arrangement.

Especially, one crest point of the triangular wave is placed in each of the first periods $2\theta i$ in the first and second quarter angle regions, and one trough point of the triangular wave is placed in each of the second periods $2\theta i$ in the third and fourth quarter angle regions.

Accordingly, the second periods of the high level in the pulse pattern can be arranged to be similar to the arrangement of the second periods of the PWM signals for the synchronized triangular wave comparison PWM control.

Accordingly, the pulse pattern can be easily set.

Further, in this embodiment, the first periods in each of the first and fourth quarter angle regions of each pulse pattern has a first period arrangement in which the first period is shortened with angle while the second period is lengthened with angle. The first periods in each of the second and third quarter angle regions of the pulse pattern has a second period arrangement in which the first period is lengthened with angle while the second period is shortened with angle. Accordingly, the inverter IV can be controlled according to the pulse pattern to be similar to the triangular wave comparison PWM control.

Further, in this embodiment, each of the first periods $2\theta i/\omega e$ ($i \geq 2$) in the first and second quarter angle regions includes a timing synchronized with one crest of the triangular wave, and each of the second periods $2\theta i/\omega e$ ($i \geq 2$) in the third and fourth quarter angle regions includes a timing synchronized with one trough of the triangular wave. Accordingly, the freedom in the design of the parameter $\theta 1$ can be increased, and the design range of the parameter $\theta 1$, determined on condition that the higher harmonic wave components contained in the controlled voltage Vc are minimized, can be increased.

Further, in this embodiment, the sum of the first periods and the sum of the second periods in each of the first and fourth quarter angle regions set in the first period arrangement are set such that the sum of the first periods is shorter than the sum of the second periods in the first quarter angle region and is longer than the sum of the second periods in the fourth quarter angle region. The sum of the first periods and the sum of the second periods in each of the second and third quarter angle regions set in the second period arrangement are set such that the sum of the first periods is shorter than the sum of the second periods in the second quarter angle region and is longer than the sum of the second periods in the third quarter angle region. Accordingly, the inverter IV can be controlled ac cording to the pulse pattern to be similar to the triangular wave comparison PWM control.

Further, in this embodiment, each first period in the first and second quarter angle regions is set so as to place one crest point of the triangular wave at the center of the first period, and each second period in the third and fourth quarter angle regions is set so as to place one trough point of the triangular wave at the center of the second period. Accordingly, when the number of pulses in the pulse pattern is equal to M, the number of parameters appropriate to the pulse pattern can be set at $(M-1)/2$, the pulse pattern can be easily set.

Further, in th is embodiment, the unit 38 changeably sets the integral number (i.e., the product of an odd number and 3) determining the cycle duration of the triangular wave according to an electrical angular speed of the generator 10 relating to the electrical angle cycle duration of the generator 10.

In the synchronized triangular wave comparison PWM control, when the generator 10 is rotated at a constant angular speed, the switching frequency of the switching elements of the inverter IV is increased with the synchronization number N. Further, the switching loss of electric power caused in the inverter IV is increased with the switching frequency. To prevent the excessive switching loss, in this PWM control, the synchronization number N is changeably set according to the angular speed of the generator 10 so as to decrease the synchronization number N with the angular speed of the generator 10. In the pulse pattern control based on the pulse patterns, in the same manner as in the PWM control, the synchronization number N is changeably set according to the angular speed of the generator 10. Accordingly, the control for the generator 10 can be smoothly switched between the pulse pattern control and the PWM control, and the switching loss in the inverter IV can be reduced. Further, a half of the first period 2 θi/ωe in the first angular range and a half of the second period 2θi/ωe in the second angular range can be easily set to be equal to or longer than the dead time Td.

Further, in this embodiment, a half of the first period 2θi/ωe in the first angular range and a half of the second period 2θi/ωe in the second angular range can be easily set to be equal to or longer than the dead time Td.

Accordingly, the control voltage Vc of the inverter IV can be reliably controlled according to the pulse pattern selected in the unit 38.

Further, in this embodiment, the unit 32 sets a voltage level instructed to the electric rotating machine according to the instructed value of the modulation factor, the comparators 34 to 36 produce PWM signals, by comparing the voltage level and a level of another triangular wave generated in the unit 33, to control the control pattern of the controlled voltage Vc according to the PWM signals under the synchronized triangular wave comparison PWM control. The selector 39 selects the pulse pattern control based on the pulse pattern selected in the unit 38 or the synchronized triangular wave comparison PWM control based on the PWM signals of the comparators 34 to 36 according to the modulation factor.

When the modulation factor is small, the control device 14 performing the PWM control can control the generator 10 at a high controllability. In contrast, when the modulation factor is large, the control device 14 performing the pulse pattern control can control the generator 10 at a high controllability. Because the control device 14 can select the PWM control or the pulse pattern control according to the modulation factor, the control device 14 can always control the generator 10 at a high controllability.

Further, the selector 39 changes the selection to the pulse pattern control when the modulation factor is equal to or higher than a first value, and the selector 39 changes the selection to the PWM control when the modulation factor is equal to or lower than a second value lower than the first value.

Accordingly, the control device 14 can prevent the selector 39 from often switching the selection by hunting.

Further, in this embodiment, the unit 38 prepares each pulse pattern such that a plurality of first periods θ1/ωe and θi/ωe in the first and second quarter angle regions and a plurality of second periods θ1/ωe and θi/ωe in the third and fourth quarter angle regions are set. The magnitude of higher harmonic waves existing in the controlled voltage Vc are indicated by the parameters θ1 and θi. The unit 38 determines the parameters θi such that the magnitude of higher harmonic waves ranging from the second order to the order of a predetermined number is minimized.

Accordingly, each pulse pattern can be prepared such that the generation of the higher harmonic waves in the controlled voltage Vc can be reduced.

Further, in this embodiment, to determine the parameters θi satisfying the minimizing condition, each of the parameters θ2 and θ3 is initially set at the minimum value θmin determined from the dead time Td, and the magnitude of higher harmonic waves is calculated while changing each parameter by an increment of the detectable minimum value Δθ until the parameter substantially reaches the value of the parameter θmax. The value Δθ is determined from the resolution of the sensor IS and the number of pole pairs in the generator 10. Then, the parameters θ2 and θ3 corresponding to the minimum value of the magnitude of higher harmonic waves are determined.

Accordingly, the magnitude of the higher harmonic waves existing in the control voltage Vc can be minimized with high precision.

Second Embodiment

In the first embodiment, the quantitative value Q1 of the higher harmonic waves is estimated according to the relation (c3). Therefore, the contribution of each higher-order harmonic wave on the quantitative value Q1 is substantially the same as the contribution of any of the other higher-order harmonic waves on the quantitative value Q1.

However, as the order of the higher harmonic wave becomes low, torque ripple caused in the torque of the generator 10 by the higher harmonic wave of the controlled voltage Vc is increased. To reduce the torque ripple caused by the higher harmonic waves, it is preferable that, as the order of the higher harmonic wave becomes low, the contribution of the higher harmonic wave on the quantitative value Q1 is decreased.

In the second embodiment, to decrease the contribution of the higher harmonic wave on the quantitative value Q1 as the order of the higher harmonic wave becomes low, the amplitude of each n-th higher order (n=2, 3, 4, . . . ) harmonic wave is weighted by a weighting factor such as 1/n, the weighted amplitude of each higher harmonic wave is squared to obtain a squared value, and the squared values of the weighted amplitudes of the higher harmonic waves are summed up to calculate the weighted magnitude of the higher harmonic waves.

Figure 16:
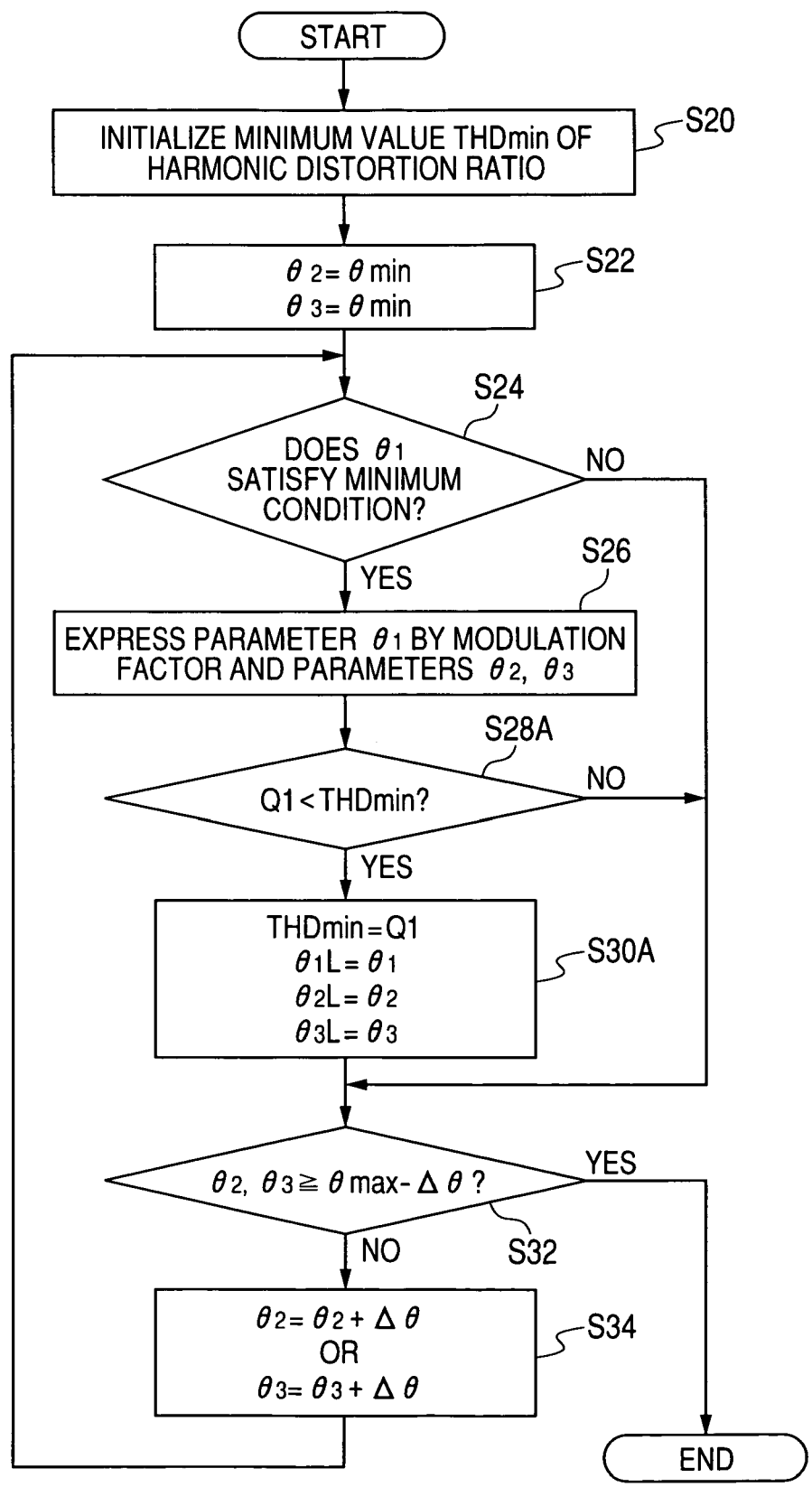
FIG. 16 is a flow chart showing the procedure of determining parameters of one pulse pattern suitable to the minimization of higher harmonic waves according to the second embodiment of the present invention.

FIG. 16 is a flow chart showing the procedure of determining parameters satisfying the minimizing condition according to the second embodiment. As shown in FIG. 16, in place of step S28 shown in FIG. 1, at step S28A, it is judged whether or not the weighted quantitative value Q1 of the higher harmonic waves is lower than the minimum value THDmin of the harmonic distortion ratio. This weighted quantitative value Q1w is expressed by the right side of the relation (c5).

$$THD\text{min} > \sum_n \left[ \frac{4}{n^2 \pi} \left\{ 2\cos n\theta 1 - 4\sum_{i=1}^{2} \sin n\delta i \times \sin n\theta(i+1) - 1 \right\} \right]^2 \quad (c5)$$

In case of the affirmative judgment at step S28A, at step S30A, the minimum value THDmin is replaced with the weighted quantitative value Q1w of the higher harmonic waves as follows.

$$THD\text{min} = \sum_n \left[ \frac{4}{n^2 \pi} \left\{ 2\cos n\theta 1 - 4\sum_{i=1}^{2} \sin n\delta i \times \sin n\theta(i+1) - 1 \right\} \right]^2$$

Further, temporary parameters θ1L, θ2L and θ3L are, respectively, set at values of the parameters θ1, θ2 and θ3. Then, the procedure proceeds to step S32.

Further, in case of the negative judgment at step S28A, the procedure proceeds to step S32.

Effects in the second embodiment will be described.

The unit 38 weights the amplitude of each higher-order harmonic wave by a weighting factor such that the weighting factor is decreased with the order of the higher-order harmonic wave, and the unit 38 determines the parameters θ2 and θ3 such that the sum of the weighted amplitudes of the higher-order harmonic waves is minimized.

Therefore, as the order of the higher harmonic wave becomes low, the contribution of the higher harmonic wave on the weighted quantitative value Q1w of higher harmonic waves is decreased. Accordingly, torque ripple caused in the torque of the generator 10 by the higher harmonic waves can be reduced.

Further, in this embodiment, the weighting factor for the amplitude of the n-th higher harmonic wave is set at a simple value such as 1/n. Accordingly, the amplitude of each higher harmonic wave can be easily weighted, and the weighting factor can be easily increased as the order of the higher harmonic wave is owe red.

Third Embodiment

In the first embodiment, to control the switching elements of the inverter IV and the generator 10 in the pulse pattern control, the production of the PWM signals Sgu, Sgv and Sgw in the control device 14 is performed according to the rotational angle θ detected by the sensor 15. More specifically, the sensor IS renews the angle θ every detecting timing, and the changing timing of the PWM signals is synchronized with the detecting timing of the sensor 15. This synchronization is called angle synchronization based on the angle θ.

However, when the electrical angular speed we of the generator 10 is low, the phase of the controlled voltage Vc outputted from the inverter IV is controlled at a low controllability. The reason is that the minimum value $\Delta\theta(=2\pi P/C$; P denotes the number of pole pairs in the generator 10) detectable by the sensor 15 is fixed due to the resolution C of the sensor 15, regardless of the angular speed as ωe. For example, when the electrical angle cycle duration of the generator 10 is expressed by r bits (r is a positive integer), the resolution C is expressed by $2^r$, and the value $\Delta\theta$ is expressed by $2\pi P/2^r$. In this case, the time resolution $\Delta\theta/\omega e \times 60$ (ωe: radians per minute) of the sensor 15 in the detection of the rotational angle θ is expressed by $120\pi P/(\omega e \cdot 2^r)$ seconds.

Figure 17:
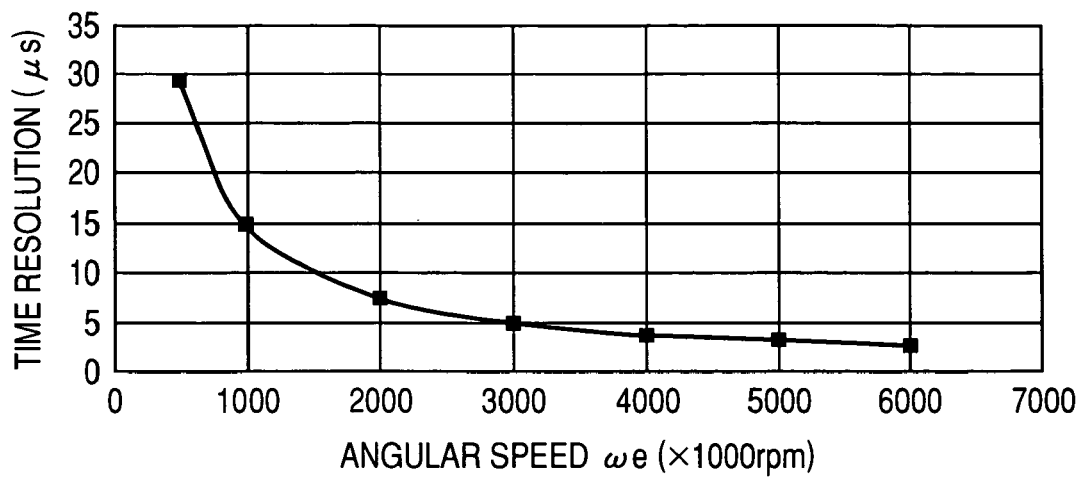
FIG. 17 shows the relation between an electrical angular speed of a generator and the time resolution in detecting the angular speed.

Therefore, as the angular speed ωe is lowered, the time resolution undesirably becomes longer. The relation between the angular speed ωe of the generator 10 and the time resolution of the sensor 15 is shown in FIG. 17. When the resolution of the sensor 15 is lowered (i.e., when the time resolution becomes longer), the controllability of the device 14 for the switching elements of the inverter IV is lowered.

In this third embodiment, even when the angular speed ωe of the generator 10 is lowered so as to undesirably lengthen the time resolution, the control device 14 produces the PWM signals Sgu, Sgv and Sgw while maintaining the controllability for the switching elements of the inverter IV at a high level. That is, when the controllability in the pulse pattern control based on the angle synchronization using the rotational angle θ is lowered, the device 14 switches the angle synchronization to the time synchronization.

Figure 18:
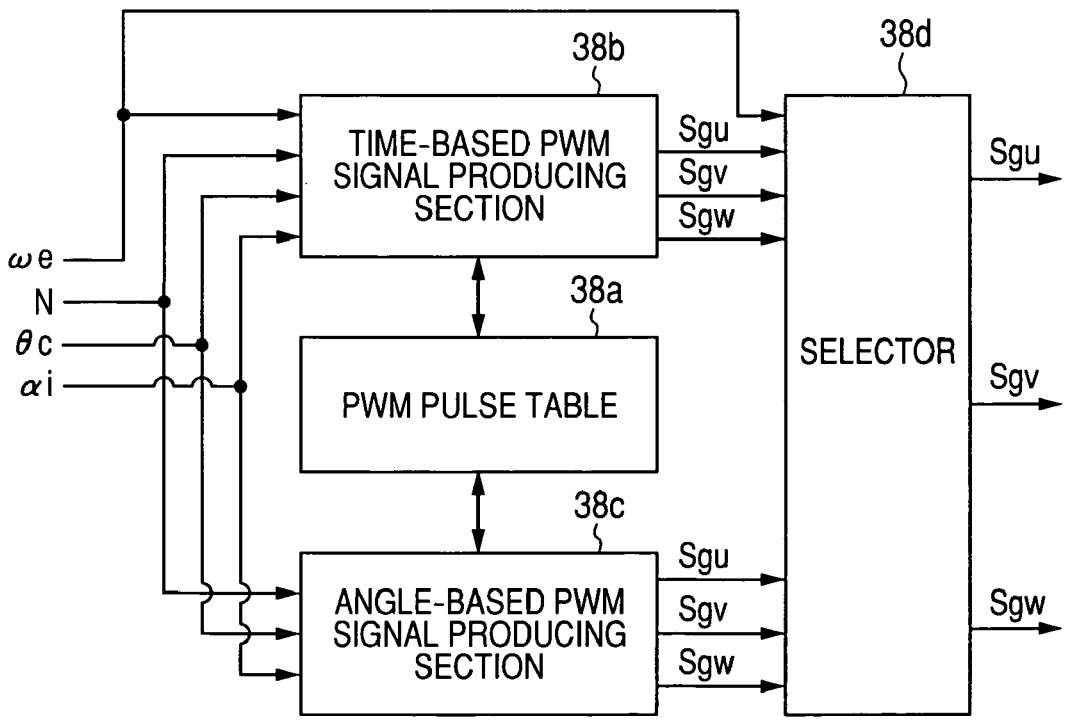
FIG. 18 is a block diagram of a PWM signal producing unit according to the third embodiment of the present invention.

FIG. 18 is a block diagram of the unit 38 according to the third embodiment. As shown in FIG. 18, the unit 38 has the PWM pulse table 38a for storing the parameters θ1 and θi (i≧2) corresponding to each value of the modulation factor for each value of the synchronization number N and preparing and storing a pulse pattern corresponding to each value of the modulation factor for each value of the synchronization number N, a time-based PWM signal producing section 38b for producing the PWM signals Sgu, Sgv and Sgw in a time-based mode based on the time synchronization such that each PWM signal has a waveform shaped in the selected pulse pattern corresponding to the instructed modulation factor and the synchronization number N determined in the unit 37, an angle-based PWM signal producing section 38c for selecting one pulse pattern corresponding to the instructed modulation factor and the synchronization number N determined in the unit 37 and producing the PWM signals Sgu, Sgv and Sgw from the selected pulse pattern in an angle-based mode based on the angle synchronization according to the first embodiment, and a selector 38d for selecting the PWM signals produced in one of the sections 38b and 38c according to the time resolution $\Delta\theta/\omega e$. The section 38c is operated in the same manner as the unit 38 (see FIG. 2) operated according to the first embodiment. Therefore, the description of the section 38c is omitted, and the section 38b will be described in detail.

Figure 19:
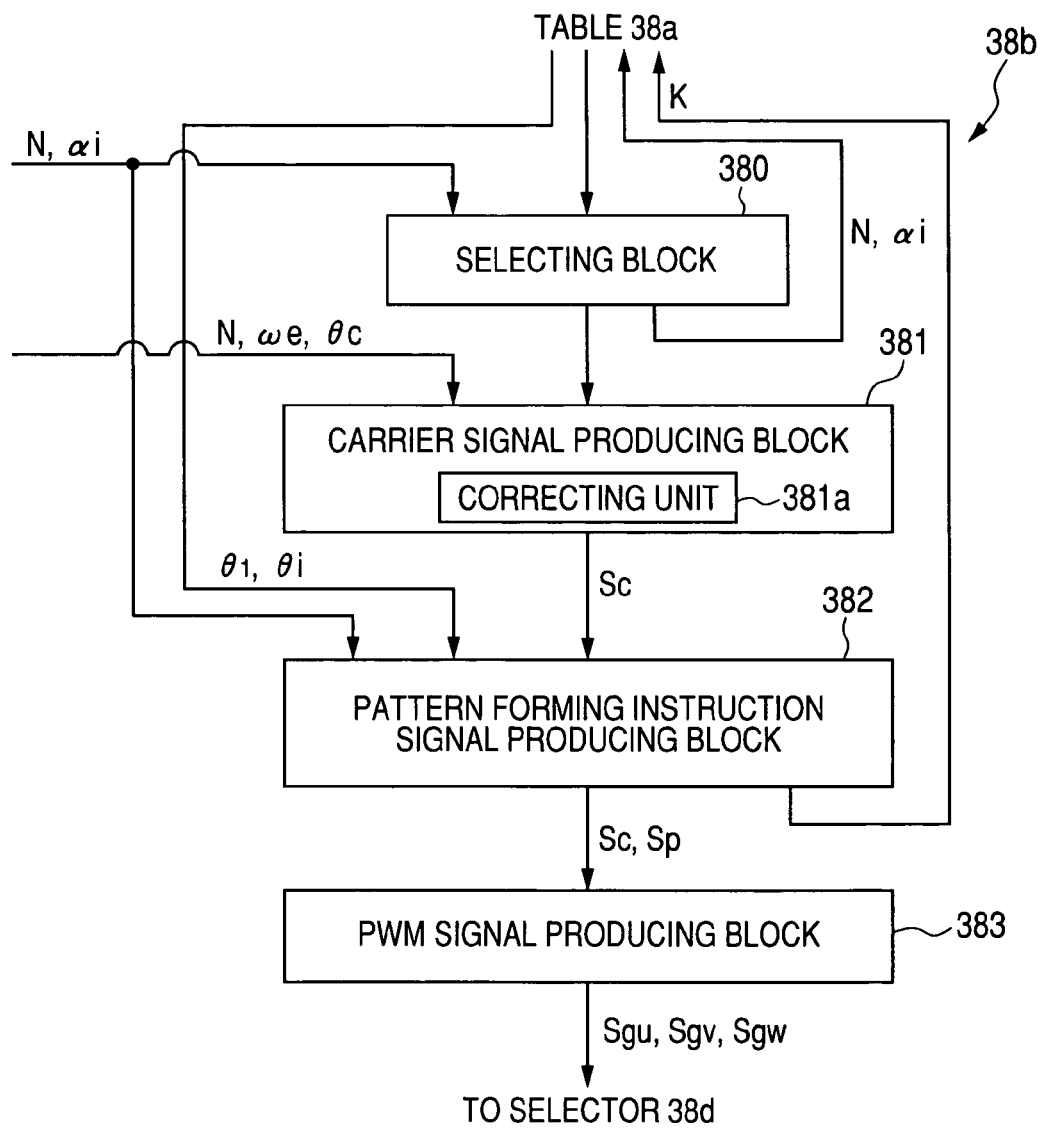
FIG. 19 is a block diagram of a time-based PWM signal producing section according to the third embodiment.

FIG. 19 is a block diagram of the section 38b. As shown in FIG. 19, the section 38b has a selecting block 380, a carrier signal producing block 381, a pattern forming instruction signal producing block 382 and a PWM signal producing block 383. The block 380 selects the parameters θ1 and θi (i≧2), corresponding to the instructed modulation factor αi and the synchronization number N determined in the unit 37, from the parameters of the table 38a.

The block 381 determines a maximum value Cmax (>0) and a minimum value Cmin (<0), of which the absolute values are equal to each other, by counting a count value in an up-down counter (not shown) while cyclically renewing the count value between the maximum and minimum values every predetermined period of time Tc, calculates the electrical angle cycle duration $2\pi/\omega e$ of the generator 10 according to the angle speed ωe calculated in the unit 24 and produces a carrier signal Sc having a waveform of a triangular wave such that the carrier signal Sc has a maximum level Cmax equal to the maximum value and a minimum level Cmin equal to the minimum value. The cycle duration $2\pi/(N\omega e)$ of the carrier signal Sc is set to be equal to a value obtained by dividing the electrical angle cycle duration $2\pi/\omega e$ of the generator 10 by the synchronization number N.

The block 381 has a correcting unit 381a that corrects the phase of the carrier signal Sc according to the rotational angle θc of the generator 10.

The block 382 produces a pattern forming instruction signal Sp, defined in one electrical angle cycle duration $2\pi/\omega e$ of the generator 10, such that each PWM signal having the waveform shaped in the selected pulse pattern are produced by comparing the level of the signal Sp and the level of the carrier signal Sc.

The block 383 produces the PWM signal Sgu, Sgv and Sqw shaped in the selected pulse pattern by comparing the signal Sp and the carrier signal Sc in the electrical angle cycle duration $2\pi/\omega e$ of the generator 10.

Figure 27:
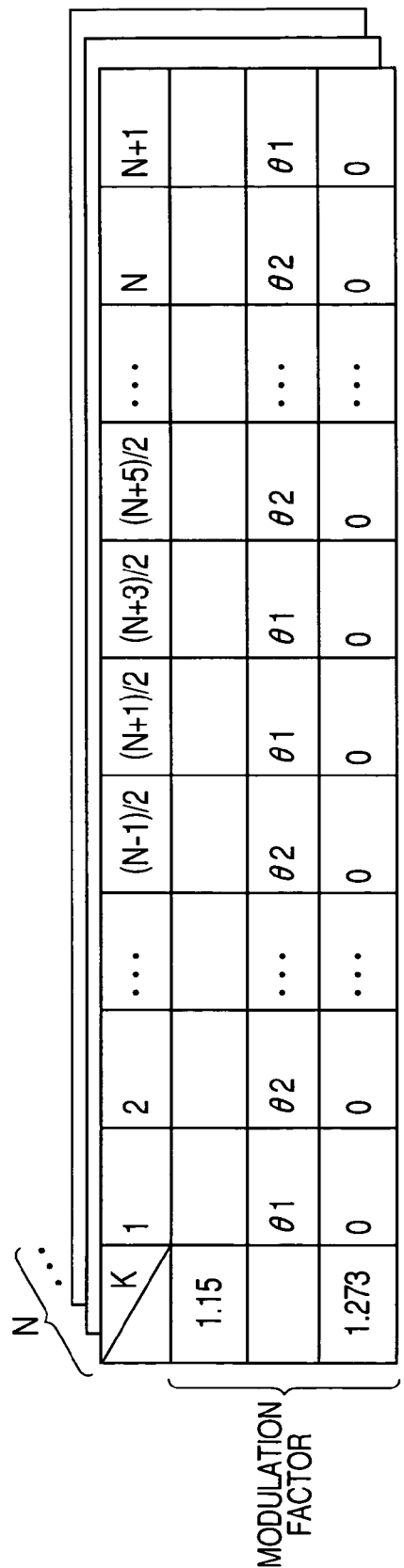
FIG. 27 shows the relation of instruction periods and parameters stored in a pulse table.

More specifically, the table 38a stores the parameters such that each parameter θ1 or θi corresponds to one of a plurality of instruction periods K (see FIG. 27). The block 381 determines positions of the instruction periods K in the cycle duration $2\pi/\omega e$ of the generator 10 such that each instruction period K in the first half (i.e., in the period from 0 to $\pi/\omega e$) of the electrical angle cycle duration of the generator 10 includes a timing synchronized with one crest point of the triangular wave while each instruction period K in the second half (i.e., in the period from $\pi/\omega e$ to $2\pi/\omega e$) of the cycle duration of the generator 10 includes a timing synchronized with the trough point of the triangular wave.

The block 382 produces the instruction signal Sp such that the instruction signal Sp has two intersections with the triangular wave, in the instruction period K corresponding to each parameter θ1 or θi selected in the block 380, to specify a first period θ1/ωe or 2θi/ωe, corresponding to the parameter θ1 or θi, between the intersections in the first half of the cycle duration of the generator 10 and to specify a second period θ1/ωe or 2θi/ωe, corresponding to the parameter θ1 or θi, between the intersections in the second half of the cycle duration of the generator 10.

The block 383 produces the same pulse pattern as the selected pulse pattern by comparing the signals Sc and Sp and produces the PWM signals each of which is set at the low level during each first period and is set at the high level during each second period.

Figure 20:
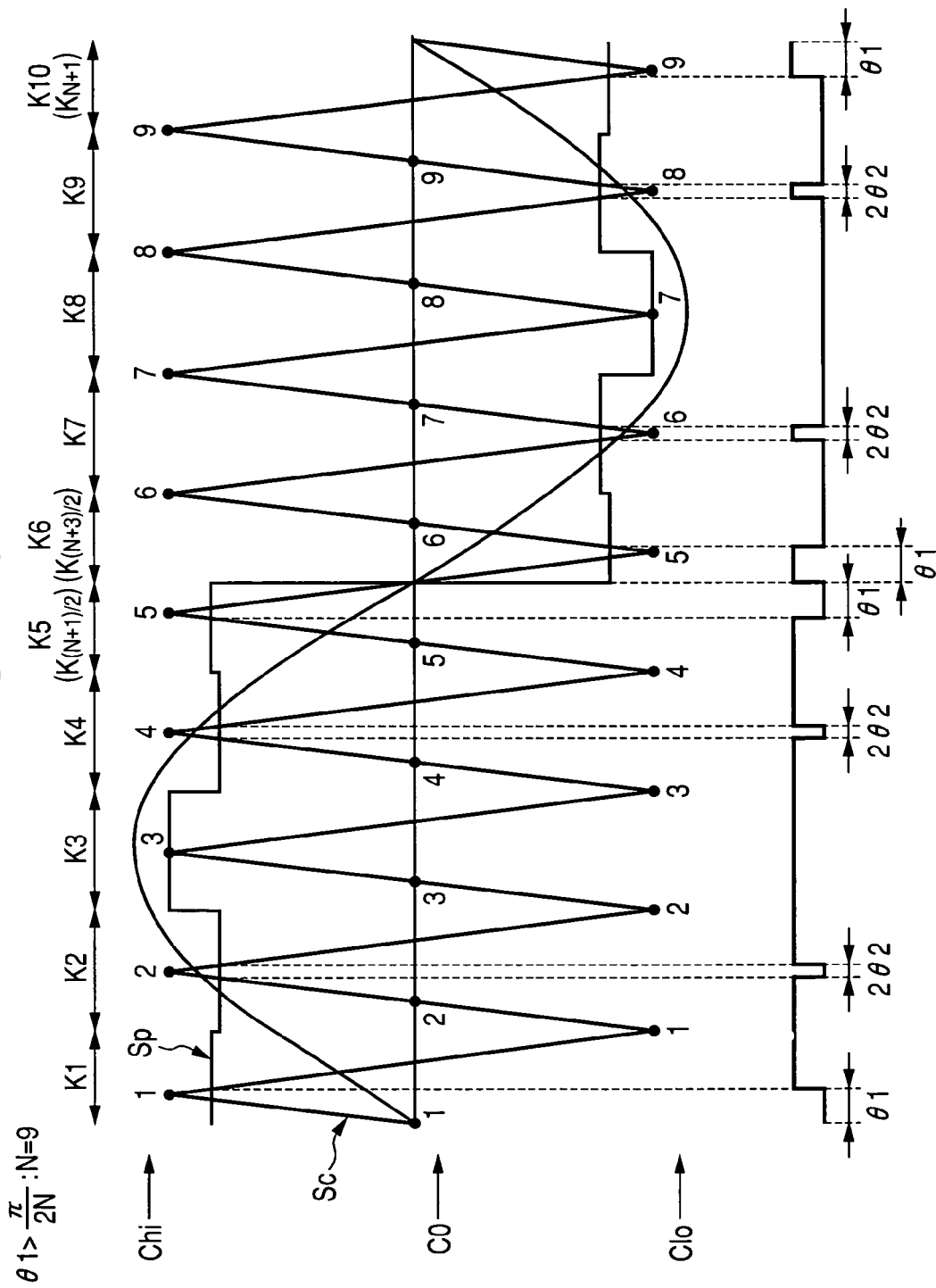
FIG. 20 is a time chart showing a carrier signal and an instruction signal in case of $\theta 1 > \pi/(2N)$.
Figure 21:
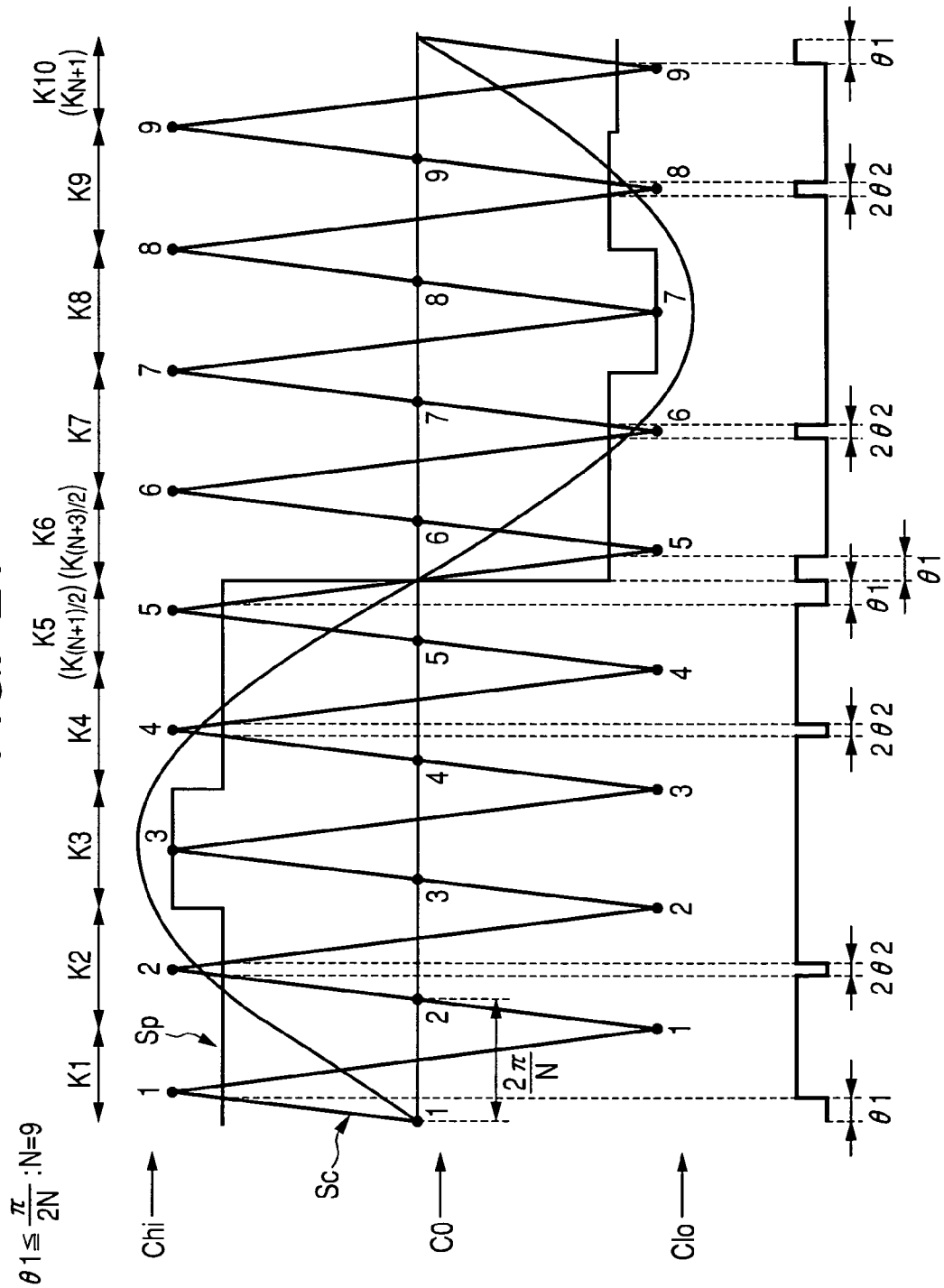
FIG. 21 is a time chart showing a carrier signal and an instruction signal in case of $\theta 1 \leq \pi/(2N)$.

FIG. 20 is a time chart showing the carrier signal Sc, produced based on the time synchronization, and the instruction signal Sp, produced from the parameters θ1 and θi, in case of θ1>πt/(2N), while FIG. 21 is a time chart showing the carrier signal Sc, produced based on the time synchronization, and the instruction signal Sp, produced from the parameters θ1 and θi, in case of θ1≦π/(2N).

As shown in each of FIG. 20 and FIG. 21, the carrier signal Sc having a waveform of a triangular wave (i.e., a series of triangular pulses) and the amplitude (i.e., maximum level) Cmax is prepared such that the product of the cycle duration of the carrier signal and the synchronization number N becomes equal to the electrical angle cycle duration 2π/ωe of the generator 10. This signal Sc is produced by increasing or decreasing a count value of an up-down counter every period of time Tc (see FIG. 25). The pulse width determining parameters θ1 and θi corresponding to the instructed modulation factor αi and the synchronization number N are defined in advance in each of four quarter regions of the cycle duration 2π/ωe of the generator 10. Then, the signal Sp having the level Y is produced such that the level Y of the signal Sp is lower than the level of the signal Sc during the first period, defined in each instruction period K corresponding to one parameter θ1 or θi in the first half of the cycle duration 2 π/ωe, and is higher than the level of the signal Sc during the second period, defined in each instruction period K corresponding to one parameter θ1 or θi in the second half of the cycle duration 2π/ωe (see FIG. 28 and FIG. 29). Then, each of the PWM signals Sgu, Sgv and Sqw is set at the low level during each first period and is set at the high level during each second period.

In the first embodiment, each first or second period set in the selected pulse pattern according to one parameter θi (i≧2) is symmetric with respect to the corresponding crest or trough point of the triangular wave shown in FIG. 5 or FIG. 6. Therefore, in the third embodiment, the PWM signals are set such that each first or second period of each PWM signal becomes symmetric with respect to the corresponding crest or trough point of the carrier signal Sc. Therefore, when the level Y of the signal Sp is determined, in each instruction period Km (m=1, ..., N+1) corresponding to one parameter θi, according to the ratio of the period 2θi/ωe determined by the parameter θi to one half of the cycle duration 2π/(Nωe) of the carrier signal Sc, the PWM signal Sgu, Sgv and Sqw can be simply produced by comparing the signal Sp and the signal Sc, in the same manner as in the triangular wave comparison PWM control (see FIG. 33).

Figure 22:
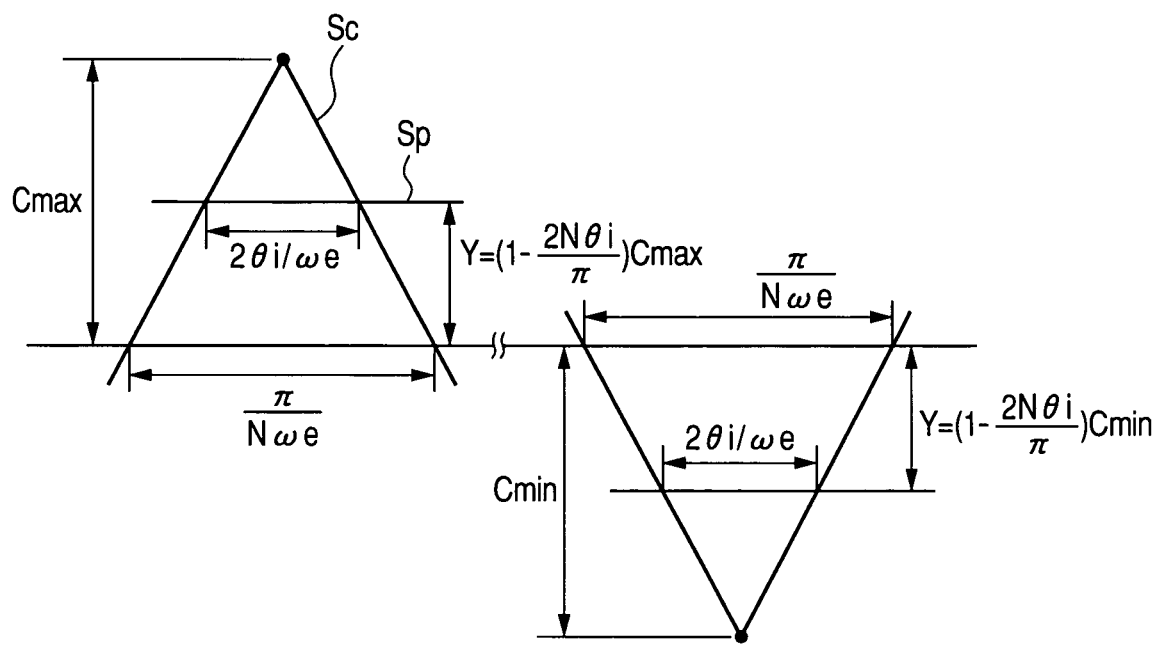
FIG. 22 shows the relation between the period determined by each parameter and one half of one cycle duration of the carrier signal.

The determination of the level Y of the signal Sp in the first or second period corresponding to each parameter θi (i≧2) will be described with reference to FIG. 20, FIG. 21 and FIG. 22. FIG. 22 shows the relation θi between the period 2θi/ωe determined by each parameter θi and one half of the cycle duratxion 2π/(Nωe) of the carrier signal Sc.

In each instruction period Km (m=2, ..., (N−1)/2) corresponding to one parameter θi in first and second quarter regions of the cycle duration 2π/ωe in which the sum of the second periods set at the high level is longer than the sum of the first periods set at the low level, the block 382 sets the level Y of the signal Sp at a value equal to the product (1−2Nθi/π) Cmax of the maximum value Cmax and the ratio 1−2Nθi/π of the subtracted value π/(Nωe)−2θi/ωe, obtained by subtracting the first period 2π/ωe from one half π/(Nωe) of the cycle duration 2π/(Nωe) of the carrier signal Sc, to the half π/(Nωe) of the cycle duration 2πt/(Nωe) of the carrier signal Sc.

In each instruction period Km not corresponding to any parameter in the first and second quarter regions of the cycle duration 2π/ωe, the level Y of the signal Sp is set at the value Cmax.

In each instruction period Km (m=(N+5)/2, ..., N) corresponding to one parameter θi in third and fourth quarter regions of the cycle duration 2π/ωe in which the sum of the second periods set at the high level is shorter than the sum of the first periods set at the low level, the block 382 sets the level Y of the signal Sp at an instruction value equal to a product (1−2Nθi/π)Cmin of the minimum value Cmin and a ratio 1−2Nθi/π of a subtracted value π/(Nωe)−2θi/ωe, obtained by subtracting the second period 2θi/ωe from the half π/(Nωe) of the cycle duration 2π/(Nωe) of the carrier signal Sc, to the half π/(Nωe) of the cycle duration 2π/(Nωe) of the carrier signal Sc.

In each instruction period Km not corresponding to any parameter in the third and fourth quarter regions of the cycle duration 2π/ωe, the level Y of the signal Sp is set at the value Cmin.

In contrast, when the level of the signal Sp is determined in the instruction periods Km (m=1, (N+1)/2, (N+3)/2 and N+1) corresponding to the parameter θ1 in the same manner as the determination in the instruction periods corresponding to the parameters θi, the PWM signals produced in the same manner as in the triangular wave comparison PWM control cannot correctly have the first and second periods in the instruction periods Km. That is, when the signal Sp determined in the instruction periods corresponding to the parameters θ1 in the same manner as the process described above is used, the switching elements of the inverter IV correctly switched at one intersection between the signal Sp and the carrier signal Sc is not correctly switched at another intersection. That is, the levels of the PWM signals cannot be correctly changed.

More specifically, the signal Sp intersects the carrier signal Sc at each of two first intersections closest to the boundary between the fourth and first quarter regions of the cycle duration 2π/ωe, in which the first period is shortened in the time direction, and at each of two first intersections closest to the boundary between the second and third quarter regions of the cycle duration 2π/ωe in which the first period is lengthened in the time direction. Further, the signal Sp intersects the carrier signal Sc at a second intersection adjacent to each first intersection to be away from the corresponding boundary. That is, each second intersection is closest to the boundary, next to the first intersection. Moreover, there is third intersections each of which is close to the boundary, next to the second intersection.

As shown in FIG. 20, in case of θ1>π/(2N), the level of the PWM signal is maintained at each first intersection. That is, the level of the PWM signal in the period between the first and second intersections adjacent to each other is exceptionally maintained in the period between the boundary and the first intersection. In contrast, as shown in FIG. 21, in case of $\theta 1 \leq \pi/(2N)$, the level of the PWM signal is maintained at each second intersection, but is changed at each first intersection. More specifically, the level of the PWM signal to be set in the period between the first and second intersections in case of the parameter $\theta i$ is not set in the period between the first and second intersections in case of the parameter $\theta 1$ but is set in the period between the boundary and the first intersection in case of the parameter $\theta 1$. In other words, the level of the PWM signal changed at a timing of the first intersection is exceptionally maintained until a timing of the third intersection, and the level of the PWM signal is changed at the timing of the third intersection.

Figure 23:
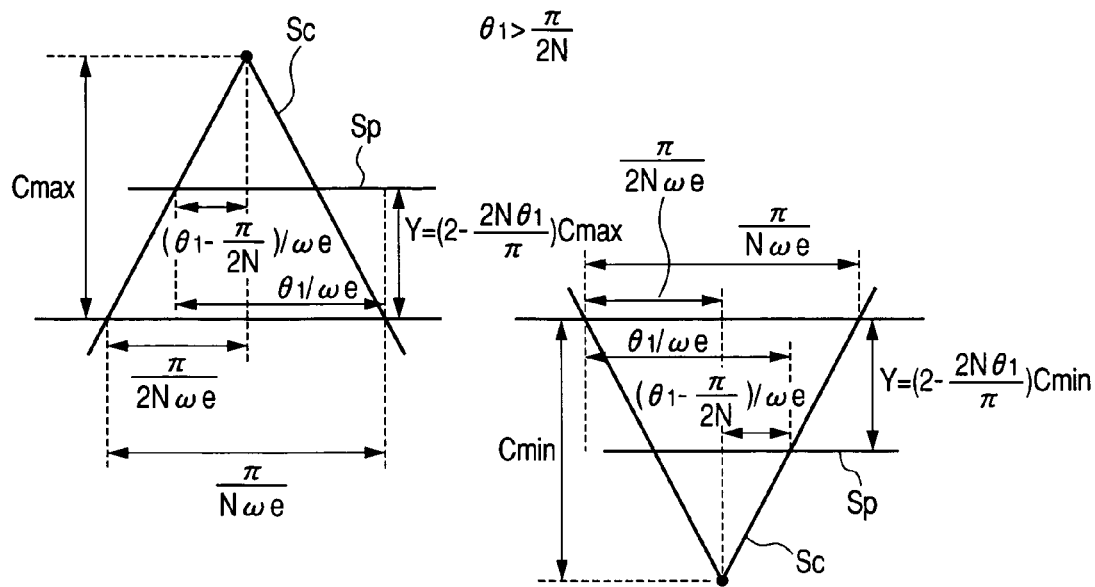
FIG. 23 shows the relation between the period determined by a parameter $\theta 1$ and one half of one cycle duration of the carrier signal in case of $\theta 1 \leq \pi/(2N)$.
Figure 24:
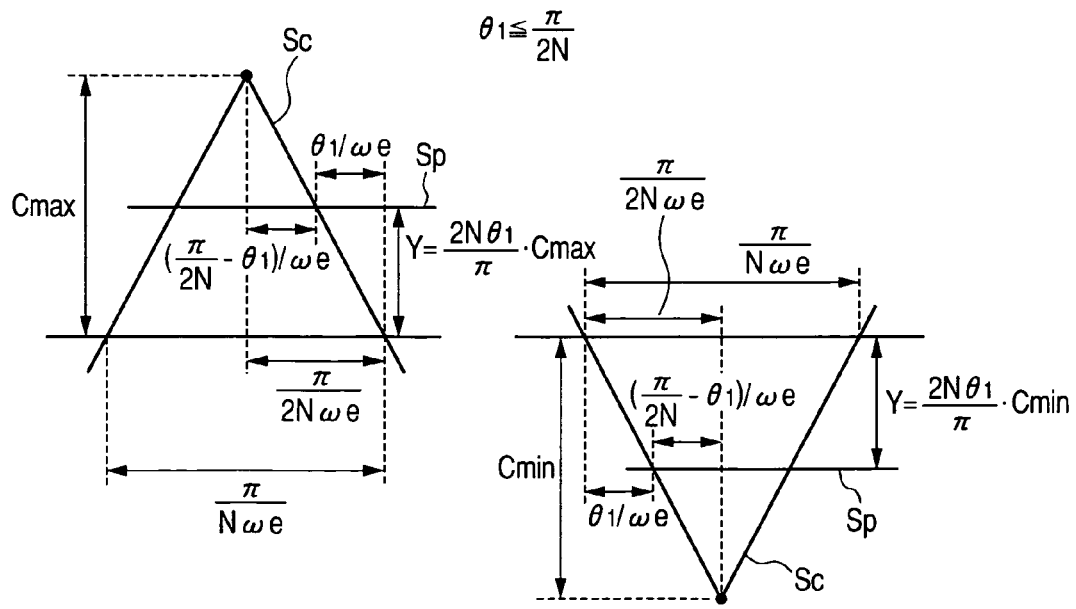
FIG. 24 shows the relation between the period determined by a parameter $\theta 1$ and one half of one cycle duration of the carrier signal in case of $\theta 1 \leq \pi/(2N)$.

The determination of the level Y of the signal Sp in each first or second period corresponding to the parameter $\theta 1$ will be described with reference to FIG. 20, FIG. 21, FIG. 23 and FIG. 24. FIG. 23 shows the relation between the period $\theta 1/\omega e$ determined by each parameter $\theta 1$ and one half of the cycle duration $2\pi/(N\omega e)$ of the carrier signal Sc in case of $\theta 1 > \pi/(2N)$, while FIG. 24 shows the relation between the period $\theta 1/\omega e$ determined by each parameter $\theta 1$ and one half of the cycle duration $2\pi/(N\omega e)$ of the carrier signal Sc in case of $\theta 1 \leq \pi/(2N)$.

When the period $\theta 1/\omega e$ is longer than the quarter $\pi/(2N\omega e)$ of the cycle duration $2\pi/(N\omega e)$ of the carrier signal Sc (see FIG. 20 and FIG. 23), in each instruction period Km (m=1 or (N+1)/2) corresponding to the parameter $\theta 1$ in the first and second quarter regions of the cycle duration $2\pi/\omega e$ in which the sum of the second periods is longer than the sum of the first periods, the block 382 sets the level Y of the signal Sp at the instruction value $(2-2N\theta 1/\omega)$Cmax which is lower than the maximum value Cmax by the product $(2N\theta 1/\pi-1)$Cmax of the maximum value Cmax and the ratio $2N\theta 1/\pi-1$ of the subtracted value $\theta 1/\omega e-\pi/(2N\omega e)$, obtained by subtracting one quarter $\pi/(2N\omega e)$ of the cycle duration $2\pi/(N\omega e)$ of the carrier signal Sc from the period $\theta 1/\omega e$, to the quarter $\pi/(2N\omega e)$ of the cycle duration $2\pi/(N\omega e)$ of the carrier signal Sc.

When the period $\theta 1/\omega e$ is shorter than one quarter $\pi/(2N\omega e)$ of the cycle duration $2\pi/(N\omega e)$ of the carrier signal Sc (see FIG. 21 and FIG. 24), in each instruction period Km (m=1 or (N+1)/2) corresponding to the parameter $\theta 1$ in the first and second quarter regions of the cycle duration $2\pi/\omega e$ in which the sum of the second periods is longer than the sum of the first periods set at the low level, the block 382 sets the level Y of the signal Sp at the instruction value $2N\theta 1$ Cmax/$\pi$ which is lower than the maximum value Cmax by the product $(1-2N\pi\theta 1)$Cmax of the maximum value Cmax and the ratio $1-2N\pi\theta 1$ of a subtracted value $\pi/(2N\omega e)-\theta 1/\omega e$, obtained by subtracting the period $\theta 1/\omega e$ from one quarter $\pi/(2N\omega e)$ of the cycle duration $2\pi/(N\omega e)$ of the carrier signal Sc, to one quarter $\pi/(2N\omega e)$ of the cycle duration $2\pi/(N\omega e)$ of the carrier signal Sc.

When the period $\theta 1/\omega e$ is longer than one quarter $\pi/(2\omega e)$ of the cycle duration $2\pi/(N\omega e)$ of the carrier signal Sc (see FIG. 20 and FIG. 23), in each instruction period Km (m=(N+3)/2 or N+1) corresponding to the parameter $\theta 1$ in the third and fourth quarter regions of the cycle duration $2\pi/\omega e$ in which the sum of the second periods is shorter than the sum of the first periods set, the block 382 sets the level Y of the signal Sp at the instruction value $(2-2N\theta 1/\pi)$Cmin which is higher than the minimum value Cmin by the product $(2N\theta 1/\pi-1)$ of the minimum value Cmin and the ratio $2N\theta 1/\pi-1$ of the subtracted value $\theta 1/\omega e-\pi/(2N\omega e)$, obtained by subtracting one quarter $\pi/(2N\omega e)$ of the cycle duration $2\pi C/(N\omega e)$ of the carrier signal Sc from the period $\theta 1/\omega e$, to one quarter $\pi/(2N\omega e)$ of the cycle duration $2\pi/(N\omega e)$ of the carrier signal Sc.

When the period $\theta 1/\omega e$ is shorter than one quarter $\pi/(2N\omega e)$ of the cycle duration $2\pi/(N\omega e)$ of the carrier signal Sc (see FIG. 21 and FIG. 24), in each instruction period Km (m=(N+3)/2 or N+1) corresponding to the parameter $\theta 1$ in the third and fourth quarter regions of the cycle duration $2\pi/\omega e$ in which the sum of the second periods set at the high level is shorter than the sum of the first periods set at the low level, the block 382 sets the level Y of the signal Sp at the instruction value $2N\theta 1$Cmin/$\pi$ which is lower than the minimum value Cmin by the product $(1-2N\pi\theta 1)$Cmin of the minimum value Cmin and the ratio $1-2N\pi\theta 1$ of the subtracted value $\pi/(2N\omega e)-\theta 1/\omega e$, obtained by subtracting the period $\theta 1/\omega e$ from one quarter $\pi/(2N\omega e)$ of the cycle duration $2\pi/(N\omega e)$ of the carrier signal Sc, to one quarter $\pi/(2N\omega e)$ of the cycle duration $2\pi/(N\omega e)$ of the carrier signal Sc.

When the period $\theta 1/\omega e$ is longer than one quarter $\pi/(2N\omega e)$ of the cycle duration $2\pi/(N\omega e)$ of the carrier signal Sc (see FIG. 20), the PWM signal producing block 383 changes the level of each PWM signal to another level, in synchronization with each of the boundary between the fourth and first quarter angle regions successively placed in the repeated pattern and the boundary between the second and third quarter angle regions successively placed in the repeated pattern, and continues the changed level of the PWM signal until a timing of the second intersection.

When the period $\theta 1/\omega e$ is shorter than one quarter $\pi/(2N\omega e)$ of the cycle duration $2\pi/(N\omega e)$ of the carrier signal Sc (see FIG. 21), the block 383 changes a first level of each PWM signal to a second level in synchronization with each of the boundaries, continues the changed level of the PWM signal until a timing of the first intersection, changes the second level of the control signal to the first level in synchronization with the timing of the first intersection, and continues the changed level of the PWM signal until a timing of the third intersection.

In this embodiment, as shown in FIG. 20 and FIG. 21, the parameters $\theta i$ includes parameters $\theta i$ set at zero. The parameters $\theta i$ including parameters $\theta i$ set at zero can be set by changing the condition $\theta i \geq \theta min$ to the condition $\theta i \geq \theta min$ or $\theta i = 0$.

Figure 25:
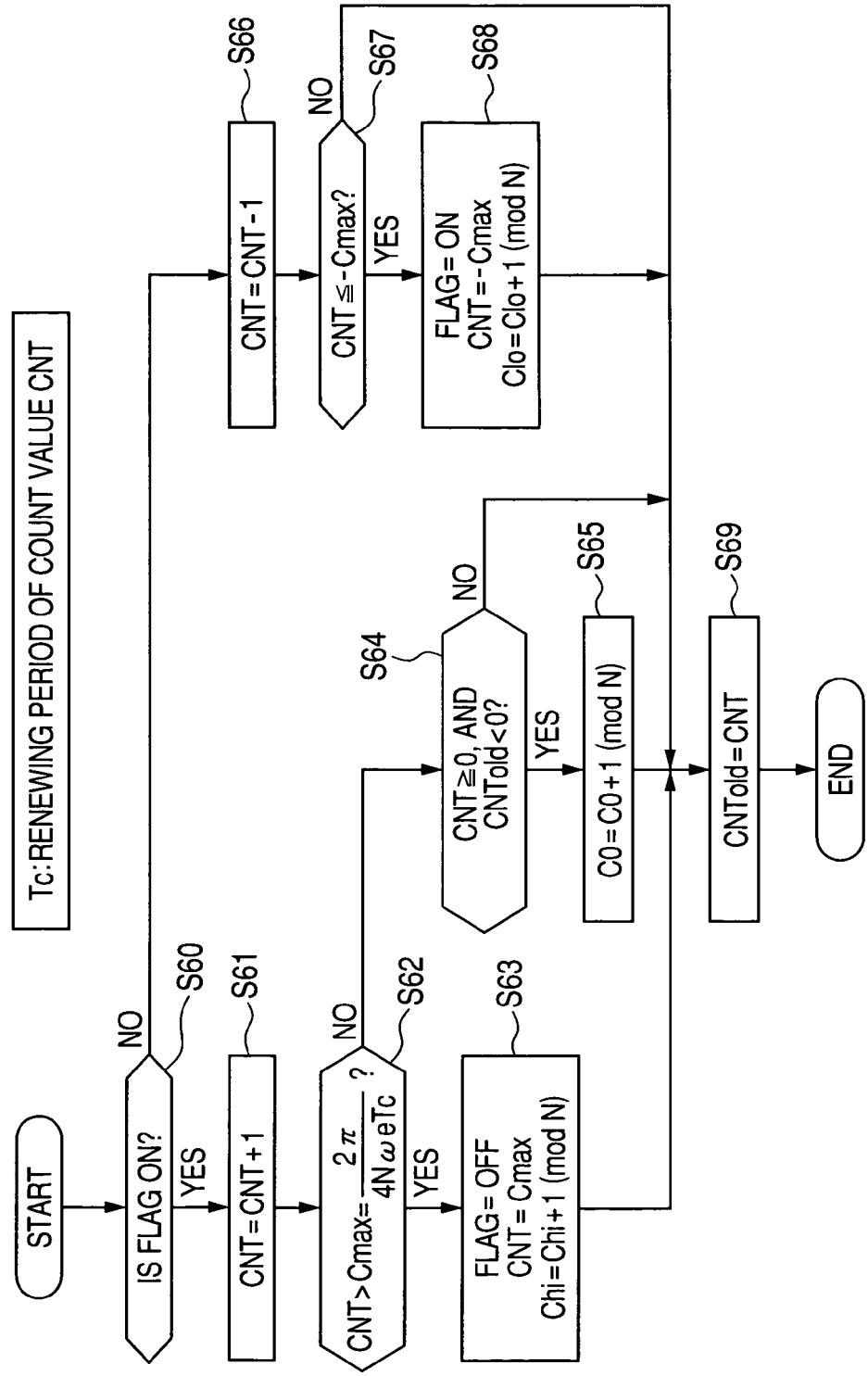
FIG. 25 is a flow chart showing a level changing process repeatedly performed to produce the carrier signal.

The process for producing the carrier signal Sc in the block 381 will be described in detail. To produce the carrier signal Sc, the number of the crest point, the number of the starting point of each triangular pulse and the number of the trough point in the signal Sc are set by repeatedly performing the process for changing the level of the signal Sc by a predetermined value. FIG. 25 is a flow chart showing this level changing process repeatedly performed in the block 381 to produce the carrier signal Sc. This level changing process is performed every first predetermined period of time Tc.

More specifically, a count value CNT of the up-down counter is incremented or decremented every first predetermined period of time Tc. The count value CNT indicates the level of the carrier signal Sc. The maximum value Cmax of the carrier signal Sc is set at $2\pi/(4N\omega eTc)$. The sensor 15 (see FIG. 1) detects the electrical angler speed to $\omega e$ of the generator 10 every second predetermined period of time to renew the angler speed toe every second predetermined period of time. The period Tc is set at a fixed value to be shorter than the second predetermined period of time.

As shown in FIG. 25, at step S60, it is judged whether or not an increasing flag is in the on state. The increasing flag in the on state indicates that the count value CNT is now increased, when the increasing flag is in the on state, at step S61, the count value CNT is incremented by one. Then, at step S62, it is judged whether or not the count value CNT is equal to or higher than the maximum value Cmax.

In the case of an affirmative judgment at step S62, at step S63, the increasing flag is set in the off state, and the count value CNT is set at the maximum value Cmax. Because the count value CNT sometimes exceeds the maximum value Cmax due to the renewal of the angler speed to ωe, the count value CNT is corrected to the maximum value Cmax. Further, the number Chi of the crest point of the carrier signal Sc is incremented (Chi=Chi+1). More specifically, the number Chi is cyclically set between 1 and the synchronization number N, when the number Chi has been already set at N in the last process, the number Chi is set at 1. In the example shown in FIG. 20 and FIG. 21, the number Chi is cyclically set between 1 and 9.

In contrast, in the case of a negative judgment at step S62, it is judged at step S64 whether or not the count value CNT is equal to or higher than 0 while the count value CNTold set in the last process is negative. This judgment is performed to judge whether or not the timing in this process is placed at the starting point (i.e., the level equal to 0) of one triangular pulse of the carrier signal Sc. In the case of an affirmative judgment at step S64, at step S65, the number CO of the starting point of the carrier signal Sc is incremented. The number CO is cyclically set between 1 and N. When the number CO has been already set at N in the last process, the number CO is not incremented, but is set at 1. In the example shown in FIG. 20 and FIG. 21, the number CO is cyclically set between 1 and 9.

In contrast, in the case of a negative judgment at step S60, at step S66, the count value CNT is decremented. Then, at step S67, it is judged whether or not the count value CNT is equal to or lower than the value −Cmax (i.e., the minimum value Cmin) obtained by multiplying the maximum value Cmax by −1. In the case of an affirmative judgment at step S67, at step S68, the increasing flag is set at the on state, the count value CNT is set at the value −Cmax. Because the count value CNT sometimes become lower than the value −Cmax due to the renewal of the angler speed toe, the count value CNT is corrected to the value −Cmax. Further, the number Clo of the trough point of the carrier signal Sc is incremented (Clo=Clo+1). More specifically, the number Clo is cyclically set between 1 and the synchronization number N. When the number Clo has been already set at N in the last process, the number Clo is set at 1. In the example shown in FIG. 20 and FIG. 21, the number Clo is cyclically set between 1 and 9.

After the processing at step S63, step S65 or step S68 or in the case of a negative judgment as step S64, at step S69, the last count value CNTold is set at the count value CNT. Therefore, each of the numbers Chi, CO and Clo in the carrier signal Sc can be cyclically set between 1 and N.

Because the count value CNT is renewed every period of time Tc to produce the carrier signal Sc. The precision in the determination of the level of the signal Sc depends on the period Tc. As described later in detail, the timing of the level change of each PWM signal is determined by comparing the level of the signal Sc and the level of the signal Sp. Therefore, the precision in the determination of the level changing timing of each PWM signal depends on the period Tc, so that the PWM signals are produced in the unit 38b in the time-based mode based on the time synchronization.

Further, because the renewing period Tc of the count value CNT is shorter than the renewing period of the electrical angler speed ωe, the controllability for the switching elements of the inverter IV in the time-based mode can be heightened, as compared with the controllability in the angle-based mode based on the angle synchronization.

Figure 26:
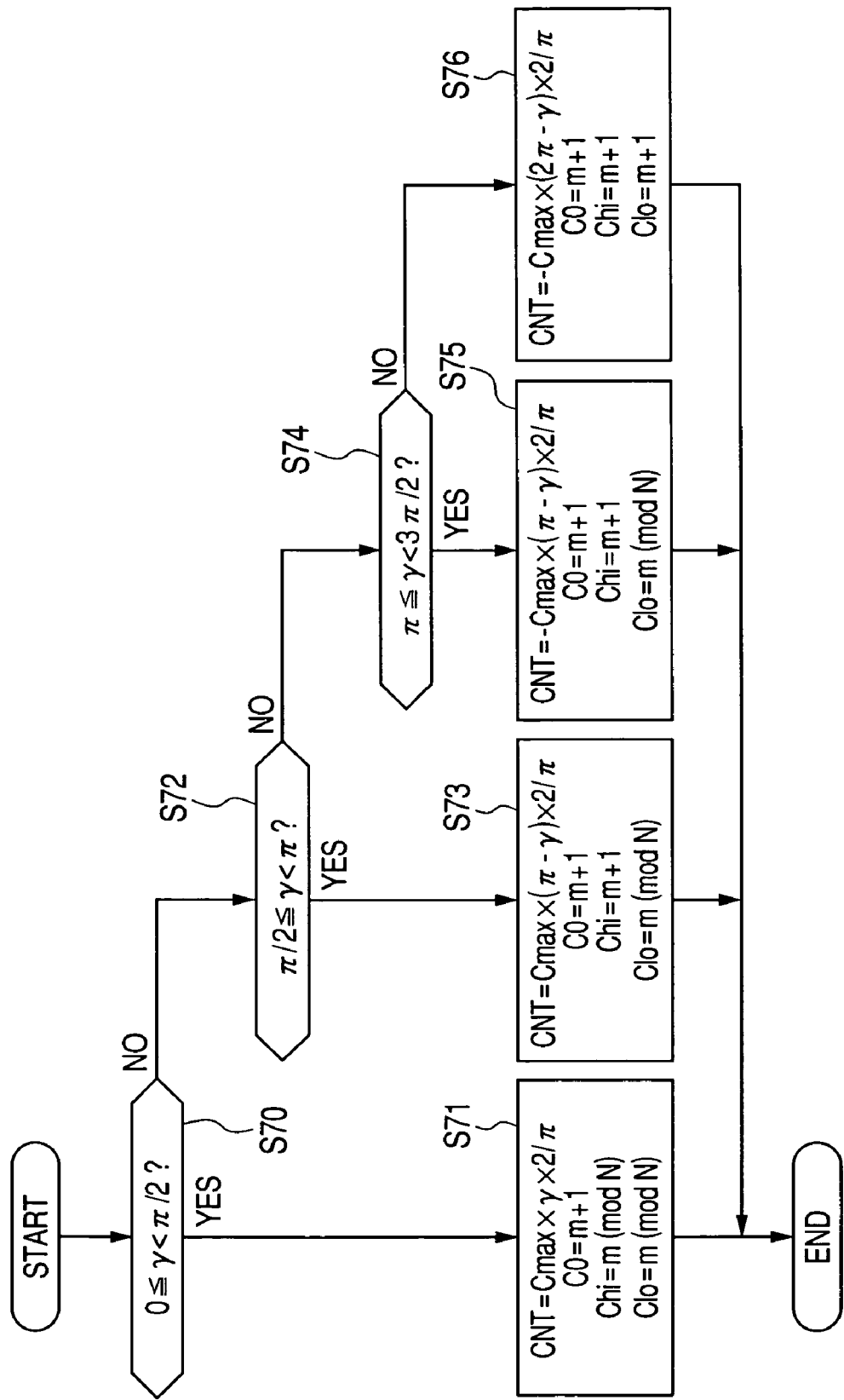
FIG. 26 is a flow chart showing a process for correcting a count value to correct a phase of the carrier signal.

The process for correcting the count value CNT in the correcting unit 381a of the block 381 according to the phase information outputted from the adder 31 will be described in detail. The phase information indicates the controlled phase θc of the controlled voltage Vc. FIG. 26 is a flow chart showing the process for correcting the count value CNT in the block 381. This process is performed every third predetermined period of time longer than the period Tc.

As shown in FIG. 26, at step S70, it is judged whether or not the phase γ of the carrier signal Sc is equal to or larger than 0 and is smaller than π/2. This phase γ is determined from the controlled phase θc (=θe+θcmd) of the controlled voltage Vc indicated by the phase information. The phase γ satisfies the relation N×(θe+θcmd)=2mπ+γ (variable m, and 0≦γ<2π). In the case of an affirmative judgment at step S70, at step S71, the count value CNT is renewed or corrected at Cmax×γ×2/π by using the phase γ. In this process, because the timing at the phase γ (0≦γ<π/2) is placed between the starting point and the crest point in the current triangular pulse of the carrier signal Sc, the count value CNT is corrected based on the ratio γ×2/π of the phase γ to the phase interval π/2. Further, the number CO of the starting point is renewed at m+1 by using the variable m used for the definition of the phase 7, and each of the number Chi of the crest point and the number Clo of the trough point in the carrier signal Sc is set at m in case of m≠0 and is set at N in case of m=0.

In contrast, in the case of an affirmative judgment at step S70, at step S72, it is judged whether or not the phase γ is equal to or larger than π/2 and is smaller than π. In the case of an affirmative judgment at step S72, at step S73, the count value CNT is renewed or corrected at Cmax×(π−γ)×2/π by using the phase γ. In this process, because the timing at the phase γ (π/2≦γ<π) is placed between the crest point and the center in the current triangular pulse of the carrier signal Sc, the count value CNT is corrected based on the ratio (π−γ)×2/π of the distance π−γ between the phase (i.e., π) of the center and the phase γ to the phase interval π/2. Further, each of the number CO of the starting point and the number Chi of the crest point is renewed at m+1, and the number Clo of the trough point is set at m in case of m≠0 and is set at N in case of m=0.

In contrast, in the case of a negative judgment at step S72, at step S74, it is judged whether or not the phase γ is equal to or larger than Tt and is smaller than 3π/2. In the case of an affirmative judgment at step S74, at step S75, the count value CNT is renewed or corrected at −Cmax×(γ−π)×2/π by using the phase γ. In this process, because the timing at the phase γ(π/2≦γ<3π/2) is placed between the center and the trough point in the current triangular pulse of the carrier signal Sc, the count value CNT is corrected based on the value −Cmax and the ratio (γ−π)×2/π of the distance γ−π between the phase γ and the phase (i.e., π) of the center to the phase interval π/2. Further, each of the number CO of the starting point and the number Chi of the crest point is renewed at m+1, and the number Clo of the trough point is set at m in case of m≠0 and is set at N in case of m=0.

In contrast, in the case of a negative judgment at step S74, at step 376, the count value CNT is renewed or corrected at −Cmax×(2π−γ)×2/π by using the phase γ. In this process, because the timing at the phase γ(3π/2≦γ<2π) is placed between the trough point of the current triangular pulse and the starting point of the next triangular pulse in the carrier signal Sc, the count value CNT is corrected based on the value−Cmax and the ratio (2π−γ)×2/π of the distance 2π−γ between the phase γ and the phase (i.e., 2π) of the next starting point to the phase interval π/2. Further, each of the number CO of the starting point, the number Chi of the crest point and the number Clo of the trough point is renewed at m+1.

Because the count value CNT is corrected at step S71, step S73, step S75 and step S76, the phase r of the carrier signal Sc is substantially corrected according to the rotational angle θ detected by the sensor 15. Therefore, even when the cycle duration of the carrier signal Si is shifted from 2π/N, the cycle duration of the carrier signal Si can be substantially corrected.

Next, the process for producing the pattern forming instruction signal Sp in the block 382 will be described in detail.

The level of the signal Sp is determined while referring to each of the parameters θ1 and θi (i≧2). To refer to each parameter, it is required to specify the position of each parameter in the angle range from 0 to 2π (i.e., the cycle duration of the generator 10). Therefore, as shown in FIG. 20 and FIG. 21, the cycle duration of the generator 10 is divided into a plurality of instruction periods K to judge whether or not each parameter exists in one instruction period K. More specifically, one instruction period K is set between two adjacent trough points in each pair in the first and second quarter angle regions of the cycle duration 2π/ωe in which the sum of the second periods set at the high level is longer than the sum of the first periods set at the low level, while one instruction period K is set between two adjacent crest points in each pair in the third and fourth quarter angle regions of the cycle duration 2π/ωe in which the sum of the second periods is shorter than the sum of the first periods. Further, one instruction period K is set between the boundary, between the fourth and first quarter angle regions in which the first period is shortened in the time direction of the cycle duration, and one trough point closest to the boundary in the first quarter angle region and is set between the boundary and one crest point closest to the boundary in the fourth quarter angle region. Moreover, one instruction period K is set between the boundary, between the second and third quarter angle regions in which the first period is lengthened in the time direction, and one trough point closest to the boundary in the second quarter angle region and is set between the boundary and one crest point closest to the boundary in the third quarter angle region.

The relation of the instruction periods K and the parameters stored in the pulse table 38*a* is shown in FIG. 27.

Figure 28:
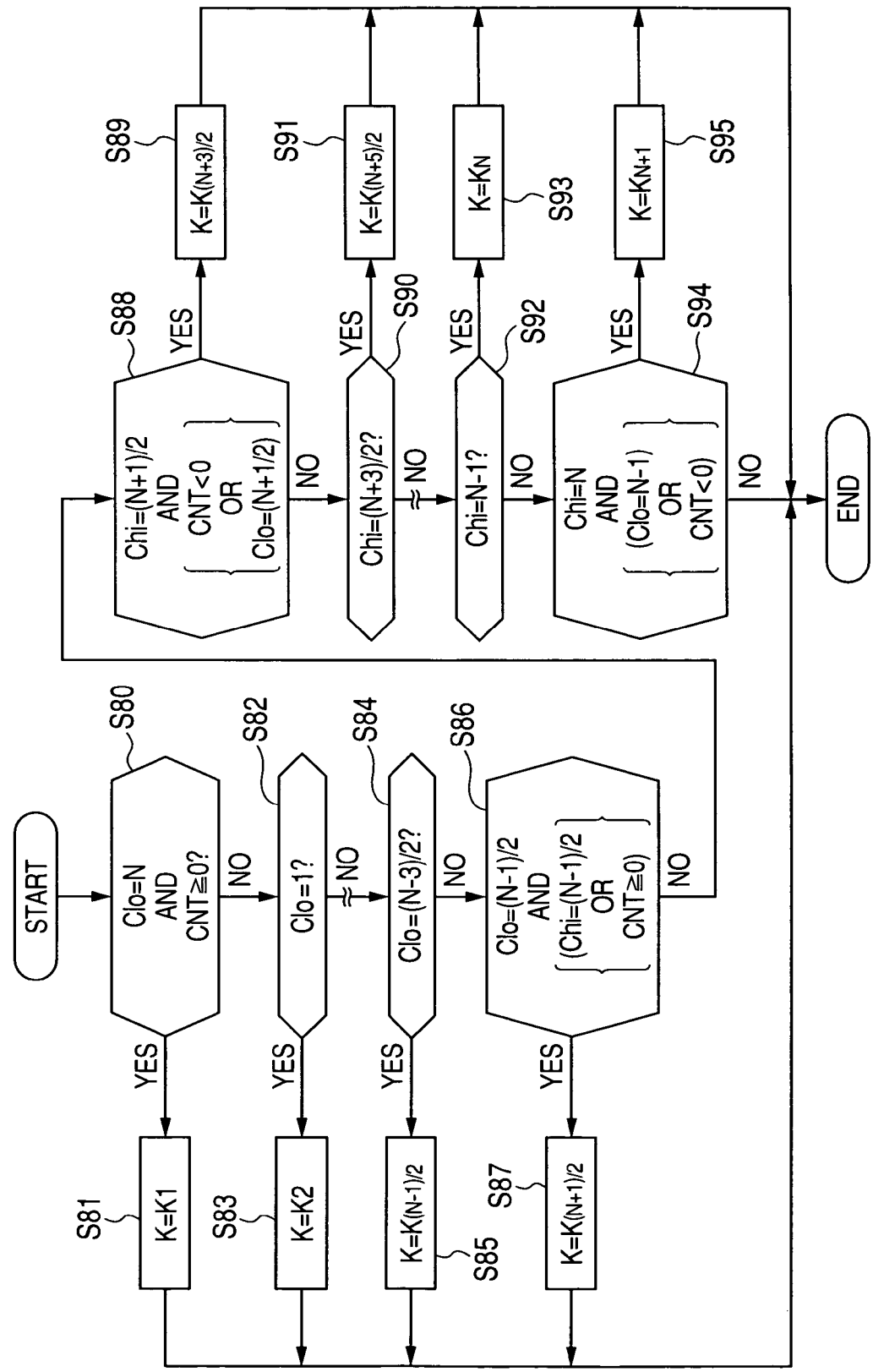
FIG. 28 is a flow chart showing a process for setting the instruction periods.

FIG. 28 is a flow chart showing the process for setting the instruction periods K in the block 382. This process is performed every predetermined period of time.

As shown in FIG. 28, it is judged at step S80 whether or not the number Clo of one trough point is N while the count value CNT is equal to or higher than 0. In the case of an affirmative judgment at step S80, the instruction period K1 is set (step S81). In contrast, in the case of a negative judgment at step S80, it is judged at step S82 whether or not the number Clo of one trough point is 1. In the case of an affirmative judgment at step S82, the instruction period K2 is set (step S83). In contrast, in the case of a negative judgment at step S82, the judgment is repeated in the same manner while increasing the number m of the instruction period Km by one. When the number m reaches (N−3)/2, it is judged at step S84 whether or not the number Clo of one trough point is (N−3)/2. In the case of an affirmative judgment at step S84, the instruction period K(N−1)/2 is set (step S85). In contrast, in the case of a negative judgment at step S84, it is judged at step S86 whether or not the number Clo of one trough point is (N−1)/2 while the number Chi of one crest point is (N−1)/2 or while the count value CNT is equal to or higher than 0.

In the case of an affirmative judgment at step S86, the instruction period K(N+1)/2 is set (step S87). In contrast, in the case of a negative judgment at step S86, it is judged at step S88 whether or not the number Chi of one crest point is (N+1)/2 while the count value CNT is negative or while the number Clo of one trough point is (N+1)/2. In the case of an affirmative judgment at step S88, the instruction period K(N+ 3)/2 is set (step S89). In contrast, in the case of a negative judgment at step S88, it is judged at step S90 whether or not the number Chi of one crest point is (N+3)/2. In the case of an affirmative judgment at step S90, the instruction period K(N+ 5)/2 is set (step S91). In contrast, in the case of a negative judgment at step S90, the judgment is repeated in the same manner while increasing the number m of the instruction period Km by one. When the number m reaches N−1, it is judged at step S92 whether or not the number Chi of one crest point is N−1.

In the case of an affirmative judgment at step S92, the instruction period KN is set (step S93). In contrast, in the case of a negative judgment at step S92, it is judged at step S94 whether or not the number Chi of one crest point is N while the number Clo of one trough point is N−1 or while the count value CNT is negative. In the case of an affirmative judgment at step S94, the instruction period KN+1 is set (step S95). In contrast, in the case of a negative judgment at step S94, this process is ended.

Therefore, in case of Clo=0 and CNT≧0, K=1 is set. In case of 2≦K≦(N−1)/2, K=Clo+1 is set. In contrast, the ins t ruction period K(N+1)/2 adjacent to the boundary, between the second and third quarter angle regions, in the second quarter angle region, and the instruction period K(N+3)/2 adjacent to the boundary in the third quarter angle region are set in the processing from step S86 to step S89. More specifically, when either Chi=(N−1)/2 or CNT≧0 is satisfied while Clo=(N−1)/2 is satisfied, K=(N+1)/2 is set. When either Clo= (N+1)/2 or CNT<0 is satisfied while Chi=C(N+1)/2 is satisfied, K=(N+3)/2 is set. In case of (N+5)/2≦K≦N, K=Chi+1 is set. When either Clo=N−1 or CNT<0 is satisfied while Chi=N is satisfied, K=N+1 is set.

Figure 29:
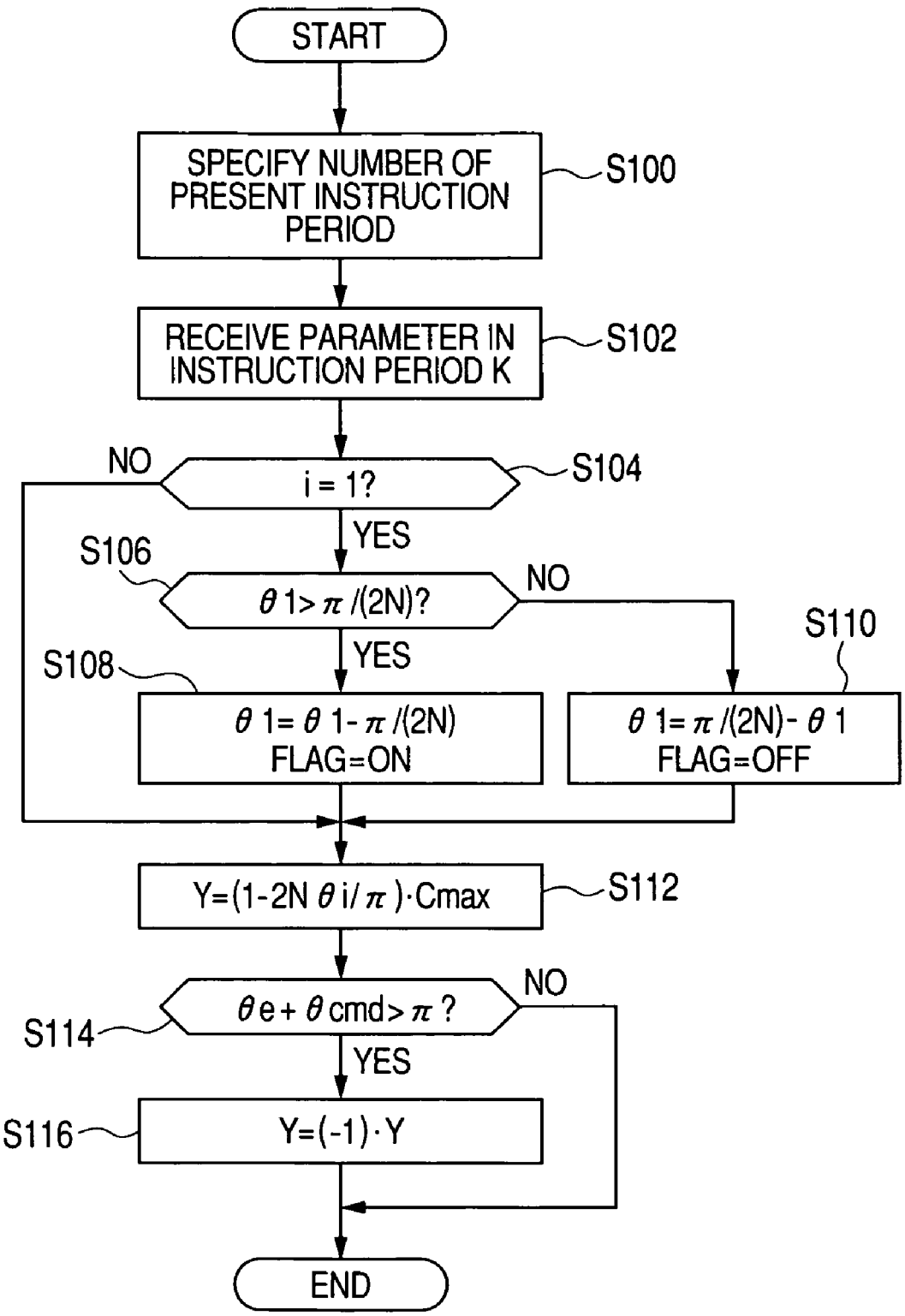
FIG. 29 is a flow chart showing a process for setting level of the instruction signal.

FIG. 29 is a flow chart showing the process for setting the level of the instruction signal Sp in the block 382. This process is performed every predetermined period of time.

As shown in FIG. 29, the block 382 specifies the number of the present instruction period K at step S100, and the block 382 receives the parameter θi (i≧1) placed in the instruction period K at step S102. At step S104, it is judged whether or not the parameter θi denotes the parameter θ1.

In the case of an affirmative judgment at step S104, it is judged at step S106 whether or not the parameter θ1 is larger than π/(2N). In the case of an affirmative judgment at step S106, the parameter θ1 shown in FIG. 20 is referred to. Then, at step S108, the parameter θ1 is set at θ1−π/(2N), and an inside changing flag is set at the on state. Therefore, this flag set in the on state indicates the relation between the signal Sp and the signal Sc shown in FIG. 20. In contrast, in the case of a negative judgment at step S106, the parameter θ1 shown in FIG. 21 is referred to. Then, at step S110, the parameter θ1 is set at π/(2N)−θ1, and the inside changing flag is set at the off state. Therefore, the flag set in the off state indicates the relation between the signal Sp and the signal Sc shown in FIG. 21.

In the case of a negative judgment at step S104 or after the processing at step S108 or S109 is ended, at step S112, the level Y of the signal Sp is sec at (1−2Nθi/π)Cmax. In this process, the absolute level of the signal Sp is reduced from the maximum value Cmax by using the ratio 2Nθi/π of the parameter θi to one quarter π/(2N) of the cycle duration 2π/N of the carrier signal Sc. Then, at step S114, it is judged whether or not the controlled phase θc (=θe+θcmd) of the phase Information outputted from the adder 31 is larger than π.

In the case of an affirmative judgment at step S114, the setting timing of the signal Sp is placed in the third or fourth quarter angle region of the cycle duration 2π/ωe, and the level of the signal Sp should be negative. Therefore, at step S116, the level Y is set at −Y. In contrast, in the case of a negative judgment at step S114, the setting timing of the signal Sp is placed in the first or second quarter angle region of the cycle duration $2\pi/\omega e$, and the level of the signal Sp should be positive. Therefore, the level Y is maintained as it is.

Therefore, in the instruction period K corresponding to the parameter $\theta i$ ($i \geq 2$), the level Y of the signal Sp is set at $(1-2N\theta i/\pi)$Cmax in the first and second quarter angle regions of the cycle duration $2\pi/\omega e$ and is set at $(1-2N\theta i/\pi)$Cmin in the third and fourth quarter angle regions of the cycle duration $2\pi/\omega e$. In contrast, when the relation $\theta 1 > \pi/(2N)$ is satisfied, the level Y of the signal Sp is set, in the instruction period K corresponding to the parameter $\theta 1$ stored in the table 38a, at $(2-2N\theta 1/\pi)$Cmax ($=(1-2N(\theta 1-\pi/2N)/\pi)$Cmax in the first and second quarter angle regions of the cycle duration $2\pi/\omega e$ and $(2-2N\theta 1/\pi)$Cmin ($=(1-2N(\theta 1-\pi/2N)/\pi)$Cmin in the third and fourth quarter angle regions of the cycle duration $2\pi/\omega e$. When the relation $\theta 1 \leq \pi/(2N)$ is satisfied, the level Y of the signal Sp is set, in the instruction period K corresponding to the parameter $\theta 1$ stored in the table 38a, at $(2N\theta 1/\pi)$Cmax ($=N(\pi/2N-\theta 1)/\pi)$Cmax in the first and second quarter angle regions of the cycle duration $2\pi/\omega e$ and $(2N\theta 1/\pi)$Cmin ($=2N(\pi/2N-\theta 1)/\pi)$Cmin in the third and fourth quarter angle regions of the cycle duration $2\pi/\omega e$.

Figure 30:
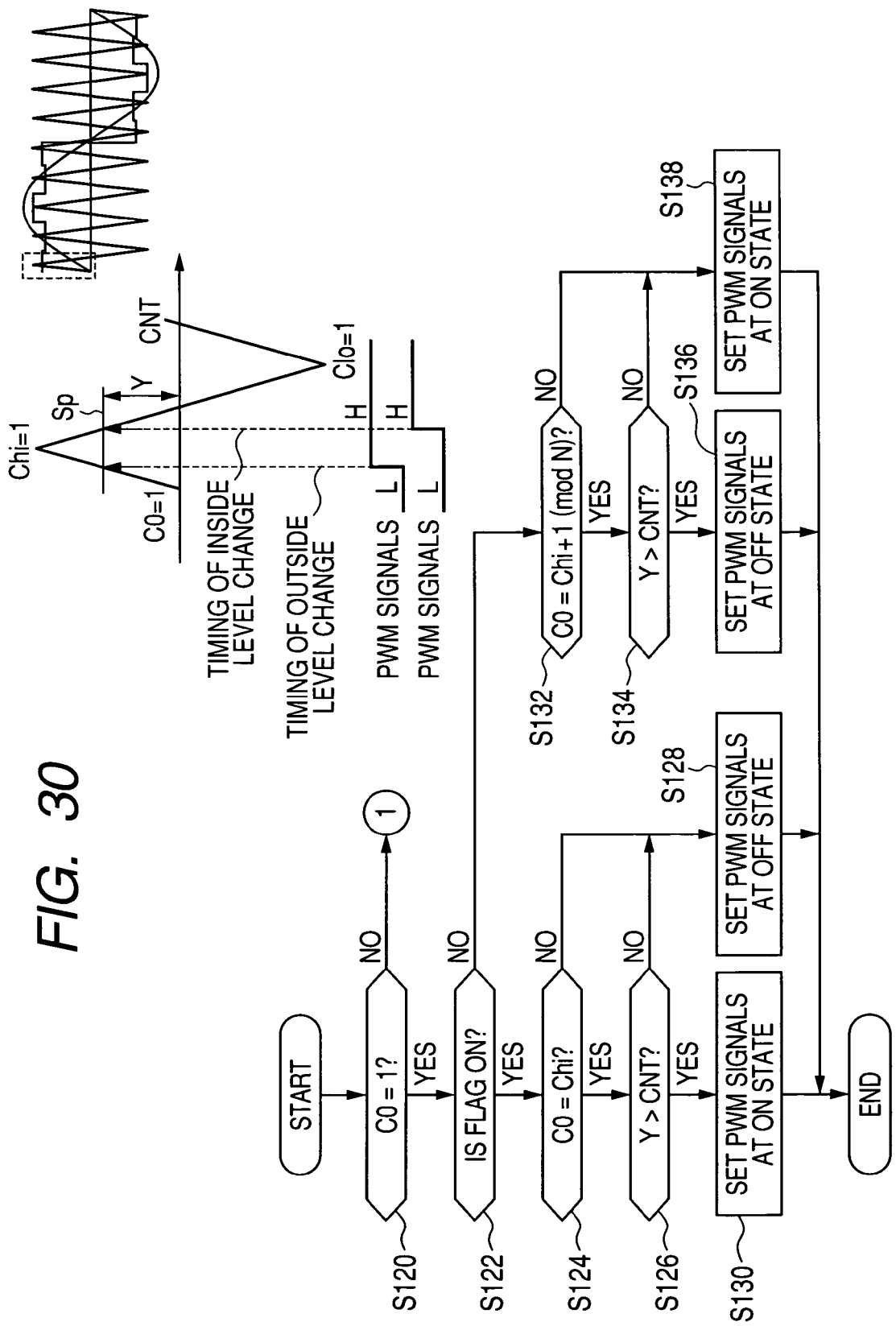
FIG. 30 is a flow chart showing a process for inverting each PWM signal in the instruction period K1.

Next, the process for producing the PWM signals Sgu, Sgv and Sgw in the block 383 will be described in detail with reference to FIG. 30 to FIG. 33. This process is performed every predetermined period of time. FIG. 30 is a flowchart showing the process exceptionally performed to invert the logic of each PWM signal in the instruction period K1.

As shown in FIG. 30, it is judged at step S120 whether or not the number CO of the starting point is equal to 1. In the case of an affirmative judgment at step S120, it is judged at step S122 whether or not the inside changing flag is in the on state. In the case of an affirmative judgment at step S122, the logic of each PWM signal is inverted at the timing of the inside level change in the instruction period K1 while referring to the numbers Chi and CO and the signal Sp shown in FIG. 20. That is, when CO=Chi or the relation Y>CNT is not satisfied (NO at step S124 or NO at step S126), each PWM signal is set at the low level (logic L) at step S128. In contrast, when the relation CO=Chi and the relation Y>CNT are satisfied together (YES at step S124 and YES at step S126), each PWM signal is set at the high level (logic H) at step S130.

In contrast, in the case of a negative judgment at step S122, the logic of each PWM signal is inverted at the timing of the outside level change in the instruction period K1 while referring to the numbers Chi and CO and the signal Sp shown in FIG. 21. That is, when the number CO is higher than the number Chi by one or the number CO is equal to 1 in the case of Chi=N (YES at step S132), it is judged at step S134 whether or not the level Y is higher than the count value CNT. In the case of an affirmative judgment at step S134, each PWM signal is set at the low level (logic L) at step S136. In contrast, in the case of a negative judgment at step S132 or S134, each PWM signal is set at the high level (logic H) at step S138.

Figure 31:
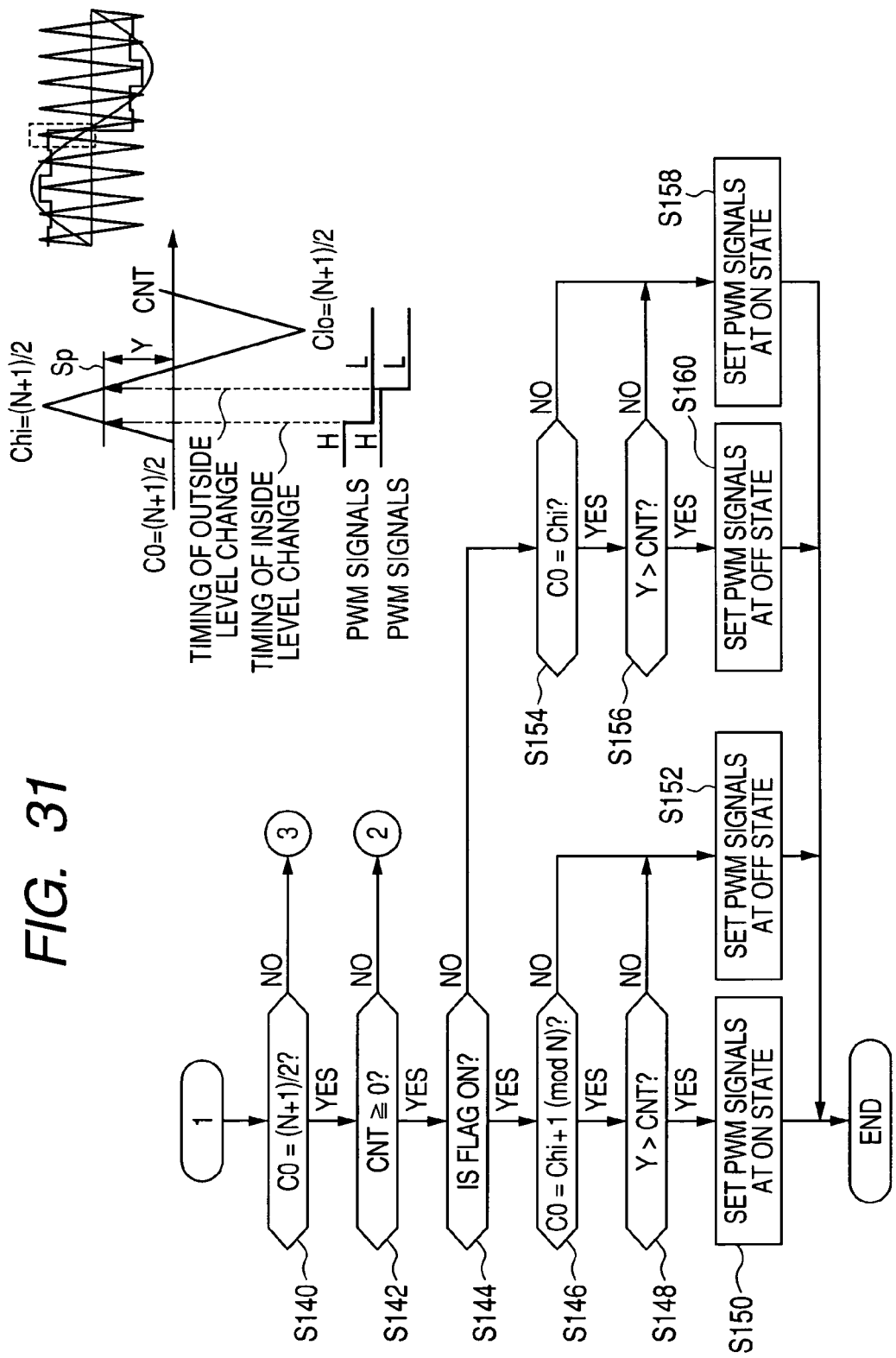
FIG. 31 is a flow chart showing a process for inverting each PWM signal in the instruction period K(N+1)/2.

In the of a negative judgment at step S120, the logic of each PWM signal is inverted in the instruction periods other than the instruction period K1. FIG. 31 is a flow chart showing the process exceptionally performed to invert the logic of each PWM signal in the instruction period K(N+1)/2.

As shown in FIG. 31, when the number CO of the starting point is equal to (N+1)/2 and the count value CNT is equal to or higher than 0 (YES at step S140 and YES at step S142), the angle region between the starting point CO=(N+1)/2 and the center of one triangular pulse is specified in the instruction period K(N+1)/2. Therefore, it is judged at step S144 whether or not the inside changing flag is in the on state. In the case of an affirmative judgment at step S144, the logic of each PWM signal is inverted at the timing of the inside level change in the instruction period K(N+1)/2 while referring to the numbers Chi and CO and the signal Sp shown in FIG. 20. That is, when the number CO is higher than the number Chi by one or the number CO is equal to 1 in the case of Chi=N (YES at step S146), it is judged at step S148 whether or not the level Y is higher than the count value CNT. In the case of an affirmative judgment at step S148, each PWM signal is set at the high level (logic H) at step S150. In contrast, in the case of a negative judgment at step S146 or S148, each PWM signal is set at the low level (logic L) at step S152.

In contrast, in the case of a negative judgment at step S144, the logic of each PWM signal is inverted at the timing of the outside level change in the instruction period K(N+1)/2 while referring to the numbers Chi and CO and the signal Sp shown in FIG. 21. That is, when the number CO is equal to the number Chi (YES at step S154), it is judged at step S156 whether or not the level Y is higher than the count value CNT. In the case of an affirmative judgment at step S156, each PWM signal is set at the low level (logic L) at step S160. In contrast, in the case of a negative judgment at step S154 or S156, each PWM signal is set at the high level (logic H) at step S158.

Figure 32:
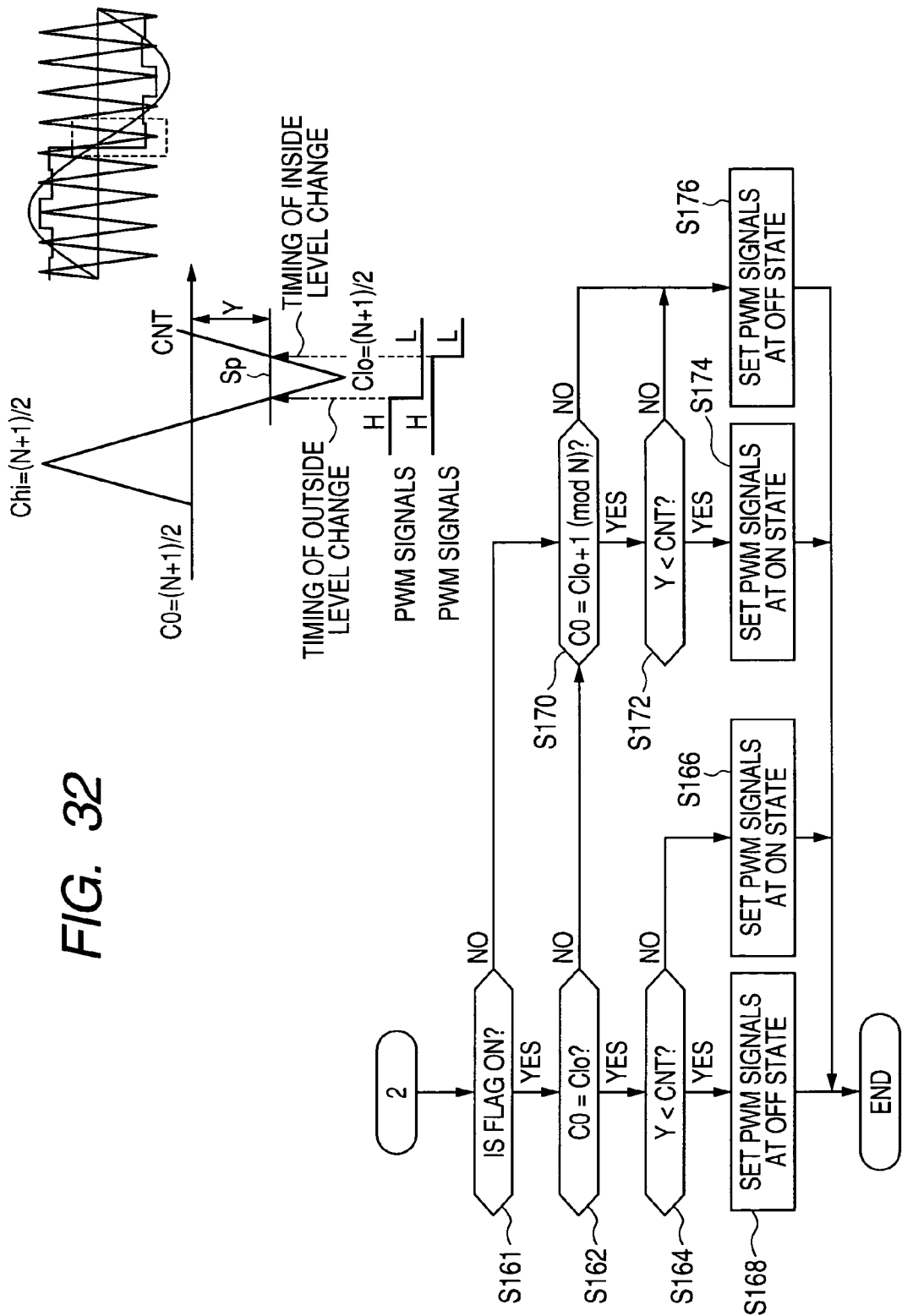
FIG. 32 is a flow chart showing a process for inverting each PWM signal in the instruction period K(N+3)/2.

In the case of a negative judgment at step S142, the angle region between the center of one triangular pulse and the starting point CO=(N+3)/2 of the next triangular pulse is specified in the instruction period K(N+3)/2. Therefore, the logic of each PWM signal is inverted in the instruction period K(N+3)/2 in the process shown in FIG. 32. FIG. 32 is a flow chart showing the process exceptionally performed to invert the logic of each PWM signal in the instruction period K(N+3)/2.

As shown in FIG. 32, it is judged at step S161 whether or not the inside changing flag is in the on state. In the case of an affirmative judgment at step S161, the logic of each PWM signal is inverted at the timing of the inside level change in the instruction period K(N+3)/2 while referring to the numbers Clo and CO and the signal Sp shown in FIG. 20. That is, when the number CO is equal to the number Clo (YES at step S162), it is judged, at step S164 whether or not the level Y is lower than the count value CNT. In the case of a negative judgment at step S164, each PWM signal is set at the high level (logic H) at step S166. In contrast, in the case of an affirmative judgment at step S164, each PWM signal is set at the low level (logic L) at step S168.

In contrast, in the case of a negative judgment at step S161, the logic of each PWM signal is inverted at the timing of the outside level change in the instruction period K(N+3)/2 while referring to the numbers Clo and CO and the signal Sp shown in FIG. 21. That is, when the number CO is higher than the number Clo by one or the number CO is equal to 1 in the case of Clo=N (YES at step S170), it is judged at step S172 whether or not the level Y is lower than the count value CNT. In the case of an affirmative judgment at step S172, each PWM signal is set at the high level (logic H) at step S174. In contrast, in the case of a negative judgment at step S170 or S172, each PWM signal is set at the low level (logic L) at step S176.

Figure 33:
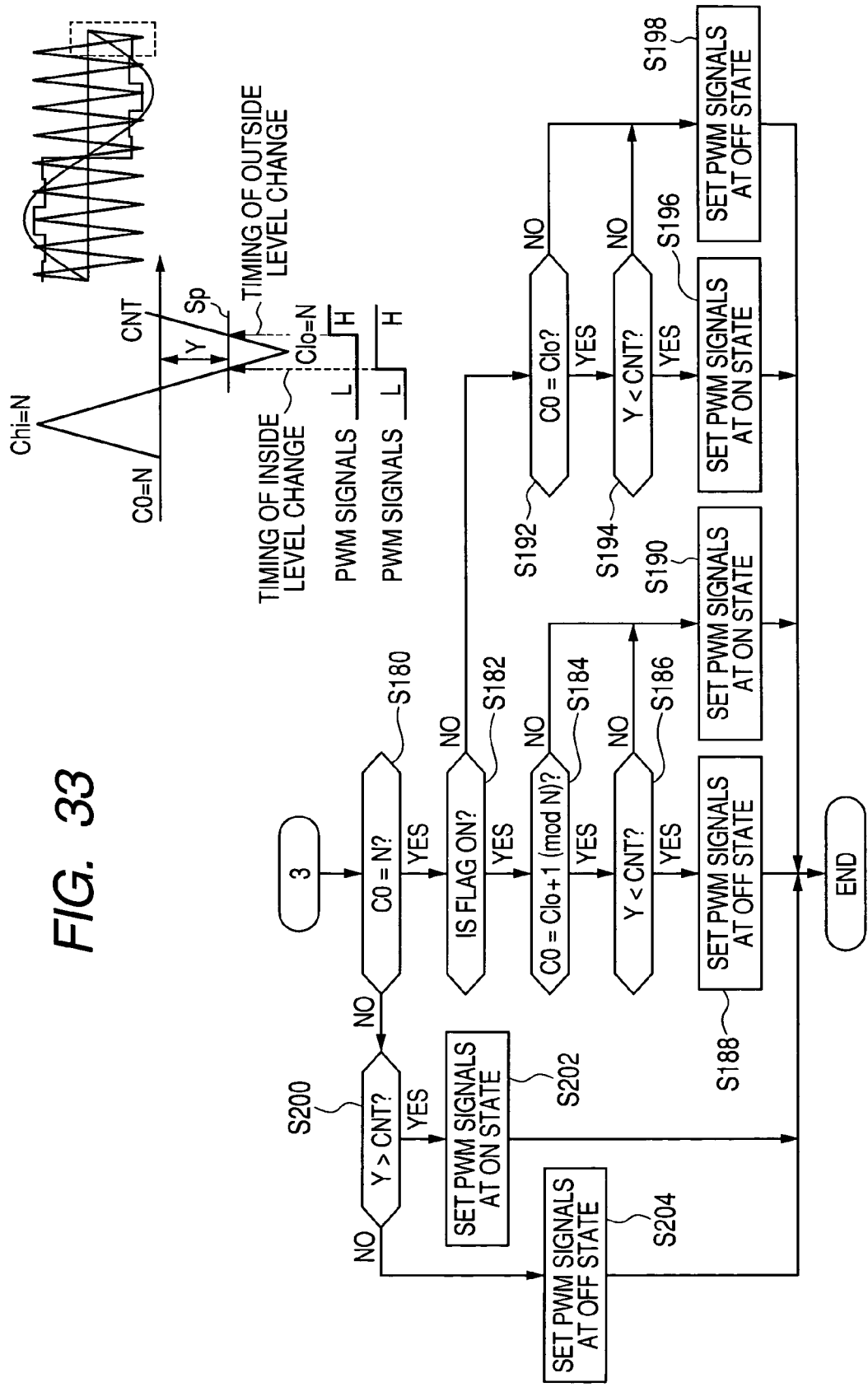
FIG. 33 is a flow chart showing a process for inverting each PWM signal in the instruction period $K_{(N+1)}$ and a process for inverting each PWM signal in the instruction periods other than the instruction periods K1, $K_{(N+1)/2}$, $K_{(N+3)/2}$ and $K_{(N+1)}$.

In the case of a negative judgment at step S140 (see FIG. 31), the logic of each PWM signal is inverted, in the instruction periods K other than the instruction periods K1, K(N+1)/2 and K(N+3)/2, in the process shown in FIG. 33. FIG. 33 is a flow chart showing the process exceptionally performed in the instruction period K(N+1) and the process performed in the instruction periods other than the instruction periods K1, K(N+1)/2, K(N+3)/2 and K(N+1) to invert the logic of each PWM signal.

As shown in FIG. 33, it is judged at step S180 whether or not the number CO is equal to the synchronization number N. In the case of an affirmative judgment at step S180, the angle region between the starting point of the N-th triangular pulse and the starting point of the first triangular pulse is specified in the instruction period K(N+1) and the last quarter of instruction period KN. Therefore, it is judged at step S182 whether or not the inside changing flag is in the on state. In the case of an affirmative judgment at step S182, the logic of each PWM signal is inverted at the timing of the inside level change in the instruction period K(N+1) while referring to the numbers Clo and CO and the signal Sp shown in FIG. 20. That is, when the number CO is higher than the number Clo by one or the number CO is equal to 1 in the case of Clo=N (YES at step S184), it is judged at step S186 whether or not the level Y is lower than the count value CNT. In the case of an affirmative judgment at step S186, each PWM signal is set at the low level (logic L) at step S188. In contrast, in the case of a negative judgment at step S184 or S186, each PWM signal is set at the high level (logic H) at step S190.

In contrast, in the case of a negative judgment at step S182, the logic of each PWM signal is inverted at the timing of the outside level change in the instruction period K(N+1) while referring to the numbers Clo and CO and the signal Sp shown in FIG. 21. That is, when the number CO is equal to the number Clo (YES at step S192), it is judged at step S194 whether or not the level Y is lower than the count value CNT. In the case of an affirmative judgment at step S194, each PWM signal is set at the high level (logic H) at step S196. In contrast, in the case of a negative judgment at step S192 or step S194, each PWM signal is set at the low level (logic L) at step S198.

In the case of a negative judgment at step S180, the PWM signals are produced on the basis of the comparison between the level Y of the signal Sp and the count value CNT, in the same manner as the production in the triangular wave comparison PWM control. That is, it is judged at step S200 whether or not the level Y is higher than the count value CNT. In case of an affirmative judgment at step S200, each PWM signal is set at the high level (logic H) at step S202. In contrast, in the case of a negative judgment at step S200, each PWM signal is set at the low level (logic L) at step S204.

Figure 34:
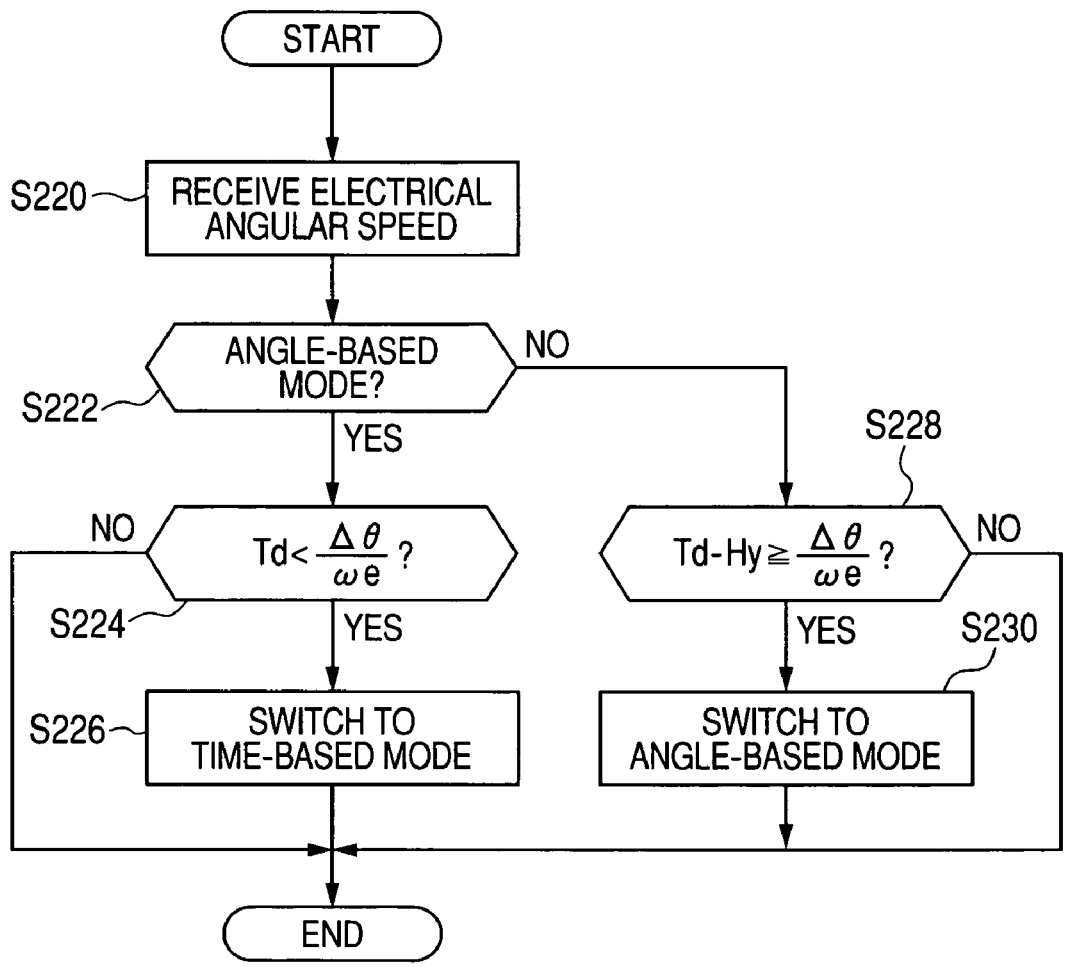
FIG. 34 is a flow chart showing the switching operation of a selector shown in FIG. 18.

FIG. 34 is a flow chart showing the switching operation of the selector 38$d$. This process is performed every predetermined period of time.

As shown in FIG. 34, at step S220, the selector 38$d$ receives the electrical angular speed ωe from the unit 24. At step S222, the selector 38$d$ judges whether or not the PWM signals now selected in this selector 38$d$ are produced in the angle-based mode performed in the unit 38$c$ (see FIG. 18). In the case of an affirmative judgment at step S222, the selector 38$d$ judges at step S224 whether or not the dead time Td is longer than the value Δθ/ωe. The value Δθ denotes the detectable minimum value of the sensor 15, and the value Δθ/ωe denotes the time resolution in the detection of the rotational angle θ.

In the case of an affirmative judgment at step S224, at step S226, the selector 38$d$ switches from the PWM signals produced in the unit 38$c$ to the PWM signals produced in the unit 38$b$ in the time-based mode based on the time synchronization. In contrast, in the case of a negative judgment at step S224, the selector 38$d$ continues the selection of the PWM signals produced in the unit 38$c$.

In the case of a negative judgment at step S222, the selector 38$d$ judges at step S228 whether or not the value Td−Hy lower than the dead time Td by a hysteresis value Hy is longer than the time resolution Δθ/ωe. In the case of an affirmative judgment at step S228, at step S230, the selector 38$d$ switches from the PWM signals produced in the unit 38$b$ to the PWM signals produced in the unit 38$c$ in the angle-based mode. In contrast, in the case of a negative judgment at step S228, the selector 38$d$ continues the selection of the PWM signals produced in the unit 38$b$.

Therefore, when the angular speed ωe is substantially higher than the value Δθ/Td, the switching elements of the inverter IV are operated according to the PWM signals produced in the unit 38$c$ in the angle-based mode. In contrast, when the angular speed we is lower than the value Δθ/Td, the switching elements of the inverter IV are operated according to the PWM signals produced in the unit 38$b$ in the time-based mode.

In this embodiment, the following effects can be obtained in addition to the effects obtained in the first embodiment.

The count value CNT of the counter is renewed every predetermined period of time Tc, and each logic change or inversion of the PWM signals is performed in synchronization with the timing of the renewal of the count value CNT. Therefore, the precision in the timing of changing the state of each switching element between the on and off states can depend on the predetermined period of time Tc. Accordingly, because the renewing period Tc of the count value CNT is shorter than the renewing period of the electrical angler speed CO e, the controllability of the device 14 for the switching elements of the inverter IV in the time-based mode based on the time synchronization can be heightened, as compared with the controllability in the angle-based mode based on the angle synchronization.

The absolute level Y of the signal Sp is set, in each instruction period K corresponding to one parameter θi (i≧2), at a value lower than the maximum value Cmax. Accordingly, each first or second period of each PWM signal having the length of 2θi/ωe can be symmetric with respect to one crest or trough of the carrier signal Sc, so that the level Y of the signal Sp can be appropriately set.

The first and second periods θ1/ωe adjacent to the boundary between the fourth and first quarter angle regions, in which the first period is shortened along the time direction of the cycle duration of the generator 10, and the first and second periods adjacent to the boundary between the second and third quarter angle regions, in which the first period is lengthened along the time direction, are specified, and the level of each PWM signal is changed in each of these specified periods (see FIG. 30 to FIG. 33). Accordingly, the switching elements Esun, Esvn and Eswn of the inverter IV can be appropriately set in the on state during the first periods θ1/ωe, and the switching elements Esup, Esvp and Eswp of the inverter IV can be appropriately set in the on state during the second periods θ1/ωe.

The phase γ of the carrier signal Sc is corrected according to the rotational angle θ detected by the sensor 15 (see step S71, step S73, step S75 and step S76 shown in FIG. 26). Therefore, the phase 7 of the carrier signal Sc can correspond to the rotational angle θ of the generator 10. Accordingly, even when the cycle duration of the carrier signal Si is shifted from the value 2π/(Nωe), the cycle duration of the carrier signal Si can be corrected. That is, the phase of the controlled voltage Vc can be controlled based on the comparison between the signals Sp and Sc with high precision.

One of the operation of the unit 38$b$ in the time-based mode and the operation of the unit 38$c$ in the angle-based mode is selected according to the angular speed to ωe. Accordingly, the control device 14 can prevent the controllability for the phase of the controlled voltage Vc from being lowered.

The judging value Δθ/Td in the switching condition (ωe<Δθ/Td) for the switching from the operation in the angle-based mode to the operation in the time-based mode differs from the judging value Δθ/Td−Hy in the switching condition (ωe<Δθ/Td−Hy) for the switching from the operation in the angle-based mode to the operation in the time-based mode. Accordingly, the control device 14 can appropriately prevent the selector 38d from often switching the selection by hunting.

Modifications

These embodiments should not be construed as limiting the present invention to structures of those embodiments, and the structure of this invention may be combined with that based on the prior art.

For example, in the third embodiment, the renewing period Tc of the count value CNT is fixed (see FIG. 25). However, the renewing period Tc may be changeable. For example, the maximum value Cmax of the counter is fixed, and the renewing period Tc is changeably set such that the product of the cycle period of the carrier signal Pc and the synchronization number N becomes equal to the electrical angle cycle period of the generator 10. In this case, the instruction signal Sp can be set in the same manner as in the third embodiment.

Further, in the third embodiment, the count value CNT is corrected every predetermined period of time to substantially correct the phase γ of the carrier signal Sc (see FIG. 26). However, the count value CNT may be corrected every period of angle equal to one electrical angle cycle duration of the generator 10. In this case, the instruction signal Sp can be set in the same manner as in the third embodiment.

Moreover, in the third embodiment, when the time resolution Δθ/ωe in the unit 38c becomes longer than the dead time Td, the PWM signals produced in the unit 38b is selected (see FIG. 34). However, when the time resolution in the unit 38b is shorter than the time resolution in the unit 38c, the PWM signals produced in the unit 38b may be selected, while the PWM signals produced in the unit 38c are selected when the time resolution in the unit 38c is shorter than the time resolution in the unit 39b.

Furthermore, in the third embodiment, the PWM signal producing unit 38 may have the pulse table 38a and the unit 38b without having the unit 38c and the selector 38d.

Still further, in the third embodiment, the PWM signals may be produced from the parameters θ1 and θi, determined by weighting the amplitude of each n-th higher order harmonic wave by a weighting factor in the same manner as in the second embodiment.

Still further, in the first and second embodiments, the parameters θi including parameters θi set at zero may be set by changing the condition θi≧θmin to the condition θi≧θmin or θi=0, in the same manner as in the third embodiment. Further, in place of the condition θi≧θmin, the parameters θi may be set under the condition θi>θmin.

Still further, the unit 20 calculates instructed phase voltages Vdr and Vqr defined on the dq rotational coordinates system as controlled values to control the actual currents Id and Iq (i.e., the phase currents Iu, Iv and Iq) of the generator 10 to the instructed currents Idr and Iqr, determined from the target torque Tt, in the feed-back control, and calculates the instructed phase value θcmd and the instructed modulation factor αi from the instructed phase voltages Vdr and Vqr. However, when the instructed modulation factor αi is higher than a predetermined value, the instructed phase value θcmd may be calculated as a controlled value to control the torque of the generator 10, estimated from the actual currents Id and Iq, to the target torque Tt, and the instructed modulation factor αi may be calculated from the target torque Tt and the rotational speed of the generator 10.

Still further, the unit 20 may calculate an instructed value of a voltage utilization ratio, indicating the ratio of the instructed voltage to the supply voltage VDC, as a controlled value in place of the instructed modulation factor αi.

Still further, the PWM signals Sgu, Sgv and Sgw for the triangular wave comparison PWM control are produced in the comparators 34 to 36 by comparing the level of the triangular wave and levels of the instructed phase voltages Vur, Vvr and Vwr formed in the sine-wave shape. However, for example, the PWM signals Sgu, Sgv and Sgw for the triangular wave comparison PWM control may be produced by comparing the triangular wave and voltages obtained by superimposing a third order higher harmonic wave on the instructed phase voltages Vur, Vvr and Vwr. Further, the PWM signals Sgu, Sgv and Sgw for the triangular wave comparison PWM control may be produced by comparing the triangular wave and a voltage obtained by two-phase modulating the instructed phase voltages Vur, Vvr and Vwr. In these cases, when the instructed modulation factor αi is lower than 1.15, the generator 10 should be operated under the triangular wave comparison PWM control. In contrast, when the instructed modulation factor or i is higher than 1.15, the generator 10 should be operated under the pulse pattern control.

Still further, in the first and second embodiments, the pulse patterns stored in the unit 38 are defined in one electrical angle cycle duration. However, pulse patterns defined in a quarter of one electrical angle cycle duration may be stored in the unit 38. In this case, each stored pulse pattern is converted into one pulse pattern defined in one electrical angle cycle duration by using the conversion table shown in FIG. 9A.

Still further, in the first and second embodiments, one crest or trough point of the triangular wave is placed in each of the first and second periods except for the first and second periods, adjacent to the boundary between the fourth and first quarter angle regions successively set in the high level increasing arrangement, and the first and second periods adjacent to the boundary between the second and third quarter angle regions successively set in the high level decreasing arrangement. However, each pulse pattern may be formed such that one crest or trough point of the triangular wave is placed in each of all first and second periods.

Still further, in the first and second embodiments, each of the periods θ1/ωe in which the existence of one crest or trough point of the triangular wave is not defined is placed adjacent to a boundary between the fourth and first quarter angle regions successively set in the high level increasing arrangement or a boundary between the second and third quarter angle regions successively set in the high level decreasing arrangement. However, a first or second period in which the existence of one crest or trough point of the triangular wave is not defined may be placed in each quarter angle region so as not to be adjacent to any boundary. For example, the existence of one crest or trough point of the triangular wave is not defined in a period $\theta_k/\psi e$ (k is an integral number higher than 1), while the existence of one crest or trough point of the triangular wave is defined in each of other periods $\theta_m/\omega e$ (m is a positive integral number other than k). In this case, to determine parameters so as to satisfy the minimization of the harmonic distortion ratio, the parameter $\theta_k$ is expressed by the other parameters $\theta_m$ and the modulation factor α, and the other parameters $\theta_m$ are determined so as to minimize the harmonic distortion ratio. In any case, to perform the pulse pattern control imitating the triangular wave comparison PWM control, the number of first periods defined regardless of any crest point of the triangular wave should be limited to one in each of two quarter angle regions, and the number of second periods defined regardless of any trough point of the triangular wave should be limited to one in each of the other quarter angle regions.

Still further, the timing of the first period synchronized with each crest point of the angular wave is placed at the center of the first period, and the timing of the second period synchronized with each trough point of the angular wave is placed at the center of the second period. However, the timing of each of the first and second periods synchronized with each crest or trough point may be shifted from the center of the period.

Still further, in the first and second embodiments, each pulse pattern is prepared by comparing the sine wave with the angular wave. However, each pulse pattern may be prepared by comparing a cosine wave or the like with the angular wave.

Still further, each first period $2\theta i/\omega e$ in the first and second quarter angle regions is shorter than one half of the cycle duration $2\pi/\omega eN$ of the triangular wave, and the width $2\theta i/\omega e$ of each second period in the third and fourth quarter angle regions is shorter than one half of the cycle duration $2\pi/\omega eN$ of the triangular wave. However, the sum of the first periods in each of the first and second quarter angle regions may be set to be shorter than one half of the period $\pi/2\omega e$ of the quarter angle region, and the sum of the second periods in each of the third and fourth quarter angle regions may be set to be shorter than one half of the period $\pi/2\omega e$ of the quarter angle region.

Still further, the switching in the selector 39 is performed according to the instructed modulation factor $\alpha i$. However, for example, the selector 39 may perform the switching operation according to the combined amplitude of the instructed phase voltages Vur, Vvr and vwr produced in the unit 32. In this case, when the amplitude of the instructed phase voltages becomes higher than a predetermined threshold, the selector 39 switches the selection to the pulse pattern control.

Still further, the magnitude of the higher harmonic waves is quantified by squaring the amplitude of each of higher harmonic waves and summing up the squared values. However, the magnitude of the higher harmonic waves may be quantified by summing up amplitudes of higher harmonic waves. Further, when it is desired to decrease the contribution of a specific-order higher harmonic wave on the weighted quantitative value Q1w, the weighting factor for the specific-order higher harmonic wave may be appropriately set.

Still further, to increase the weighting factor as the order of the higher harmonic wave becomes low, the amplitude of each n-th higher order harmonic wave is weighted by the weighting factor $1/n$. However, the squared value of the amplitude of each n-th higher order harmonic wave may be weighted by a weighting factor set at $\exp(-n)$.

Still further, the generator 10 having the feature of the magnetic saliency is a three-phase interior permanent magnet synchronous motor (IPMSM). However, the generator 10 may be a synchronous reluctance motor (SynRM).

Still further, the electric rotating machine represented by the generator 10 has the feature of the magnetic saliency. However, the machine may have no magnetic saliency. In a case where the voltage induced in the machine is increased with the rotational speed in the machine, when the instructed modulation factor $\alpha i$ is high, the requirement for controlling the machine at a high controllability becomes high. Therefore, the control device 14 controlling the generator 10 is very useful.

Still further, the control device 14 controls the actual torque (i.e., controlled variable) generated in the generator 10 by controlling the controlled voltage Vc of the inverter IV. However, the control device 14 may control the rotational speed of the rotor of the generator 10 as a controlled variable of the generator 10. In this case, to control the actual rotational speed to the instructed rotational speed according to the feedback control, the instructed phase value $\theta$cmd of the controlled voltage Vc and the instructed modulation factor $\alpha i$ determined from the difference between the actual rotational speed and an instructed rotational speed may be set as directly-controlled values.

Still further, the electric rotating machine is mounted on a hybrid vehicle. However, the machine may be mounted on an electric vehicle. Further, the machine is not limited to a member of a driving system of a vehicle.

What is claimed is:

1. A control device which controls a controlled variable of an electric rotating machine by controlling a power inverter circuit applying a controlled voltage to the electric rotating machine, comprising:

a pattern preparing unit that prepares a pattern having a level changed with time for each of values of a modulation factor;

a determining unit that determines phase information of the controlled voltage and an instructed value of the modulation factor;

a selecting unit that selects the pattern, corresponding to the instructed value of the modulation factor, from the patterns of the pattern preparing unit; and a pattern control unit that controls the controlled variable of the electric rotating machine by controlling the power inverter circuit such that the controlled voltage of the power inverter circuit is changed with time according to the selected pattern while adjusting a phase of the control led voltage according to the phase information, wherein the pattern preparing unit prepares a triangular wave having a cycle duration, which is equal to a value obtained by dividing an electrical angle cycle duration of the electric rotating machine by an integral number, and prepares each pattern as a triangular wave quasi-comparison pattern so as to have both a first period of a first level, depending on the corresponding value of the modulation factor and including a timing synchronized with a crest point or a trough point of the triangular wave, and a second period of a second level, depending on the corresponding value of the modulation factor and including a timing synchronized with the other point of the triangular wave, and wherein the pattern control unit controls the power inverter circuit to apply a low level of the controlled voltage to the electric rotating machine in response to the first period of the selected triangular wave quasi-comparison pattern and to apply a high level of the controlled voltage to the electric rotating machine in response to the second period of the selected triangular wave quasi-comparison pattern.

2. The control device according to claim 1, wherein each triangular wave quasi-comparison pattern corresponds to the electrical angle cycle duration of the electric rotating machine and has four quarter angle regions partitioned along a time direction of the electrical angle cycle duration, the triangular wave quasi-comparison pattern has a plurality of first periods and a plurality of second periods alternately placed in each quarter angle region, each first period depends on the corresponding value of the modulation factor and includes a timing synchronized with one crest or trough point of the triangular wave, each second period depends on the corresponding value of the modulation factor and includes a timing synchronized with the other point of the triangular wave, and each triangular wave quasi-comparison pattern in each quarter angle region is set in a first period arrangement, in which the first period is shortened in the time direction while the second period is lengthened in the time direction, or a second period arrangement in which the first period is lengthened in the time direction while the second period is shortened in the time direction.

3. The control device according to claim 2, wherein a sum of the first periods is shorter than a sum of the second periods in one of the quarter angle regions set in the first period arrangement, a sum of the first periods is longer than a sum of the second periods in the other quarter angle region set in the first period arrangement, a sum of the first periods is shorter than a sum of the second periods in one of the quarter angle regions set in the second period arrangement, and a sum of the first periods is longer than a sum of the second periods in the other quarter angle region set in the second period arrangement.

4. The control device according to claim 2, wherein the pattern control unit controls the power inverter circuit according to a repeated pattern obtained by repeating the selected triangular wave quasi-comparison pattern, the first period is successively shortened in a first pair of two quarter angle regions successively placed in the repeated pattern, the first period is successively lengthened in a second pair of two quarter angle regions successively placed in the repeated pattern, the repeated pattern further has a specific period, regardless of any crest or trough point of the triangular wave, in one quarter angle region succeeding the other quarter angle region in the first pair as a first period to place the specific period at a position adjacent to a boundary between the quarter angle regions, the repeated pattern further has a specific period, regardless of any crest or trough point of the triangular wave, in one quarter angle region preceding the other quarter angle region in the first pair as a second period to place the specific period at a position adjacent to a boundary between the quarter angle regions, the repeated pattern further has a specific period, regardless of any crest or trough point of the triangular wave, in one quarter angle region preceding the other quarter angle region in the second pair as a first period to place the specific period at a position adjacent to a boundary between the quarter angle regions, and the repeated pattern further has a specific period, regardless of any crest or trough point of the triangular wave, in one quarter angle region succeeding the other quarter angle region in the second pair as a second period to place the specific period at a position adjacent to a boundary between the quarter angle regions.

5. The control device according to claim 1, wherein the first period of each triangular wave quasi-comparison pattern is set so as to place the timing synchronized with the crest or trough point of the triangular wave at a center of the first period, and the second period of each triangular wave quasi-comparison pattern is set so as to place the timing synchronized with the other point of the triangular wave at a center of the second period.

6. The control device according to claim 1, wherein the pattern preparing unit changeably sets the integral number, determining the cycle duration of the triangular wave, according to an electrical angular speed of the electric rotating machine relating to the electrical angle cycle duration of the electric rotating machine.

7. The control device according to claim 6, wherein the pattern preparing unit sets the integral number at a product of an odd number and 3.

8. The control device according to claim 1, further comprising:
a triangular wave comparison control unit that generates another triangular wave, produces a voltage, instructed to the electric rotating machine, so as to set a ratio of an amplitude of the instructed voltage to an amplitude of the triangular wave at the instructed value of the modulation factor, and sets the controlled voltage according to comparison of a level of the instructed voltage and a level of the triangular wave to control the controlled variable of the electric rotating machine, and
a selector that selects the control of the pattern control unit or the control of the triangular wave comparison control unit according to the instructed value of the modulation factor.

9. The control device according to claim 8, wherein the selector switches the selection to the control of the pattern control unit when the instructed value of the modulation factor is equal to or higher than a first value, and the selector switches the selection to the control of the triangular wave comparison control unit when the instructed value of the modulation factor is equal to or lower than a second value lower than the first value.

10. The control device according to claim 1, wherein the pattern preparing unit prepares the triangular wave quasi-comparison pattern having a plurality of first periods, set at different lengths, in a first angle region of the pattern, expresses magnitude of higher-order harmonic waves, existing in the controlled voltage and ranging to the order of a predetermined number, by the lengths of the first periods, and determines the lengths of the first periods such that the magnitude of higher-order harmonic waves is minimized.

11. The control device according to claim 10, wherein the pattern preparing unit weights an amplitude of each higher-order harmonic wave by a weighting factor such that the weighting factor is decreased with the order of the higher-order harmonic wave, and the pattern preparing unit determines the lengths of the first periods such that a sum of the weighted amplitudes of the higher-order harmonic waves is minimized.

12. The control device according to claim 10, wherein the pattern preparing unit prepares the triangular wave quasi-comparison pattern having a plurality of second periods, set at different lengths, in a second angle region of the pattern, and determines the lengths of the second periods such that a pattern obtained by inverting the triangular wave quasi-comparison pattern of the second angle region is symmetric to the triangular wave quasi-comparison pattern in the first angle region with respect to a boundary between the first and second angle regions.

13. The control device according to claim 1, wherein the pattern preparing unit prepares each triangular wave quasi-comparison pattern by forming a sine wave in an electrical angle range from 0 to 2 $\pi$ radians corresponding to the electrical angle cycle duration of the electric rotating machine such that a ratio of an amplitude of the sine wave to an amplitude of the triangular wave is set at the corresponding value of the modulation factor, arranging the triangular wave and the sine wave in the electrical angle range of the sine wave so as to place a center of the amplitude of the sine wave at a center of the amplitude of the triangular wave, setting a plurality of first periods in a first angle region of the triangular wave quasi-comparison pattern, corresponding to the sine wave ranging from 0 to $\pi$ radians, such that a level of the sine wave at a timing of each first period synchronized with one crest or trough point of the triangular wave is lower than a level of the point of the triangular wave, setting a plurality of second periods in the first angle region other than regions set in the first periods, setting a plurality of second periods in a second angle region of the triangular wave quasi-comparison pattern, corresponding to the sine wave ranging from $\pi$ to $2\pi$ radians, such chat a level of the sine wave at a timing of each second period synchronized with the other point of the triangular wave is higher than a level of the other point, and setting a plurality of first periods in the second angle region other than regions set in the second periods, and the pattern control unit controls the power inverter circuit to apply the low level of the controlled voltage to the electric rotating machine in response to each of the first periods of the triangular wave quasi-comparison pattern and to apply the high level of the controlled voltage to the electric rotating machine in response to each of the second periods of the triangular wave quasi-comparison pattern.

14. The control device according to claim 1, wherein the pattern control unit comprises:
   a carrier signal producing block that calculates the electrical angle cycle duration of the electric rotating machine according to an electrical angle speed of the electric rotating machine and produces a carrier signal having the triangular wave such that the carrier signal has a maximum value, a minimum value, and a cycle duration equal to a value obtained by dividing the electrical angle cycle duration of the electric rotating machine by the integral number;
   a pattern forming instruction signal producing block that produces a pattern forming instruction signal, defined in the electrical angle cycle duration of the electric rotating machine, such that a control signal having a waveform shaped in the selected triangular wave quasi-comparison pattern is produced by comparing a level of the pattern forming instruction signal and a level of the carrier signal, and
   a control signal producing block that produces the control signal by comparing the pattern forming instruction signal and the carrier signal set together in the electrical angle cycle duration of the electric rotating machine and controls the power inverter circuit according to the control signal such that the power inverter circuit applies the high and low levels of the controlled voltage to the electric rotating machine.

15. The control device according to claim 14, wherein
   the triangular wave quasi-comparison pattern of the control signal corresponds to the electrical angle cycle duration of the electric rotating machine and has four quarter angle regions partitioned along a time direction of the electrical angle cycle duration,
   the triangular wave quasi-comparison pattern has a plurality of first periods and a plurality of second periods alternately-placed in each quarter angle region,
   the triangular wave quasi-comparison pattern in each quarter angle region is set in a first period arrangement, in which the first period is shortened in the time direction while the second period is lengthened in the time direction, or a second period arrangement in which the first period is lengthened in the time direction while the second period is shortened in the time direction,
   each first period depends on the instructed value of the modulation factor and includes a timing synchronized with one crest or trough point of the triangular wave in each quarter angle region, in which a sum of the first periods is smaller than a sum of the second periods, so as to place the point at a center of the first period,
   each second period depends on the instructed value of the modulation factor and includes a timing synchronized with the other point of the triangular wave in each quarter angle region, in which a sum of the first periods is larger than a sum of the second periods, so as to place the other point at a center of the second period,
   the pattern forming instruction signal producing block sets a level of the pattern forming instruction signal, in an instruction period including each of the first periods in the quarter angle regions of the triangular wave quasi-comparison pattern in which a sum of the second periods is longer than a sum of the first periods, at an instruction value equal to a product of the maximum value and a ratio of a subtracted value, obtained by subtracting the first period from a half of the cycle duration of the carrier signal, to the half of the cycle duration of the carrier signal, and
   the pattern forming instruction signal producing block sets a level of the pattern forming instruction signal, in an instruction period including each of the second periods in the quarter angle regions of the triangular wave quasi-comparison pattern in which a sum of the second periods is shorter than a sum of the first periods, at an instruction value equal to a product of the minimum value and a ratio of a subtracted value, obtained by subtracting the second period from a half of the cycle duration of the carrier signal, to the half of the cycle duration of the carrier signal.

16. The control device according to claim 15, wherein
   the first period is successively shortened in a first pair of two quarter angle regions, successively placed through a first boundary in a repeated pattern obtained by repeating the quarter angle regions of the triangular wave quasi-comparison pattern, in the time direction,
   the first period is successively lengthened in a second pair of two quarter angle regions, successively placed through a second boundary in the repeated pattern, in the time direction,
   the triangular wave quasi-comparison pattern further has a specific period at a position, adjacent to the first boundary in one quarter angle region succeeding the other quarter angle region in the first pair, as a first period,
   the triangular wave quasi-comparison pattern further has a specific period at a position, adjacent to the first boundary in one quarter angle region preceding the other quarter angle region in the first pair, as a second period,
   the triangular wave quasi-comparison pattern further has a specific period at a position, adjacent to the second boundary in one quarter angle region preceding the other quarter angle region in the second pair, as a first period,
   the triangular wave quasi-comparison pattern further has a specific period at a position, adjacent to the second boundary in one quarter angle region succeeding the other quarter angle region in the second pair as a second period,
   when the specific period is longer than the quarter of the cycle duration of the carrier signal, the pattern forming instruction signal producing block sets a level of the pattern forming instruction signal, in an instruction period including each of the specific periods in the quarter angle regions of the triangular wave quasi-comparison pattern in which a sum of the second periods is longer than a sum of the first periods, at an instruction value which is lower than the maximum value by a product of the maximum value and a ratio of a subtracted value, obtained by subtracting a quarter of the cycle duration of the carrier signal from the specific period, to the quarter of the cycle duration of the carrier signal, and at another instruction value which is lower than the maximum value by a product of the maximum value and a ratio of a subtracted value, obtained by subtracting the specific period from a quarter of the cycle duration of the carrier signal, to the quarter of the cycle duration of the carrier signal, when the specific period is shorter than the quarter of the cycle duration of the carrier signal, when the specific period is shorter than the quarter of the cycle duration of the carrier signal, the pattern forming instruction signal producing block sets a level of the pattern forming instruction signal, in an instruction period including each of the specific periods in the quarter angle regions of the triangular wave quasi-comparison pattern in which a sum of the second periods is shorter than a sum of the first periods, at an instruction value which is higher than the minimum value by a product of the minimum value and a ratio of a subtracted value, obtained by subtracting a quarter of the cycle duration of the carrier signal from the specific period, to the quarter of the cycle duration of the carrier signal, when the specific period is longer than the quarter of the cycle duration of the carrier signal, and at another instruction value which is higher than the minimum value by a product of the minimum value and a ratio of a subtracted value, obtained by subtracting the specific period from a quarter of the cycle duration of the carrier signal, to the quarter of the cycle duration of the carrier signal, a first intersection among a plurality of intersections, at which the pattern forming instruction signal intersects the carrier signal, is placed to be closest to each boundary, a second intersection among the intersections is placed to be closest to each boundary, next to the first intersection, a third intersection among the intersections is placed to be close to each boundary, next to the second intersection, when the specific period is longer than the quarter of the cycle duration of the carrier signal, the control signal producing block changes a level of the control signal to another level, in synchronization with each of the boundaries of the repeated pattern, and continues the changed level of the control signal until a timing of the second intersection, and when the specific period is shorter than the quarter of the cycle duration of the carrier signal, the control signal producing block changes a first level of the control signal to a second level, in synchronization with each of the boundaries of the repeated pattern, continues the changed level of the control signal until a timing of the first intersection, changes the second level of the control signal to the first level in synchronization with the timing of the first intersection, and continues the level of the control signal until a timing of the third intersection.

17. The control device according to claim 14, wherein the carrier signal producing block has a correcting unit that corrects a phase of the carrier signal according to a rotational angle of the machine.

18. The control device according to claim 14, wherein the pattern control unit further comprises;

an angle-based PWM signal producing section that controls the power inverter circuit such that the controlled voltage of the power inverter circuit is changed with time according to the selected triangular wave quasi-comparison pattern and a rotational angle of the machine, and a selector which switches the control of the angle-based PWM signal producing section to the control of the control signal producing block when a time resolution in a detection of the rotational angle is longer than a predetermined value.

19. The control device according to claim 18, wherein the pattern control unit controls the selector to switch the control of the angle-based PWM signal producing section to the control of the control signal producing block in response to a first switching condition and to switch the control of the angle-based PWM signal producing section to the control of the control signal producing block in response to a second switching condition differing from the first switching condition.

20. The control device according to claim 1, wherein the power inverter circuit has a first switching element, connected with a positive electrode of a direct current power source to apply the high level of the controlled voltage to the electric rotating machine during an on period of the first switching element, and a second switching element electrically connected with a negative electrode of the direct current power source to apply the low level of the controlled voltage to the electric rotating machine during an on period of the second switching element, and the pattern control unit sets the first switching element in the on period in response to the first period of the selected triangular wave quasi-comparison pattern and sets the second switching element in the on period in response to the second period of the selected triangular wave quasi-comparison pattern.

21. A method of controlling a controlled variable of an electric rotating machine by controlling a power inverter circuit applying a controlled voltage to the electric rotating machine, comprising the steps of:

preparing a pattern having a level changed with time for each of values of a modulation factor;

determining phase information of the controlled voltage and an instructed value of the modulation factor;

selecting the pattern, corresponding to the instructed value of the modulation factor, from the patterns; and controlling the controlled variable of the electric rotating machine by controlling the power inverter circuit such that the controlled voltage of the power inverter circuit is changed with time according to the selected pattern while adjusting a phase of the controlled voltage according to the phase information, wherein the preparing step includes:

preparing a triangular wave having a cycle duration, which is equal to a value obtained by dividing an electrical angle cycle duration of the electric rotating machine by an integral number, and preparing each pattern as a triangular wave quasi-comparison pattern so as to have both a first period of a first level, depending on the corresponding value of the modulation factor and including a timing synchronized with a crest point or a trough point of the triangular wave, and a second period of a second level, depending on the corresponding value of the modulation factor and including a timing synchronized with the other point of the triangular wave, and wherein the controlling step includes:

controlling the power inverter circuit to apply a low level of the controlled voltage to the electric rotating machine in response to the first period of the selected triangular wave quasi-comparison pattern and to apply a high level of the controlled voltage to the electric rotating machine in response to the second period of the selected triangular wave quasi-comparison pattern.

22. The method according to claim 21, wherein the preparing step further includes:
preparing each triangular wave quasi-comparison pattern having a plurality of first periods, set at different lengths, in a first angle region of the pattern,
expressing magnitude of higher-order harmonic waves, existing in the controlled voltage and ranging to the order of a predetermined number, by the lengths of the first periods, and
determining the lengths of the first periods such that the magnitude of higher-order harmonic waves is minimized.

23. The method according to claim 22, wherein the preparing step further includes:
weighting an amplitude of each higher-order harmonic wave by a weighting factor such that the weighting factor is decreased with the order of the higher-order harmonic wave, and
determining the first periods of each triangular wave quasi-comparison pattern such that a sum of the weighted amplitudes of the higher-order harmonic waves is minimized.

24. The method according to claim 22, wherein the preparing step further includes:
preparing each triangular wave quasi-comparison pattern having a plurality of second periods, set at different lengths, in a second angle region of the pattern; and
determining the lengths of the second periods such that a pattern obtained by inverting the triangular wave quasi-comparison pattern having the first periods set at the first level and the second periods set at the second level in the second angle region is symmetric to the triangular wave quasi-comparison pattern in the first angle region with respect to a boundary between the first and second angle regions.

* * * * *